United States Patent
Johnson

(10) Patent No.: US 9,317,867 B2
(45) Date of Patent: *Apr. 19, 2016

(54) SYSTEM AND METHOD FOR SITUATIONAL LOCATION RELEVANT INVOCABLE SPEED REFERENCE

(71) Applicant: Apple Inc., Cupertino, CA (US)

(72) Inventor: William J. Johnson, Flower Mound, TX (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/629,401

(22) Filed: Feb. 23, 2015

(65) Prior Publication Data

US 2015/0178764 A1    Jun. 25, 2015

Related U.S. Application Data

(60) Continuation of application No. 13/669,422, filed on Nov. 5, 2012, now Pat. No. 8,963,686, which is a continuation of application No. 13/224,190, filed on Sep. 1, 2011, now abandoned, which is a continuation (Continued)

(51) Int. Cl.
*G08B 5/22* (2006.01)
*G06Q 30/02* (2012.01)
(Continued)

(52) U.S. Cl.
CPC ........ *G06Q 30/0239* (2013.01); *G06F 17/3087* (2013.01); *G06F 17/3089* (2013.01);
(Continued)

(58) Field of Classification Search
CPC ............. G06Q 30/02; G06Q 30/0261; G06Q 30/0239; G06Q 30/0277; G06F 17/3087; G06F 17/3089; G06F 17/30893; H04W 4/02; H04W 24/00; H04W 4/027; H04W 4/04; H04M 3/42348; H04M 3/4878; H04L 67/04; H04L 67/18; H04L 69/329
USPC .............. 340/8.1, 539.13, 995.24; 455/456.3; 701/426; 709/219
See application file for complete search history.

(56) References Cited

U.S. PATENT DOCUMENTS

| 4,644,351 A | 2/1987 | Zabarsky et al. |
| 4,903,212 A | 2/1990 | Yokouchi et al. |

(Continued)

FOREIGN PATENT DOCUMENTS

| BR | 9904979 | 12/2000 |
| CA | 2163215 | 11/1994 |

(Continued)

OTHER PUBLICATIONS

"3rd Generation Partnership Project (3GPP); Technical Specification Group (TSG) RAN; Working Group 2 (WG2); Report on Location Services (LCS)," 3G TR 25.923 v.1.0.0, Apr. 1999, 45 pages.

(Continued)

*Primary Examiner* — Thomas Mullen
(74) *Attorney, Agent, or Firm* — Fish & Richardson P.C.

(57) ABSTRACT

Situational location dependent information is transmitted from a server data processing system to a receiving data processing system. A candidate delivery event associated with a current positional attribute of the receiving data processing system is recognized and a situational location of the remote data processing system is determined. The candidate delivery event may be a location and/or direction change, device state change, or movement exceeding a movement tolerance. A set of delivery content from a deliverable content database is transmitted from the server data processing system to the receiving data processing system according to the situational location of the receiving data processing system, and according to delivery constraints.

20 Claims, 37 Drawing Sheets

Related U.S. Application Data of application No. 12/772,909, filed on May 3, 2010, now Pat. No. 8,031,050, which is a continuation of application No. 11/767,190, filed on Jun. 22, 2007, now Pat. No. 7,710,290, which is a division of application No. 11/464,671, filed on Aug. 15, 2006, now abandoned, which is a division of application No. 10/823,386, filed on Apr. 12, 2004, now Pat. No. 7,187,997, which is a division of application No. 10/167,532, filed on Jun. 11, 2002, now Pat. No. 6,731,238, which is a division of application No. 09/589,328, filed on Jun. 7, 2000, now Pat. No. 6,456,234.

(51) Int. Cl.
*G06F 17/30* (2006.01)
*H04M 3/42* (2006.01)
*H04M 3/487* (2006.01)
*H04W 4/02* (2009.01)
*H04W 24/00* (2009.01)
*H04W 4/04* (2009.01)
*G01S 5/02* (2010.01)
*H04L 29/08* (2006.01)

(52) U.S. Cl.
CPC .......... *G06F17/30893* (2013.01); *G06Q 30/02* (2013.01); *G06Q 30/0261* (2013.01); *G06Q 30/0277* (2013.01); *H04L 67/04* (2013.01); *H04L 67/18* (2013.01); *H04L 69/329* (2013.01); *H04M 3/42348* (2013.01); *H04M 3/4878* (2013.01); *H04W 4/02* (2013.01); *H04W 4/027* (2013.01); *H04W 4/04* (2013.01); *H04W 24/00* (2013.01); *G01S 5/02* (2013.01); *H04L 67/24* (2013.01); *H04M 2242/14* (2013.01); *H04M 2242/15* (2013.01); *H04M 2242/30* (2013.01); *Y10S 707/99945* (2013.01); *Y10S 707/99948* (2013.01); *Y10S 707/99952* (2013.01); *Y10S 707/99953* (2013.01)

(56) References Cited

U.S. PATENT DOCUMENTS

| | | |
|---|---|---|
| 4,907,159 A | 3/1990 | Mauge et al. |
| 4,999,783 A | 3/1991 | Tenmoku et al. |
| 5,031,104 A | 7/1991 | Ikeda et al. |
| 5,046,011 A | 9/1991 | Kakihara et al. |
| 5,067,081 A | 11/1991 | Person |
| 5,126,941 A | 6/1992 | Gurmu et al. |
| 5,164,904 A | 11/1992 | Sumner |
| 5,170,165 A | 12/1992 | Iihoshi et al. |
| 5,173,691 A | 12/1992 | Sumner |
| 5,182,555 A | 1/1993 | Sumner |
| 5,187,810 A | 2/1993 | Yoneyama et al. |
| 5,195,031 A | 3/1993 | Ordish |
| 5,208,763 A | 5/1993 | Hong et al. |
| 5,218,629 A | 6/1993 | Dumond, Jr. et al. |
| 5,243,652 A | 9/1993 | Teare et al. |
| 5,274,560 A | 12/1993 | LaRue |
| 5,289,572 A | 2/1994 | Yano et al. |
| 5,295,064 A | 3/1994 | Malec et al. |
| 5,307,278 A | 4/1994 | Hermans et al. |
| 5,317,311 A | 5/1994 | Martell et al. |
| 5,337,044 A | 8/1994 | Folger et al. |
| 5,339,391 A | 8/1994 | Wroblewski et al. |
| 5,371,678 A | 12/1994 | Nomura |
| 5,374,933 A | 12/1994 | Kao |
| 5,379,057 A | 1/1995 | Clough et al. |
| 5,390,125 A | 2/1995 | Sennott et al. |
| 5,406,490 A | 4/1995 | Braegas |
| 5,416,712 A | 5/1995 | Geier et al. |
| 5,416,890 A | 5/1995 | Beretta |
| 5,440,484 A | 8/1995 | Kao |
| 5,463,725 A | 10/1995 | Henckel |
| 5,469,362 A | 11/1995 | Hunt et al. |
| 5,479,600 A | 12/1995 | Wroblewski et al. |
| 5,504,482 A | 4/1996 | Schreder |
| 5,508,707 A | 4/1996 | LeBlanc et al. |
| 5,510,801 A | 4/1996 | Engelbrecht et al. |
| 5,519,760 A | 5/1996 | Borkowski et al. |
| 5,523,950 A | 6/1996 | Peterson |
| 5,537,460 A | 7/1996 | Holliday, Jr. et al. |
| 5,539,395 A | 7/1996 | Buss et al. |
| 5,539,647 A | 7/1996 | Shibata et al. |
| 5,552,989 A | 9/1996 | Bertrand |
| 5,559,520 A | 9/1996 | Barzegar et al. |
| 5,570,412 A | 10/1996 | LeBlanc |
| 5,598,572 A | 1/1997 | Tanikoshi et al. |
| 5,627,547 A | 5/1997 | Ramaswamy et al. |
| 5,627,549 A | 5/1997 | Park |
| 5,628,050 A | 5/1997 | McGraw et al. |
| 5,630,206 A | 5/1997 | Urban et al. |
| 5,636,245 A | 6/1997 | Ernst et al. |
| 5,642,303 A | 6/1997 | Small et al. |
| 5,646,853 A | 7/1997 | Takahashi et al. |
| 5,654,908 A | 8/1997 | Yokoyama |
| 5,663,732 A | 9/1997 | Stangeland et al. |
| 5,675,362 A | 10/1997 | Clough et al. |
| 5,675,573 A | 10/1997 | Karol et al. |
| 5,677,837 A | 10/1997 | Reynolds |
| 5,684,859 A | 11/1997 | Chanroo et al. |
| 5,689,252 A | 11/1997 | Ayanoglu et al. |
| 5,689,269 A | 11/1997 | Norris |
| 5,689,270 A | 11/1997 | Kelley et al. |
| 5,689,431 A | 11/1997 | Rudow et al. |
| 5,708,478 A | 1/1998 | Tognazzini |
| 5,717,392 A | 2/1998 | Eldridge |
| 5,727,057 A | 3/1998 | Emery et al. |
| 5,732,074 A | 3/1998 | Spaur et al. |
| 5,742,666 A | 4/1998 | Alpert |
| 5,745,865 A | 4/1998 | Rostoker et al. |
| 5,748,109 A | 5/1998 | Kosaka et al. |
| 5,748,148 A * | 5/1998 | Heiser .................... G08B 21/22 340/573.4 |
| 5,752,186 A | 5/1998 | Malackowski et al. |
| 5,754,430 A | 5/1998 | Sawada |
| 5,758,049 A | 5/1998 | Johnson et al. |
| 5,760,773 A | 6/1998 | Berman et al. |
| 5,767,795 A | 6/1998 | Schaphorst |
| 5,771,280 A | 6/1998 | Johnson |
| 5,774,824 A | 6/1998 | Streit et al. |
| 5,774,829 A | 6/1998 | Cisneros et al. |
| 5,793,630 A | 8/1998 | Theimer et al. |
| 5,796,365 A | 8/1998 | Lewis et al. |
| 5,796,613 A | 8/1998 | Kato et al. |
| 5,799,061 A | 8/1998 | Melcher et al. |
| 5,806,018 A | 9/1998 | Smith et al. |
| 5,825,306 A | 10/1998 | Hiyokawa et al. |
| 5,825,884 A | 10/1998 | Zdepski et al. |
| 5,831,552 A | 11/1998 | Sogawa et al. |
| 5,835,061 A | 11/1998 | Stewart |
| 5,839,086 A | 11/1998 | Hirano |
| 5,845,227 A | 12/1998 | Peterson |
| 5,848,373 A | 12/1998 | DeLorme et al. |
| 5,862,244 A | 1/1999 | Kleiner et al. |
| 5,867,110 A | 2/1999 | Naito et al. |
| 5,870,686 A | 2/1999 | Monson |
| 5,872,526 A | 2/1999 | Tognazzini |
| 5,873,068 A | 2/1999 | Beaumont et al. |
| 5,883,580 A | 3/1999 | Briancon et al. |
| 5,887,269 A | 3/1999 | Brunts et al. |
| 5,892,454 A | 4/1999 | Schipper et al. |
| 5,893,898 A | 4/1999 | Tanimoto |
| 5,898,680 A | 4/1999 | Johnstone et al. |
| 5,899,954 A | 5/1999 | Sato |
| 5,905,451 A | 5/1999 | Sakashita |
| 5,908,465 A | 6/1999 | Ito et al. |
| 5,910,799 A | 6/1999 | Carpenter et al. |
| 5,923,861 A | 7/1999 | Bertram et al. |
| 5,933,094 A | 8/1999 | Goss et al. |
| 5,933,100 A | 8/1999 | Golding |
| 5,936,572 A | 8/1999 | Loomis et al. |

(56) References Cited

U.S. PATENT DOCUMENTS

| | | | |
|---|---|---|---|
| 5,938,721 A * | 8/1999 | Dussell et al. ................. 701/468 |
| 5,941,930 A | 8/1999 | Morimoto et al. |
| 5,941,934 A | 8/1999 | Sato |
| 5,946,618 A | 8/1999 | Agre et al. |
| 5,948,040 A | 9/1999 | DeLorme et al. |
| 5,948,041 A | 9/1999 | Abo et al. |
| 5,948,061 A | 9/1999 | Merriman et al. |
| 5,955,973 A | 9/1999 | Anderson |
| 5,959,577 A | 9/1999 | Fan et al. |
| 5,959,580 A | 9/1999 | Maloney et al. |
| 5,968,109 A | 10/1999 | Israni et al. |
| 5,969,678 A | 10/1999 | Stewart |
| 5,982,298 A | 11/1999 | Lappenbusch et al. |
| 5,982,324 A | 11/1999 | Watters et al. |
| 5,987,381 A | 11/1999 | Oshizawa |
| 5,991,692 A | 11/1999 | Spencer, II et al. |
| 5,999,126 A | 12/1999 | Ito |
| 6,002,932 A | 12/1999 | Kingdon et al. |
| 6,002,936 A | 12/1999 | Roel-Ng et al. |
| 6,005,928 A | 12/1999 | Johnson |
| 6,014,090 A | 1/2000 | Rosen et al. |
| 6,014,607 A | 1/2000 | Yagyu et al. |
| 6,018,697 A | 1/2000 | Morimoto et al. |
| 6,023,653 A | 2/2000 | Ichimura et al. |
| 6,026,375 A | 2/2000 | Hall et al. |
| 6,028,550 A | 2/2000 | Froeberg et al. |
| 6,029,069 A | 2/2000 | Takaki |
| 6,031,490 A | 2/2000 | Forssen et al. |
| 6,041,280 A | 3/2000 | Kohli et al. |
| 6,052,645 A | 4/2000 | Harada |
| 6,058,350 A | 5/2000 | Ihara |
| 6,064,335 A | 5/2000 | Eschenbach |
| 6,067,502 A | 5/2000 | Hayashida et al. |
| 6,069,570 A | 5/2000 | Herring |
| 6,073,013 A | 6/2000 | Agre et al. |
| 6,073,062 A | 6/2000 | Hoshino et al. |
| 6,076,041 A | 6/2000 | Watanabe |
| 6,078,818 A | 6/2000 | Kingdon et al. |
| 6,081,206 A | 6/2000 | Kielland |
| 6,085,090 A | 7/2000 | Yee et al. |
| 6,085,148 A | 7/2000 | Jamison et al. |
| 6,087,965 A | 7/2000 | Murphy |
| 6,088,594 A | 7/2000 | Kingdon et al. |
| 6,091,956 A | 7/2000 | Hollenberg |
| 6,091,957 A | 7/2000 | Larkins et al. |
| 6,092,076 A | 7/2000 | McDonough et al. |
| 6,094,607 A | 7/2000 | Diesel |
| 6,101,443 A | 8/2000 | Kato et al. |
| 6,104,931 A | 8/2000 | Havinis et al. |
| 6,108,555 A | 8/2000 | Maloney et al. |
| 6,111,541 A | 8/2000 | Karmel |
| 6,115,611 A | 9/2000 | Kimoto et al. |
| 6,115,754 A | 9/2000 | Landgren |
| 6,119,014 A | 9/2000 | Alperovich et al. |
| 6,122,520 A * | 9/2000 | Want et al. ................. 455/456.2 |
| 6,125,279 A | 9/2000 | Hyziak et al. |
| 6,127,945 A | 10/2000 | Mura-Smith |
| 6,128,482 A | 10/2000 | Nixon et al. |
| 6,128,571 A | 10/2000 | Ito et al. |
| 6,134,548 A | 10/2000 | Gottsman et al. |
| 6,138,003 A | 10/2000 | Kingdon et al. |
| 6,138,142 A | 10/2000 | Linsk |
| 6,140,957 A | 10/2000 | Wilson et al. |
| 6,151,309 A | 11/2000 | Busuioc et al. |
| 6,151,498 A | 11/2000 | Roel-Ng et al. |
| 6,154,152 A | 11/2000 | Ito |
| 6,157,381 A | 12/2000 | Bates et al. |
| 6,157,841 A | 12/2000 | Bolduc et al. |
| 6,163,749 A | 12/2000 | McDonough et al. |
| 6,166,627 A | 12/2000 | Reeley |
| 6,167,266 A | 12/2000 | Havinis et al. |
| 6,169,552 B1 | 1/2001 | Endo et al. |
| 6,175,740 B1 | 1/2001 | Souissi et al. |
| 6,177,905 B1 | 1/2001 | Welch |
| 6,177,938 B1 | 1/2001 | Gould |
| 6,181,934 B1 | 1/2001 | Havinis et al. |
| 6,185,427 B1 | 2/2001 | Krasner et al. |
| 6,188,959 B1 | 2/2001 | Schupfner |
| 6,195,557 B1 | 2/2001 | Havinis et al. |
| 6,195,609 B1 | 2/2001 | Pilley et al. |
| 6,199,014 B1 | 3/2001 | Walker et al. |
| 6,199,045 B1 | 3/2001 | Giniger et al. |
| 6,199,099 B1 | 3/2001 | Gershman et al. |
| 6,202,008 B1 | 3/2001 | Beckert et al. |
| 6,202,023 B1 | 3/2001 | Hancock et al. |
| 6,208,866 B1 | 3/2001 | Rouhollahzadeh et al. |
| 6,212,473 B1 | 4/2001 | Stefan et al. |
| 6,216,086 B1 | 4/2001 | Seymour et al. |
| 6,222,483 B1 | 4/2001 | Twitchell et al. |
| 6,233,518 B1 | 5/2001 | Lee |
| 6,236,365 B1 | 5/2001 | LeBlanc et al. |
| 6,236,933 B1 | 5/2001 | Lang |
| 6,246,948 B1 | 6/2001 | Thakker |
| 6,249,252 B1 | 6/2001 | Dupray |
| 6,252,543 B1 | 6/2001 | Camp |
| 6,252,544 B1 | 6/2001 | Hoffberg |
| 6,256,498 B1 | 7/2001 | Ludwig |
| 6,259,405 B1 | 7/2001 | Stewart et al. |
| 6,266,612 B1 | 7/2001 | Dussell et al. |
| 6,266,614 B1 | 7/2001 | Alumbaugh |
| 6,266,615 B1 | 7/2001 | Jin |
| 6,272,342 B1 | 8/2001 | Havinis et al. |
| 6,278,884 B1 | 8/2001 | Kim |
| 6,281,807 B1 | 8/2001 | Kynast et al. |
| 6,282,491 B1 | 8/2001 | Bochmann et al. |
| 6,282,496 B1 | 8/2001 | Chowdhary |
| 6,295,454 B1 | 9/2001 | Havinis et al. |
| 6,298,306 B1 | 10/2001 | Suarez et al. |
| 6,304,758 B1 | 10/2001 | Iierbig et al. |
| 6,313,761 B1 | 11/2001 | Shinada |
| 6,314,369 B1 | 11/2001 | Ito et al. |
| 6,314,406 B1 | 11/2001 | O'Hagan et al. |
| 6,317,684 B1 | 11/2001 | Roeseler et al. |
| 6,321,158 B1 | 11/2001 | DeLorme et al. |
| 6,323,846 B1 | 11/2001 | Westerman et al. |
| 6,324,692 B1 | 11/2001 | Fiske |
| 6,326,918 B1 | 12/2001 | Stewart |
| 6,332,127 B1 | 12/2001 | Bandera et al. |
| 6,334,090 B1 | 12/2001 | Fujii |
| 6,339,437 B1 | 1/2002 | Nielsen |
| 6,339,746 B1 | 1/2002 | Sugiyama et al. |
| 6,343,317 B1 | 1/2002 | Glorikian |
| 6,345,288 B1 | 2/2002 | Reed et al. |
| 6,351,235 B1 | 2/2002 | Stilp |
| 6,353,398 B1 * | 3/2002 | Amin et al. ................. 340/995.12 |
| 6,353,406 B1 * | 3/2002 | Lanzl ................. G01S 13/84 340/10.1 |
| 6,353,743 B1 | 3/2002 | Karmel |
| 6,353,837 B1 | 3/2002 | Blumenau |
| 6,356,761 B1 | 3/2002 | Huttunen et al. |
| 6,356,763 B1 | 3/2002 | Kangas et al. |
| 6,356,836 B1 | 3/2002 | Adolph |
| 6,370,629 B1 | 4/2002 | Hastings et al. |
| 6,377,810 B1 | 4/2002 | Geiger et al. |
| 6,377,886 B1 | 4/2002 | Gotou |
| 6,381,465 B1 | 4/2002 | Chern et al. |
| 6,381,539 B1 | 4/2002 | Shimazu |
| 6,381,603 B1 | 4/2002 | Chan et al. |
| 6,385,458 B1 | 5/2002 | Papadimitriou et al. |
| 6,385,465 B1 | 5/2002 | Yoshioka |
| 6,385,535 B2 | 5/2002 | Ohishi et al. |
| 6,389,288 B1 | 5/2002 | Kuwahara et al. |
| 6,401,027 B1 | 6/2002 | Xu et al. |
| 6,401,032 B1 | 6/2002 | Jamison et al. |
| 6,405,034 B1 | 6/2002 | Tijerino |
| 6,405,123 B1 | 6/2002 | Rennard et al. |
| 6,411,899 B2 | 6/2002 | Dussell et al. |
| 6,415,207 B1 | 7/2002 | Jones |
| 6,415,220 B1 | 7/2002 | Kovacs |
| 6,415,227 B1 | 7/2002 | Lin |
| 6,427,115 B1 | 7/2002 | Sekiyama |
| 6,430,411 B1 | 8/2002 | Lempio et al. |
| 6,434,530 B1 | 8/2002 | Sloane et al. |
| 6,438,490 B2 | 8/2002 | Ohta |

(56) References Cited

U.S. PATENT DOCUMENTS

| | | | |
|---|---|---|---|
| 6,449,485 B1 | 9/2002 | Anzil |
| 6,452,498 B2 | 9/2002 | Stewart |
| 6,456,234 B1 | 9/2002 | Johnson |
| 6,456,956 B1 | 9/2002 | Xiong |
| 6,459,782 B1 | 10/2002 | Bedrosian et al. |
| 6,463,289 B1 | 10/2002 | Havinis et al. |
| 6,477,581 B1 | 11/2002 | Carpenter et al. |
| 6,487,305 B2 | 11/2002 | Kambe et al. |
| 6,490,454 B1 | 12/2002 | Kangas et al. |
| 6,490,519 B1 | 12/2002 | Lapidot et al. |
| 6,505,046 B1 | 1/2003 | Baker |
| 6,505,048 B1 | 1/2003 | Moles et al. |
| 6,507,802 B1 | 1/2003 | Payton et al. |
| 6,516,197 B2 | 2/2003 | Havinis et al. |
| 6,519,463 B2 | 2/2003 | Tendler |
| 6,519,571 B1 | 2/2003 | Guheen et al. |
| 6,526,335 B1 | 2/2003 | Treyz et al. |
| 6,529,143 B2 | 3/2003 | Mikkola et al. |
| 6,535,140 B1 | 3/2003 | Goss et al. |
| 6,542,812 B1 | 4/2003 | Obradovich et al. |
| 6,542,819 B1 | 4/2003 | Kovacs et al. |
| 6,546,336 B1 | 4/2003 | Matsuoka et al. |
| 6,546,360 B1 | 4/2003 | Gilbert et al. |
| 6,552,682 B1 | 4/2003 | Fan |
| 6,563,430 B1 | 5/2003 | Kemink et al. |
| 6,564,143 B1 | 5/2003 | Alewine et al. |
| 6,571,279 B1 | 5/2003 | Herz et al. |
| 6,574,484 B1 | 6/2003 | Carley |
| 6,587,688 B1 | 7/2003 | Chambers et al. |
| 6,587,782 B1 | 7/2003 | Nocek et al. |
| 6,587,835 B1 | 7/2003 | Treyz et al. |
| 6,594,480 B1 | 7/2003 | Montalvo et al. |
| 6,611,687 B1 | 8/2003 | Clark et al. |
| 6,611,788 B1 | 8/2003 | Hussa |
| 6,615,131 B1 | 9/2003 | Rennard et al. |
| 6,615,213 B1 | 9/2003 | Johnson |
| 6,643,587 B2 | 11/2003 | Brodie et al. |
| 6,647,257 B2 | 11/2003 | Owensby |
| 6,650,902 B1 | 11/2003 | Richton |
| 6,662,016 B1 | 12/2003 | Buckham et al. |
| 6,667,963 B1 | 12/2003 | Rantalainen et al. |
| 6,671,377 B1 | 12/2003 | Havinis et al. |
| 6,677,894 B2 | 1/2004 | Sheynblat et al. |
| 6,680,694 B1 | 1/2004 | Knockeart et al. |
| 6,681,120 B1 | 1/2004 | Kim |
| 6,683,538 B1 | 1/2004 | Wilkes, Jr. |
| 6,697,018 B2 | 2/2004 | Stewart |
| 6,711,408 B1 | 3/2004 | Raith |
| 6,711,474 B1 | 3/2004 | Treyz et al. |
| 6,718,344 B2 | 4/2004 | Hirono |
| 6,721,572 B1 | 4/2004 | Smith et al. |
| 6,731,238 B2 | 5/2004 | Johnson |
| 6,741,188 B1 * | 5/2004 | Miller et al. ............ 340/995.24 |
| 6,741,926 B1 | 5/2004 | Zhao et al. |
| 6,748,226 B1 | 6/2004 | Wortham |
| 6,748,318 B1 | 6/2004 | Jones |
| 6,750,883 B1 | 6/2004 | Parupudi et al. |
| 6,759,960 B2 | 7/2004 | Stewart |
| 6,762,772 B1 | 7/2004 | Imamura et al. |
| 6,766,174 B1 | 7/2004 | Kenyon |
| 6,813,501 B2 | 11/2004 | Kinnunen et al. |
| 6,813,503 B1 | 11/2004 | Zillikens et al. |
| 6,819,919 B1 | 11/2004 | Tanaka |
| 6,834,195 B2 | 12/2004 | Brandenberg et al. |
| 6,847,969 B1 | 1/2005 | Mathai et al. |
| 6,853,911 B1 | 2/2005 | Sakarya |
| 6,859,149 B1 | 2/2005 | Ohta |
| 6,868,074 B1 | 3/2005 | Hanson |
| 6,888,536 B2 | 5/2005 | Westerman et al. |
| 6,909,902 B1 | 6/2005 | Sawada et al. |
| 6,912,398 B1 | 6/2005 | Domnitz |
| 6,914,626 B2 | 7/2005 | Squibbs |
| 6,952,181 B2 | 10/2005 | Karr et al. |
| 6,954,735 B1 | 10/2005 | Djupsjobacka et al. |
| 6,957,072 B2 | 10/2005 | Kangras et al. |
| 6,999,779 B1 | 2/2006 | Hashimoto |
| 7,003,289 B1 | 2/2006 | Kolls |
| 7,009,556 B2 | 3/2006 | Stewart |
| 7,058,594 B2 | 6/2006 | Stewart |
| 7,076,255 B2 | 7/2006 | Parupudi et al. |
| 7,096,029 B1 | 8/2006 | Parupudi et al. |
| 7,120,469 B1 | 10/2006 | Urakawa |
| 7,123,926 B2 | 10/2006 | Himmelstein |
| 7,136,853 B1 | 11/2006 | Kohda et al. |
| 7,146,298 B2 | 12/2006 | Matomedi et al. |
| 7,187,997 B2 | 3/2007 | Johnson |
| 7,200,409 B1 | 4/2007 | Ichikawa et al. |
| 7,200,566 B1 | 4/2007 | Moore et al. |
| 7,213,048 B1 | 5/2007 | Parupudi et al. |
| 7,215,967 B1 | 5/2007 | Kransmo et al. |
| 7,222,293 B1 | 5/2007 | Zapiec et al. |
| 7,257,392 B2 | 8/2007 | Tang et al. |
| 7,260,378 B2 | 8/2007 | Holland et al. |
| 7,271,765 B2 | 9/2007 | Stilp et al. |
| 7,272,404 B2 | 9/2007 | Overy et al. |
| 7,274,332 B1 | 9/2007 | Dupray |
| 7,274,939 B2 | 9/2007 | Ruutu et al. |
| 7,280,822 B2 | 10/2007 | Fraccaroli |
| 7,295,925 B2 | 11/2007 | Breed et al. |
| 7,298,327 B2 | 11/2007 | Dupray et al. |
| 7,386,396 B2 | 6/2008 | Johnson |
| 7,395,031 B1 | 7/2008 | Ritter |
| 7,418,402 B2 | 8/2008 | McCrossin et al. |
| 7,426,437 B2 | 9/2008 | Breed et al. |
| 7,483,944 B2 | 1/2009 | Parupudi et al. |
| 7,522,927 B2 | 4/2009 | Fitch et al. |
| 7,525,484 B2 | 4/2009 | Dupray et al. |
| 7,545,281 B2 | 6/2009 | Richards et al. |
| 7,599,795 B1 | 10/2009 | Blumberg et al. |
| 7,710,290 B2 * | 5/2010 | Johnson .................. 340/8.1 |
| 7,714,778 B2 | 5/2010 | Dupray |
| 7,729,691 B2 | 6/2010 | Newville |
| 7,743,074 B1 | 6/2010 | Parupudi et al. |
| 7,860,758 B2 | 12/2010 | McCrossin et al. |
| 8,031,050 B2 * | 10/2011 | Johnson .................. 340/8.1 |
| 8,073,565 B2 | 12/2011 | Johnson |
| 8,963,686 B2 * | 2/2015 | Johnson .................. 340/8.1 |
| 2001/0018349 A1 | 8/2001 | Kinnunen et al. |
| 2001/0043148 A1 | 11/2001 | Stewart |
| 2001/0046884 A1 | 11/2001 | Yoshioka |
| 2002/0032035 A1 | 3/2002 | Teshima |
| 2002/0035493 A1 | 3/2002 | Mozayeny et al. |
| 2002/0046069 A1 | 4/2002 | Mozayeny et al. |
| 2002/0046077 A1 | 4/2002 | Mozayeny et al. |
| 2002/0046084 A1 | 4/2002 | Steele et al. |
| 2002/0091991 A1 | 7/2002 | Castro |
| 2002/0164999 A1 | 11/2002 | Johnson |
| 2002/0167442 A1 | 11/2002 | Taylor |
| 2003/0060211 A1 | 3/2003 | Chern et al. |
| 2003/0060212 A1 | 3/2003 | Thomas |
| 2003/0069029 A1 | 4/2003 | Dowling et al. |
| 2003/0069683 A1 | 4/2003 | Lapidot et al. |
| 2003/0093217 A1 | 5/2003 | Petzold et al. |
| 2003/0105826 A1 | 6/2003 | Mayraz |
| 2003/0140136 A1 | 7/2003 | Nakamura |
| 2003/0148774 A1 | 8/2003 | Naghian et al. |
| 2003/0158655 A1 | 8/2003 | Obradovich et al. |
| 2003/0191578 A1 | 10/2003 | Paulauskas et al. |
| 2004/0036649 A1 | 2/2004 | Taylor |
| 2004/0104842 A1 | 6/2004 | Drury et al. |
| 2004/0110515 A1 | 6/2004 | Blumberg et al. |
| 2004/0151151 A1 | 8/2004 | Kubler et al. |
| 2004/0180669 A1 | 9/2004 | Kall |
| 2004/0228330 A1 | 11/2004 | Kubler et al. |
| 2004/0246940 A1 | 12/2004 | Kubler et al. |
| 2004/0264442 A1 | 12/2004 | Kubler et al. |
| 2005/0002419 A1 | 1/2005 | Doviak et al. |
| 2005/0004838 A1 | 1/2005 | Perkowski et al. |
| 2005/0046584 A1 | 3/2005 | Breed |
| 2005/0134440 A1 | 6/2005 | Breed |
| 2005/0153681 A1 | 7/2005 | Hanson |
| 2005/0190789 A1 | 9/2005 | Salkini et al. |
| 2005/0234637 A1 | 10/2005 | Obradovich et al. |
| 2006/0022048 A1 | 2/2006 | Johnson |

(56) References Cited

U.S. PATENT DOCUMENTS

| | | |
|---|---|---|
| 2006/0025158 A1 | 2/2006 | Leblanc et al. |
| 2006/0038719 A1 | 2/2006 | Pande et al. |
| 2006/0284767 A1 | 12/2006 | Taylor |
| 2007/0001875 A1 | 1/2007 | Taylor |
| 2007/0005188 A1 | 1/2007 | Johnson |
| 2007/0232326 A1 | 10/2007 | Johnson |
| 2007/0233387 A1 | 10/2007 | Johnson |
| 2007/0276587 A1 | 11/2007 | Johnson |
| 2008/0024360 A1 | 1/2008 | Taylor |
| 2008/0024364 A1 | 1/2008 | Taylor |
| 2008/0030308 A1 | 2/2008 | Johnson |
| 2008/0055154 A1 | 3/2008 | Martucci et al. |
| 2008/0086240 A1 | 4/2008 | Breed |
| 2008/0113672 A1 | 5/2008 | Karr et al. |
| 2009/0030605 A1 | 1/2009 | Breed |
| 2009/0031006 A1 | 1/2009 | Johnson |
| 2009/0033540 A1 | 2/2009 | Breed et al. |
| 2009/0259573 A1 | 10/2009 | Cheng et al. |
| 2009/0271271 A1 | 10/2009 | Johnson |
| 2010/0131584 A1 | 5/2010 | Johnson |
| 2010/0207782 A1 | 8/2010 | Johnson |
| 2012/0270567 A1 | 10/2012 | Johnson |
| 2013/0225203 A1 | 8/2013 | Johnson |
| 2014/0066100 A1 | 3/2014 | Johnson |

FOREIGN PATENT DOCUMENTS

| | | |
|---|---|---|
| CA | 2287596 | 4/2000 |
| DE | 3 621 456 | 1/1988 |
| DE | 4437360 | 4/1996 |
| DE | 19506890 | 8/1996 |
| DE | 19914257 | 1/2000 |
| EP | 0 288 068 | 7/1992 |
| EP | 05-071974 | 3/1993 |
| EP | 0 633 452 | 1/1995 |
| EP | 0 745 867 | 12/1996 |
| EP | 0 762 362 | 3/1997 |
| EP | 0 763 749 | 3/1997 |
| EP | 0 785 535 | 7/1997 |
| EP | 0 786 646 | 7/1997 |
| EP | 0 809 117 | 11/1997 |
| EP | 0 813 072 | 12/1997 |
| EP | 0 699 330 | 4/1998 |
| EP | 0 908 835 | 4/1999 |
| EP | 0 997 808 | 5/2000 |
| EP | 1 083 764 | 3/2001 |
| FR | 2730083 | 8/1996 |
| FR | 2754093 | 4/1998 |
| FR | 2772911 | 6/1999 |
| GB | 2 278 196 | 11/1994 |
| GB | 2 322 248 | 8/1998 |
| GB | 2 359 888 | 9/2001 |
| JP | 62142215 | 6/1987 |
| JP | 5-191504 | 7/1993 |
| JP | 08-069436 | 3/1996 |
| JP | 8510578 | 11/1996 |
| JP | 09-054895 | 2/1997 |
| JP | 9-062993 | 3/1997 |
| JP | 9-80144 | 3/1997 |
| JP | 09-098474 | 4/1997 |
| JP | 9-113288 | 5/1997 |
| JP | 09-153125 | 6/1997 |
| JP | 09-200850 | 7/1997 |
| JP | 9-210710 | 8/1997 |
| JP | 9-319300 | 12/1997 |
| JP | 10-021259 | 1/1998 |
| JP | 10-030933 | 2/1998 |
| JP | 11-234736 | 8/1999 |
| JP | 2000-163379 | 6/2000 |
| JP | 2001-008270 | 1/2001 |
| JP | 2001-160063 | 6/2001 |
| JP | 2001-313972 | 11/2001 |
| WO | WO 93/20546 | 10/1993 |
| WO | WO 94/08250 | 4/1994 |
| WO | WO 97/07467 | 2/1997 |
| WO | WO 97/24577 | 7/1997 |
| WO | WO 97/41654 | 11/1997 |
| WO | WO 98/03951 | 1/1998 |
| WO | WO 98/07112 | 2/1998 |
| WO | WO 98/54682 | 12/1998 |
| WO | WO 99/16036 | 4/1999 |
| WO | WO 99/44183 | 9/1999 |
| WO | WO 99/61934 | 12/1999 |
| WO | WO 01/31966 | 5/2001 |
| WO | WO 01/37597 | 5/2001 |

OTHER PUBLICATIONS

"3rd Generation Partnership Project (3GPP); Technical Specification Group (TSG) RAN; Working Group 2 (WG2); Report on Location Services," TS RAN R2.03 V0.1.0, Apr. 1999, 43 pages.

"3rd Generation Partnership Project; Technical Specification Group Radio Access Network; Stage 2 Functional Specification of Location Services in UTRAN," 3G TS 25.305 v.3.1.0, Mar. 2000, 45 pages.

"3rd Generation Partnership Project; Technical Specification Group Services and System Aspects; Functional stage 2 description of location services in UMTS," 3G TS 23.171 v.1.1.0, Nov. 1999, 42 pages.

"DaimlerCrysler Guide5 Usecases Overview Map," 1 page.

Digital cellular telecommunications system (Phase 2+); Location Services (LCS); Service description, Stage 1 (GSM 02.71) ETSI, Apr. 1999, 22 pages.

"Estonian operator to launch world's first Network-based location services," Ericsson Press Release, Oct. 11, 1999, 2 pages.

"Frontiers in Electronic Media," *Interactions*, 1997, 4(4):32-64.

"GPS 12 Personal NavigatorTM Owner's Manual & Reference", Garmin Corporation, 1999, 66 pages.

"LaBarge in joint venture on bus system," Internet: URL: http://www.bizjournals.com/stlouis/stories/1998/08/10/focus2.html?t-printable, Aug. 7, 1998, 1 page.

"New Handsets Strut Their Stuff at Wireless '99," Internet: URL: http://findarticles.com/p/articles/mi_m0BMD/is_1999_Feb_11/ai_n27547656/ downloaded from Internet on Feb. 11, 1999, 3 pages.

"Report on Location Service feature (LCS) 25.923 v1.0.0," TSG-RAN Working Group 2 (Radio layer 2 and Radio layer 3), Berlin, May 25-28, 1999, 45 pages.

"Revised CR to 09/31 on work item LCS," ETSI SMG3 Plenary Meeting #6, Nice, France, Dec. 13-15, 1999. 18 pages.

"School Buses to Carry Noticom's First Application," Internet: URL: http://findarticles.com/p/articles/mi_m0BMD/is_1999_Feb_17/ai_n27547754/ downloaded from the Internet on Feb. 17, 1999, 2 pages.

"Travel Time Data Collection Handbook—Chapter 5: ITS Probe Vehicle Techniques," FHWA-PL-98-035 Report, Department of Transport, University of Texas, Mar. 1998; [online] [Retrieved from the Internet at http://www.fhwa.dot.gov/ohim/handbook/chap5.pdf, 70 pages.

Abowd et al., "Context-awareness in wearable and ubiquitous computing," *1st International Symposium on Wearable Computers*, Oct. 13-14, 1997, Cambridge, MA, 9 pages.

Abowd et al., "Cyberguide: A mobile context-aware tour guide," *Wireless Networks*, 1997, 3(5):421-433.

Ayatsuka et al., "UbiquitousLinks: Hypermedia Links Embedded in the Real World, Technical Report of Information Processing Society, 96-HI-67," Information Processing Society of Japan, Jul. 11, 1996, 96(62):23-30.

Balliet, "Transportation Information Distribution System," *IBM Technical Disclosure Bulletin*, [online] [Retrieved on Nov. 7, 2008]; Retrieved from the Internet URL: https://www.delphion.com/tdbs/tdb?order=86A+61395; Jun. 1986; 2 pages.

Balsiger et al., "MOGID: Mobile Geo-depended Information on Demand," *Workshop on Position Dependent Information Services (W3C-WAP)*, 2000, 8 pages.

Beard and Palancioglu, "Estimating Positions and Paths of Moving Objects," *IEEE*, 2000, pp. 1-8.

Bederson, "Audio Augmented Reality: A Prototype Automated Tour Guide," *CHI '95 Mosaic of Creativity*, May 7-11, 1995, Chicago, IL, pp. 210-211.

(56) References Cited

OTHER PUBLICATIONS

Berman and Powell, "The Role of Dead Reckoning and Inertial Sensors in Future General Aviation Navigation," IEEE, 1998, pp. 510-517.
Bonsignore, "A Comparative Evaluation of the Benefits of Advanced Traveler Information System (ATIS) Operational Tests," MIT Masters Thesis, Feb. 1994, 140 pps.
Borsodi, "Super Resolution of Discrete Arrivals in a Cellular Geolocation System," University of Calgary Thesis, Apr. 2000, 164 pages.
Brown, "The stick-e document: a framework for creating context-aware applications," *Electronic Publishing*, 1995, 8:259-272.
Brown, "Triggering Information by Context," *Personal Technologies*, 1998, 2:18-27.
Burnett, "Usable Vehicle Navigation Systems: Are We There Yet?" *Vehicle Electronic Systems 2000*, Jun. 29-30, 2000, 3.1.1-3.1.12.
Camp and DeHayes, Jr., "A computer-based method for predicting transit time parameters using grid systems," *Decision Sciences*, 1974, 5:339-346.
Challe, "CARMINAT—An Integrated information and guidance system," *Vehicle Navigation and Information Systems Conference*, Oct. 20-23, 1991, Renault—Direction de la Recherche, Rueil-Malmaison, France.
Change Request for "U.S. specific Emergency Services requirements included as an informative annex," Nov. 29, 1999, 2 pages.
Cheverst et al., "Design of an Object Model for a Context Sensitive Tourist Guide," *Computers and Graphics*, 1999, 23(6):883-891.
Cheverst et al., "Developing Interfaces for Collaborative Mobile Systems," 1999, 15 pages.
Cheverst et al., "Experiences of Developing and Deploying a Context-Aware Tourist Guide: The GUIDE Project," 2000, pp. 20-31.
Cheverst et al., "Services to Support Consistency in Mobile Collaborative Applications," *Proc. 3rd International Workshop on Services in Distributed Networked Environments*, 1996, 8 pages.
Cheverst et al., "Sharing (Location) Context to Facilitate Collaboration Between City Visitors," 2000, 8 pages.
Cheverst et al., "Supporting Collaboration in Mobile-aware Groupware," *Workshop on Handheld CSCW*, 1998, 6 pages.
Cheverst et al., "The Role of Connectivity in Supporting Context-Sensitive Applications," *HUC'99, LNCS 1707*, 1999, pp. 193-209.
Cheverst et al., "The Support of Mobile-Awareness in Collaborative Groupware," *Personal Technologies*, 1999, 3:33-42.
Clarke et al., "Development of Human Factors Guidelines for Advanced Traveler Information Systems (ATIS) and Commercial Vehicle Operations (CVO): Comparable Systems Analysis," U.S. Department of Transportation Federal Highway Administration, Publication No. FHWA-RD-95-197, Dec. 1996, 212 pages.
Costa et al., "Experiments with Reflective Middleware," *Proceedings of the ECOOP '98 Workshop on Reflective Object-Oriented Programming and Systems, ECOOP'98 Workshop Reader*, 1998, 13 pages.
Davies et al., "'Caches in the Air': Disseminating Tourist Information in the Guide System," *Second IEEE Workshop on Mobile Computer Systems and Applications*, Feb. 25-26, 1999, 9 pages.
Davies et al., "L2imbo: A distributed systems plastform for mobile computing," *Mobile Networks and Applications*, 1998, 3:143-156.
Dey et al., "CyberDesk: a framework for providing self-integrating context-aware services," *Knowledge-Based Systems*, 1998, 11:3-13.
Dey, "Context-Aware Computing: The CyberDesk Project," [online] Retrieved from the Internet: URL: http://www.cc.gatech.edu/fce/cyberdesk/pubs/AAAI98/AAAI98.html; *AAAI '98 Spring Symposium*, Stanford University, Mar. 23-25, 1998, downloaded from the Internet on Aug. 6, 2010, 8 pages.
Dix et al., "Exploiting Space and Location as a Design Framework for Interactive Mobile Systems," *ACM Transactions on Computer-Human Interaction (TOCHI)—Special issue on human-computer interaction with mobile systems*, 2000, 7(3):285-321.
Dommety and Jain, "Potential Networking Applications of Global Positioning Systems (GPS)," [online] [Retrieved on Nov. 18, 2008]; [Retrieved from the Internet URL: http://arxiv.org/ftp/cs/papers/9809/9809079.pdf; OSU Technical Report TR-24, Apr. 1996, 41 pages.
Drane and Rizos, "Role of Positioning Systems in ITS," *Positioning Systems in Intelligent Transportation Systems*, Dec. 1997, pp. 312, 346-349.
Drane et al., "Positioning GSM Telephones," *IEEE Communications Magazine*, Apr. 1998, pp. 46-59.
Drane et al., "The Accurate Location of Mobile Telephones," *Third Annual World Congress on Intelligent Transport Systems*, Orlando, Florida, Oct. 1996, 8 pages.
Dunn and Toohey, "Wireless Emergency Call System," *IBM Technical Disclosure Bulletin*, Sep. 1994; 1 page.
Ebine, "Dual frequency resonant base station antennas for PDC systems in Japan," *IEEE*, 1999, pp. 564-567.
Efstratiou and Cheverst, "Reflection: A Solution for Highly Adaptive Mobile Systems," *2000 Workshop on Reflective Middleware*, 2000, 2 pages.
Efstratiou et al., "Architectural Requirements for the Effective Support of Adaptive Mobile Applications," 2000, 12 pages.
Evans et al., "In-Vehicle Man-Machine Interaction. The Socrates Approach," *Vehicle Navigation & Information System Conference Proceedings*, 1994, Aug. 31-Sep. 2, 1994, pp. 473-477.
Feddema et al., "Cooperative Sentry Vehicles and Differential GPS Leapfrog," 2000, United States Department of Energy, pp. 1-12.
Flinn and Satyanarayanan, "PowerScope: A Tool for Profiling the Energy Usage of Mobile Applications," *Proc. WMCSA '99 Second IEEE Workshop on Mobile Computing Systems and Applications*, Feb. 25-26, 1999, 9 pages.
French and Driscoll, "Location Technologies for ITS Emergency Notification and E911," *Proc. 1996 National Technical Meeting of the Institute of Navigation*, Jan. 22-24, 1996, pp. 355-359.
Freundschuh, "Does 'Anybody' Really Want (Or Need) Vehicle Navigation Aids?" *First Vehicle Navigation and Information System Conference*, Sep. 11-13, 1989, Toronto, Canada, 5 pages.
Friday et al., "Developing Adaptive Applications: The MOST Experience," *J. Integrated Computer-Aided Engineering*, 1999, pp. 143-157.
Gould, "The Provision of Usable Navigation Assistance: Considering Individual Cognitive Ability," *First Vehicle Navigation and Information System Conference*, Sep. 11-13, 1989, Toronto, Canada, 7 pages.
Green et al., "Suggested Human Factors Design Guidelines for Driver Information Systems," *Technical Report UMTRI-93-21*, Nov. 1993, 119 pages.
Gunnarsson et al., "Location Trial System for Mobile Phones," *IEEE*, 1998, pp. 2211-2216.
Hodes and Katz, "Composable ad hoc location-based services for heterogeneous mobile clients," *Wireless Networks*, 1999, 5:411-427.
Hohman et al., "GPS Roadside Integrated Precision Positioning System," *Position Location and Navigation Symposium*, 2000, pp. 221-230.
Hoogenraad, "Location Dependent Services," *3rd AGILE Conference on Geographic Information Science*, Helsinki/Espoo, Finland, May 25-27, 2000, pp. 74-77.
Jose and Davies, "Scalabe and Flexible Location-Based Services for Ubiquitous Information Access," HUC'99, LNCS 1707, 1999, pp. 52-66.
Khattak et al., "Bay Area ATIS Testbed Plan," Research Reports, California Partners for Advanced Transit and Highways (PATH), Institute of Transportation Studies, UC Berkeley, Jan. 1, 1992, 83 pages.
Klinec and Nolz, "Nexus-Positioning and Communication Environment for Spatially Aware Applications," *IAPRS*, Amsterdam, 2000, 7 pages.
Kovacs et al., "Adaptive Mobile Access to Context-aware Services," *Proc. ASAMA '99 Proc. First International Symposium on Agent Systems and Applications Third International Symposium on Mobile Agents*, IEEE Computer Society Washington, DC, 1999, 12 pages.
Kreller et al., "A Mobile-Aware City Guide Application," *ACTS Mobile Communication Summit*, 1998, Rhodes, Greece, 7 pages.
Kreller et al., "UMTS: A Middleware Architecture and Mobile API/Approach," *IEEE Personal Communications*, Apr. 1998, pp. 32-38.

(56) References Cited

OTHER PUBLICATIONS

Kugler and Lechner, "Combined Use of GPS and LORAN-C in Integrated Navigation Systems," *Fifth International Conference on Satellite Systems for Mobile Communications and Navigation*, London, UK, May 13-15, 1996, pp. 199-207.
Leonhardt and Magee, "Multi-Sensor Location Tracking," *MOBICOM 98*, Dallas, TX, pp. 203-214.
Leonhardt and Magee, "Towards a general location service for mobile environments," *Proc. Third International Workshop on Services in Distributed and Networked Environments*, Jun. 3-4, 1996, 8 pages.
Long et al., "Rapid Prototyping of Mobile Context-Aware Applications: The Cyberguide Case Study," *MobiCom '96*, 1996, 11 pages.
Lusky et al., "Mapping the Present," *ColoradoBiz*, Nov. 1999, 26(11):16-17.
Maaβ, "Location-Aware Mobile Applications based on Directory Services," *MOBICOM 97*, 1997, Budapest, Hungary, pp. 23-33.
Mahmassani et al., "Providing Advanced and Real-Time Travel/Traffic Information to Tourists," *Center for Transportation Research, Bureau of Engineering Research*, The University of Texas at Austin, Oct. 1998, 15 pages.
Mark, "A Conceptual Model for Vehicle Navigation Systems," *First Vehicle Navigation and Information System Conference*, Sep. 11-13, 1989, Toronto, Canada 11 pages.
Maxwell et al., "Alfred: The Robot Waiter Who Remembers You," *AAAI Technical Report WS-99-15*, 1999, 12 pages.
McCarthy and Meidel, "ACTIVEMAP: A Visualization Tool for Location Awareness to Support Informal Interactions," *HUC '99, LNCS 1707*, 1999, pp. 158-170.
Miller et al., "Integrating Hierarchical Navigation and Querying: A User Customizable Solution," ACM Multimedia Workshop on Effective Abstractions in Multimedia Layout, Presentation, and Interaction, San Francisco, CA, Nov. 1995, 8 pages.
Muraskin, "Two-Minute Warnings for School Bus Riders," Internet: URL: http://www.callcentermagazine.com/shared/printableArticle.jhtml:jsessionid=PQH1SZXW . . . Jul. 1, 1999, 3 pages.
Nagao et al., Walk Navi: A Location-Aware Interactive Navigation/Guideline System and Software III, First edition, pp. 9-48, published by Kindai-Kagaku-Sya Co. Ltd., Dec. 10, 1995.
Noonan and Shearer, "Intelligent Transportation Systems Field Operational Test Cross-Cutting Study Advance Traveler Information systems," *Intelligent Transportation Systems Field Operational Test Cross-Cutting Study*, Sep. 1998, 26 pages.
Northard, "Docking Station Communication Link," *IBM Technical Disclosure Bulletin*, 1994, 4 pages.
O'Grady et al., "A Tourist-Centric Mechanism for Interacting with the Environment," Proceedings of the First International Workshop on Managing Interactions in Smart Environments (MANSE '99), Dublin, Ireland, Dec. 1999, pp. 56-67.
Parikh, "Tele Locate," *IBM Technical Disclosure Bulletin*, [online] [Retrieved on Nov. 7, 2008]; Retrieved from the Internet URL: https://www.delphion.com/tdbs/tdb?order=92A+62775; 1992, 1 page.
Pascoe et al., "Developing Personal Technology for the Field," *Personal Technologies*, 1998, 2:28-36.
Popescu-Zeletin et al., "Applying Location-Aware Computing for Electronic Commerce: Mobile Guide," Proc. 5th Conference on Computer Communications, AFRICOM-CCDC'98,Oct. 20-22, 1998, 14 pages.
Pungel, "Traffic control-beat the jam electronically," *Funkschau*, 1988, 18:43-45 (w/English translation).
RD 409052, Research Disclosure Alerting Abstract, "Location dependent information for satellite based vehicle communication—required application of Global Position System (GPS) to automatically extract relevant portions of data package as vehicle changes position," May 10, 1998, 1 page.
Rekimoto et al., "Augment-able Reality: Situated Communication through Physical and Digital Spaces," *Second International Symposium on Wearable Computers (ISWC'98)*, 1998, pp. 1-8.
Rillings and Betsold, "Advanced driver information systems," *Vehicular Technology*, IEEE Vehicular Technology Society, 1991, 40:31-40.
Rozier et al. "Hear&There: An Augmented Reality System of Linked Audio," Proceedings of the International Conference on Auditory Display, Atlanta, GA, Apr. 2000, pp. 1-5.
Serafin et al., "Functions and Features of Future Driver Information Systems," *Technical Report UMTRI-91-16*, May 1991, 104 pages.
Shekhar and Liu, "Genesis and Advanced Traveler Information Systems (ATIS): Killer Applications for Mobile Computing?" *NSF Mobidata Workshop on Mobile and Wireless Information Systems*, Nov. 1994, 20 pages.
Shibata et al., "Development and Integration of Generic Components for a Teachable Vision-Based Mobile Robot," *IEEE/ASME Transactions on Mechatronics*, 1996, 1(3):230-236.
Spohrer, "New Paradigms for Using Computers (Abstract)," 1997; [online]; Retrieved from the Internet URL: http://www.almaden.ibm.com/almaden/npuc97/1997/spohrer.htm; 1 page.
Tarumi et al., "Public Applications of SpaceTag and Their Impacts," *Digital Cities, LNCS 1765*, 2000, pp. 350-363.
Tebbutt, "Dial your way out of the woods," *The Australian*, Feb. 2000, 1 page.
Tijerina et al., "Driver Workload Assessment of Route Guidance System Destination Entry While Driving: A Test Track Study," *Proceedings of the 5th ITS World Congress*, Oct. 12-16, 1998, Seoul, Korea, 9 pages.
Tso et al., "Always On, Always Connected Mobile Computing," Mobile Communications Operation—Mobile Handheld Products Group, 1996, pp. 918-924.
Tsuzawa and Okamoto, "Advanced Mobile Traffic Information and Communication System," *First Vehicle Navigation and Information Systems Conference*, Sep. 11-13, 1989, Toronto, Canada, Abstract only.
Wang and Huang, "An Unified Vehicle Supervising and Traffic Information System," *IEEE*, 1996, pp. 968-972.
Wang and Lin, "Location Aware Information Agent over WAP," *Tamkang Journal of Science and Engineering*, 2000, 3(2):107-115.
Wheeler et al., "Development of Human Factors Guidelines for Advanced Traveler Information Systems and Commercial Vehicle Operations: Task Analysis of ATIS/CVO Functions," US Dept. Transportation Federal Highway Administration Research and Development, Publication No. FHWA-RD-95-176, Nov. 1996, 124 pps.
Wong, "GPS: making roads safer and solving traffic tangles," *Asia Engineer*, 1995, 23(9):31-32.
Yang and Marsland, "Global Snapshots for Distributed Debugging," IEEE, 1992, pp. 436-440.
Ygnace et al., "Travel Time Estimation on the San Francisco Bay Area Network Using Cellular Phones as Probes," Working Paper, Institute of Transportation Studies, University of California, Berkeley, 2000, 58 pages.
Yim et al., "Travinfo Field Operational Test: Work Plan for the Target, Network, and Value Added Reseller (VAR) Customer Studies," *Working Papers, California Partners for Advanced Transit and Highways (PATH), Institute of Transportation Studies*, UC Berkeley, Apr. 1, 1997, 49 pages.
Yokote, "The Apertos Reflective Operating System: The Concept and Its Implementation," *OOPSLA '92*, pp. 414-434.
Zhao, "Mobile Phone Location Determination and Its Impact on Intelligent Transportation Systems," *IEEE Transactions on Intelligent Transportation Systems*, Mar. 2000, 1(1):55-64.

\* cited by examiner

SYSTEM AND METHOD FOR SITUATIONAL LOCATION RELEVANT INVOCABLE SPEED REFERENCE

CROSS-REFERENCES TO RELATED APPLICATIONS

The present application is a continuation of and claims priority to pending U.S. application Ser. No. 13/669,422, filed Nov. 5, 2012, now U.S. Pat. No. 8,963,686, which is a continuation of U.S. application Ser. No. 13/224,190, filed Sep. 1, 2011, now abandoned, which is a continuation of U.S. application Ser. No. 12/772,909, filed May 3, 2010, now U.S. Pat. No. 8,031,050, which is a continuation of U.S. patent application Ser. No. 11/767,190, filed Jun. 22, 2007, now U.S. Pat. No. 7,710,290, issued May 4, 2010, which is a divisional application of application Ser. No. 11/464,671, filed Aug. 15, 2006, now abandoned, entitled "System and Method for Proactive Content Delivery by Situational Location", which is a divisional application of application Ser. No. 10/823,386, filed on Apr. 12, 2004, entitled "System and Method for Proactive Content Delivery By Situational Location", now U.S. Pat. No. 7,187,997, issued Mar. 6, 2007, which is a divisional application of application Ser. No. 10/167,532, filed Jun. 11, 2002, entitled "Method and System for Proactive Content Delivery by Situational Location", now U.S. Pat. No. 6,731,238, issued May 4, 2004, which is a divisional of application Ser. No. 09/589,328 filed on Jun. 7, 2000, entitled "System and Method for Proactive Content Delivery By Situational Location," now U.S. Pat. No. 6,456,234, issued Sep. 24, 2002. The application herein claims the benefit of priority of all of the above listed patent applications and hereby incorporates by reference in their entirety the said patent applications.

BACKGROUND OF THE INVENTION

The present invention relates generally to location dependent delivery of information to mobile data processing systems, and more particularly to a system for pushing situational location dependent content to data processing system devices traveling to locations for, or in directions of, that place which delivery content is designated as deliverable.

The boom of the internet has greatly provided information to mobile users through wireless web server connected devices such as laptops, personal digital assistants (PDAs), and telephones. People with an internet enabled device can access yahoo.com (yahoo is a trademark of Yahoo corporation) and other internet connected resources. There are also Global Positioning System (GPS) devices that enable mobile users to know exactly where they are on a particular map. Users with GPS device functionality can further manually enter their known location into an internet MAP directory service (e.g. yahoo.com Maps) and then provide a target address they want to go to. Step by step instructions are then provided to the user for how to get to the destination from the current location. Some GPS devices provide local processing for directing, and narrating to, a driver. Mating automated location finding systems with internet travel direction services is an attractive blend.

Cadillac recently announced the OnStar program with sales of Cadillac automobiles (Cadillac and OnStar are trademarks of General Motors corporation). A person is enabled with calling upon an "OnStar Advisor" 7 days a week, 24 hours a day, with the press of a button. An emergency call, for example 911, or for a disabled Cadillac vehicle, allows a driver to instantly call upon wireless connected assistance. The driver may also call upon the OnStar Advisor for directions to a destination. The Advisor has access to automatic processing for determination of the vehicle's current location in case of auto theft, a disabled vehicle, or assisting with directions. The Advisor can also remotely unlock the vehicle should the driver lock the keys in the car. In effect, Cadillac drivers have full time wireless connected assistance around the clock for many reasons. While the location determination of the vehicle is automatic, there remain manual processes performed by the Advisor. Automation of some of these processes is desirable.

Many internet services derive their revenue stream from advertising. Advertisers pay to have their content delivered to users who access web site and web server interfaces. Advertisers desire to target their audience at the most appropriate time. Knowing the location of a user as being relevant to a particular advertisement is desirable. Automating the delivery of the content is desirable.

A method is needed for a low cost business model that enables the efficient configuration of deliverable content for automatic delivery to mobile users based on their situational location that is relevant to receive such content.

BRIEF SUMMARY OF THE INVENTION

The present invention provides transmission of situational location dependent information from a server data processing system (SDPS) to a receiving data processing system (RDPS). The server data processing system (SDPS) communicates with the receiving data processing system (RDPS) by pushing content (i.e. proactive content delivery) when appropriate, rather than in response to a user query. A candidate delivery event associated with a current positional attribute of the receiving data processing system is recognized and a situational location of the remote data processing system is determined. The candidate delivery event may be a location and/or direction change, device state change, or movement exceeding a movement tolerance. The situational location of the remote data processing system may be its location, direction, location and direction, proximity to a location, state change, or location and/or direction relative to a previous location and/or direction, or combinations thereof. At the SDPS, a set of delivery content from a deliverable content database is retrieved according to the situational location of the RDPS, and according to system delivery constraints and/or configured user delivery constraints. The SDPS transmits any applicable content found to the RDPS. The delivery content is configurable by authorized administrators in a manner that enables the configured content for immediate delivery should a RDPS meet the criteria of the associated situational location and delivery constraints.

Various embodiments with respect to recognizing a candidate delivery event and determining a situational location include:
- the SDPS recognizes the candidate delivery event (e.g. various wireless embodiments and physical connection embodiments)
- the RDPS recognizes the candidate delivery event (e.g. GPS and some wireless)
- the SDPS determines the situational location associated with the candidate delivery event which may have been determined by the RDPS and communicated to the SDPS, or determined by the SDPS
- the RDPS determines the situational location associated with the candidate delivery event and communicates the information to the SDPS for further processing A situational location is completely determined for the RDPS upon the candidate delivery event. Content that can be delivered is fully configurable, of any type, and can be instantly activated for candidate delivery upon convenient administration. As well known in the art of software installation, the present invention may be installed to a variety of network embodiments and underlying operating systems through installation parameters, or as distinct installations for the particular platform. Preferably, an internet connection is used for configuring deliverable content, and for the interoperation of communications between the RDPS and SDPS.

The present invention enables a user of a RDPS to be made aware of content that is applicable for the current situational location of the user. Depending on the application of the present invention, the content and configurations will take on a variety of themes.

For example, in an outdoor wireless embodiment of the present invention, advertisement content can be configured by paying customer advertisers through an internet web interface, and then automatically delivered to people when the people are in a location, or heading path to a location, for reasonable delivery of the content to their automobile installed, or handheld, RDPS. For example, as a driver or pedestrian (i.e. user) approaches a retail store with a mobile RDPS, a configured advertisement of a special deal at the retail store can be proactively delivered (i.e. pushed) to the user automatically on behalf of the store. Likewise, an indoor wireless embodiment of the present invention enables the driver or pedestrian, now a shopper inside the store, to receive configured content to a shopping cart mounted, or handheld, RDPS directing the shopper to specific sales items as the shopper moves about the inside of the store.

In another application, a policeman may activate a mobile police automobile device (i.e. RDPS) in a police car for automatic delivery of a person's criminal record as the policeman drives by the location of a person's house. The police establishment configures criminal record content, or pointers thereto, along with the location of the residence that is believed to harbor the person with a record. As the policeman drives by locations with addresses of known offenders, the RDPS displays applicable criminal data. Of course, the policeman can enable or disable the functionality as needed.

In another application, a traveling vehicle, for example a touring bus, carries tourists for a narrated drive through a geographic area. Currently, there are human narrators for providing narration of sites and landmarks to people of the narrated drive. The present invention allows configuring deliverable content for locations on the touring bus path so that an automated narrator RDPS installed in the bus can be provided to people on the bus. For example, an RDPS providing audio, video, multimedia, or combination thereof, communicates narration content to people on the touring bus automatically as locations are encountered, or driven by.

In another application, a person attending a large park (e.g. Disney World (Disney World is a trademark of Walt Disney corporation)) could simply carry a RDPS, and receive content to a handheld device for what attraction lies ahead based on the current location and direction of the person. The person would not have to consult a directory or ask where to find something. Informative content would be proactively delivered, rather than reactively in response to a person's manual query to a service, or question to a human being.

In yet a further example, a valuable use would be for emergencies such as when a child is kidnapped. Currently, there is an Amber-Alert mechanism in Dallas/Ft. Worth, Tex. where radio stations broadcast an emergency message along with a distinguishable series of tones. This enables any pertinent information known about the kidnapper and child to be broadcast immediately to everyone with the radio on. The present invention enables the emergency broadcast to be immediately configured and then communicated to everyone with a RDPS, for example with a wireless internet connection. A picture of the victim and other multimedia information could be delivered along with audio immediately.

In still a further use of the present invention, garage sale and estate sale advertisements could be configured on behalf of paying customers that would otherwise use a newspaper classified section. As drivers become in reasonably close proximity to the sale, in the desired time window, advertisement content would be proactively delivered to a wireless RDPS installed, or handheld, in the automobile.

Thus, there are many applications for the present invention, all accomplished through simply changing the way the present invention is used. Content is pushed out to receiving devices at the most appropriate times. Users do not pull the content with a query.

It is therefore an advantage of the present invention in supporting a variety of applications and uses. The way the invention is used makes it applicable to a wide range of applications. For example, a deliverable content database can be configured with content that is appropriate for the particular application. Situational location parameters associated with the particular application are also variable, provided the installed methodology is utilized consistently. For example, world coordinates, GPS coordinates, regional coordinates, MAPSCO references, Application Address Book locations and directions, a user's caller id, a cell number in a cellular network, and like means used to describe a location can be used. Directional information of North, South, East, West, Northeast, Southeast, Northwest, Southwest, Up, Down, Left, Right, Straight, Back, and like methods used to describe a direction can be used. Further still, there are delivery constraints that can be set up for a system, or configured by a user, which provides flexibility in adapting to a variety of applications.

It is another advantage of the present invention in providing deliverable content to a person, based on the situational location of the person. Content is pushed to a user's RDPS when it is most appropriate for the user to see the content.

It is another advantage of the present invention in automatically recognizing a candidate delivery event of a RDPS and automatically determining a situational location of the RDPS. A user is not burdened with providing information on a query. The present invention automatically determines when content should be delivered and then automatically and proactively delivers it. Content is pushed to the user (of the RDPS). The user is not burdened with pulling content via a query.

It is a further advantage of the present invention to deliver any type, variety, or combination of content. The content is fully configurable by an authorized administrator who may be a paying customer for the privilege of performing configurations. Upon configuration, the content is immediately and instantly activated for proactive delivery to any RDPS meeting the configured criteria. Content may be audio, video, graphical, textual, multimedia, intranet/internet web address (es) activated for transposable selection, image, or any combination thereof.

It is another advantage in maintaining a history of delivered content at the RDPS with information that is useful for later browsing. Contained therein is information relevant to the delivered content. Additionally, provided is an invocable speed address enabling the user to transpose to a web address, or perform a speed dial phone call, that is associated with the delivered content.

Yet another advantage of the present invention is providing new and useful query functionality for querying the total number of known receiving data processing systems for a particular situational location, querying any content configured for delivery to a particular situational location with a comprehensive variety of query parameters, and querying up to a maximum threshold number of deliverable content instances for a particular location in a manner which automatically determines containing (ascending) locations, if necessary, until the specified number is met.

Further features and advantages of the invention, as well as the structure and operation of various embodiments of the invention, are described in detail below with reference to the accompanying drawings. In the drawings, like reference numbers generally indicate identical, functionally similar, and/or structurally similar elements. The drawing in which an element first appears is indicated by the leftmost digit(s) in the corresponding reference number.

BRIEF DESCRIPTION OF THE DRAWINGS

The present invention will be described with reference to the accompanying drawings, wherein.

DETAILED DESCRIPTION OF THE INVENTION

With reference now to detail of the drawings, the present invention is described. Obvious errorhandling is omitted from the flowcharts in order to focus on the key aspects of the present invention.

Figure 1:
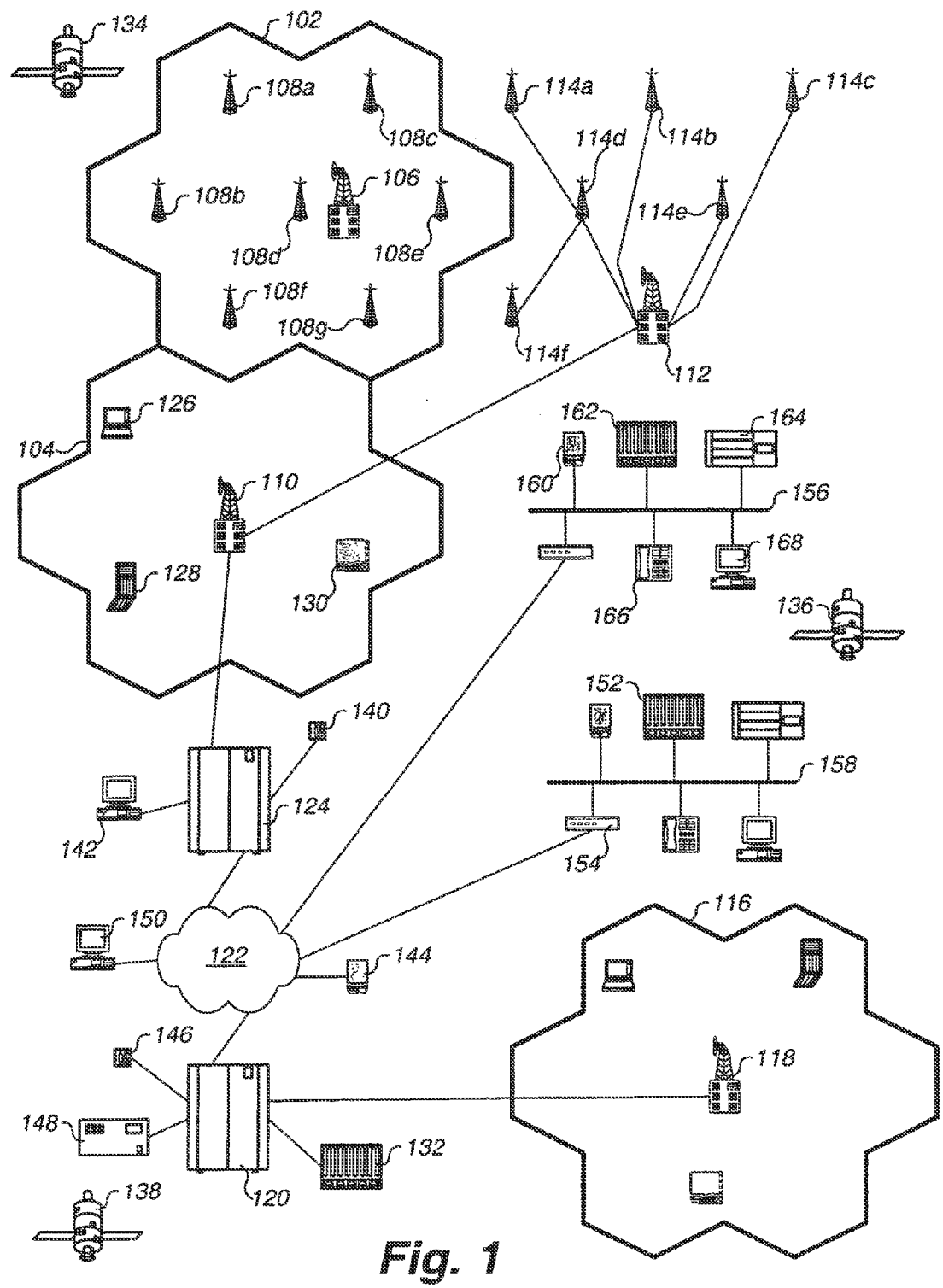
FIG. 1 depicts a network illustration for discussing the various outdoor embodiments of the present invention.

FIG. 1 depicts a network illustration for discussing the various outdoor embodiments of the present invention. In one embodiment, a cellular network cluster 102 and cellular network cluster 104 are parts of a larger cellular network. Cellular network cluster 102 contains a controller 106 and a plurality of base stations, shown generally as base stations 108. Each base station covers a single cell of the cellular network cluster, and each base station 108 communicates through a wireless connection with the controller 106 for call processing, as is well known in the art. Wireless devices communicate via the nearest base station (i.e. the cell the device currently resides in), for example base station 108*b*. Roaming functionality is provided when a wireless device roams from one cell to another so that a session is properly maintained with proper signal strength. Controller 106 acts like a telephony switch when a wireless device roams across cells, and it communicates with controller 110 via a wireless connection so that a wireless device can also roam to other clusters over a larger geographical area. Controller 110 may be connected to a controller 112 in a cellular cluster through a physical connection, for example, copper wire, optical fiber, or the like. This enables cellular clusters to be great distances from each other. Controller 112 may in fact be connected with a physical connection to its base stations, shown generally as base stations 114. Base stations may communicate directly with the controller 112, for example, base station 114*e*. Base stations may communicate indirectly to the controller 112, for example base station 114*a* by way of base station 114*d*. It is well known in the art that many options exist for enabling interoperating communications between controllers and base stations for the purpose of managing a cellular network. A cellular network cluster 116 may be located in a different country. Base controller 118 may communicate with controller 110 through a Public Service Telephone Network (PSTN) by way of a telephony switch 120, PSTN 122, and telephony switch 124, respectively. Telephony switch 120 and telephony switch 124 may be private or public. In one cellular network embodiment of the present invention, the SDPS executes at controllers, for example controller 110. The RDPS executes at a wireless device, for example mobile laptop computer 126, wireless telephone 128, a personal digital assistant (PDA) 130, or the like. As the RDPS moves about, positional attributes are monitored for determining a situational location. The RDPS may be handheld, or installed in a moving vehicle. Locating a wireless device using wireless techniques such as Time Difference of Arrival (TDOA) and Angle Of Arrival (AOA) are well known in the art. The SDPS may also execute on a server computer accessible to controllers, for example server computer 132, provided an appropriate timely connection exists between cellular network controller(s) and the server computer 132. Wireless devices (i.e. RDPS) are known by a unique identifier, for example a caller id, device identifier, or like appropriate unique handle.

In another embodiment of the present invention, GPS satellites such as satellite 134, satellite 136, and satellite 138 provide information, as is well known in the art, to GPS devices on earth for triangulation locating of the GPS device. In this embodiment, a RDPS has integrated GPS functionality so that the RDPS monitors its positional attribute(s). When the RDPS determines a candidate delivery event, it communicates parameters to the controller by way of the nearest base station. Thus, positional attribute information is provided by the RDPS to the SDPS. The RDPS is again known by a unique identifier, for example a caller id, device identifier, or like appropriate unique handle.

In yet another embodiment of the present invention, a physically connected device, for example, telephone 140, computer 142, PDA 144, telephone 146, and fax machine 148, may be newly connected to a network. Each is a RDPS. Physical connections include copper wire, optical fiber, or the like. Devices are known by a unique identifier, for example a caller id, device identifier, physical or logical network address, or like appropriate unique handle. When the RDPS is detected for being newly located, the SDPS determines the candidate delivery event. The SDPS may execute at an Automatic Response Unit (ARU) 150, a telephony switch, for example telephony switch 120, a web server 152 (for example, connected through a gateway 154), or a like data processing system that communicates with the RDPS. RDPS detection may be a result of the RDPS initiating a communication with the SDPS directly or indirectly. Thus, a user may connect his laptop to a hotel network, initiate a communication with the SDPS, and the SDPS determines that the user is in a different location than the previous communication. A local area network (LAN) 156 may contain a variety of connected devices, each an RDPS that later becomes connected to a local area network 158 at a different location, such as a PDA 160, a server computer 162, a printer 164, an internet protocol telephone 166, a computer 168, or the like. Hard copy presentation could be made to printer 164 and fax 148. Electronic content could be delivered to any RDPS.

Current technology enables devices to communicate with each other, and other systems, through a variety of heterogeneous system and communication methods. Current technology allows executable processing to run on diverse devices and systems. Current technology allows communications between the devices and/or systems over a plethora of methodologies at close or long distance. Many technologies also exist for automatic locating of devices. It is well known how to have an interoperating communications system that comprises a plurality of individual systems communicating with each other with one or more protocols. As is further known in the art of developing software, executable processing of the present invention may be developed to run on a particular target data processing system in a particular manner, or customized at install time to execute on a particular data processing system in a particular manner.

Figure 2A:
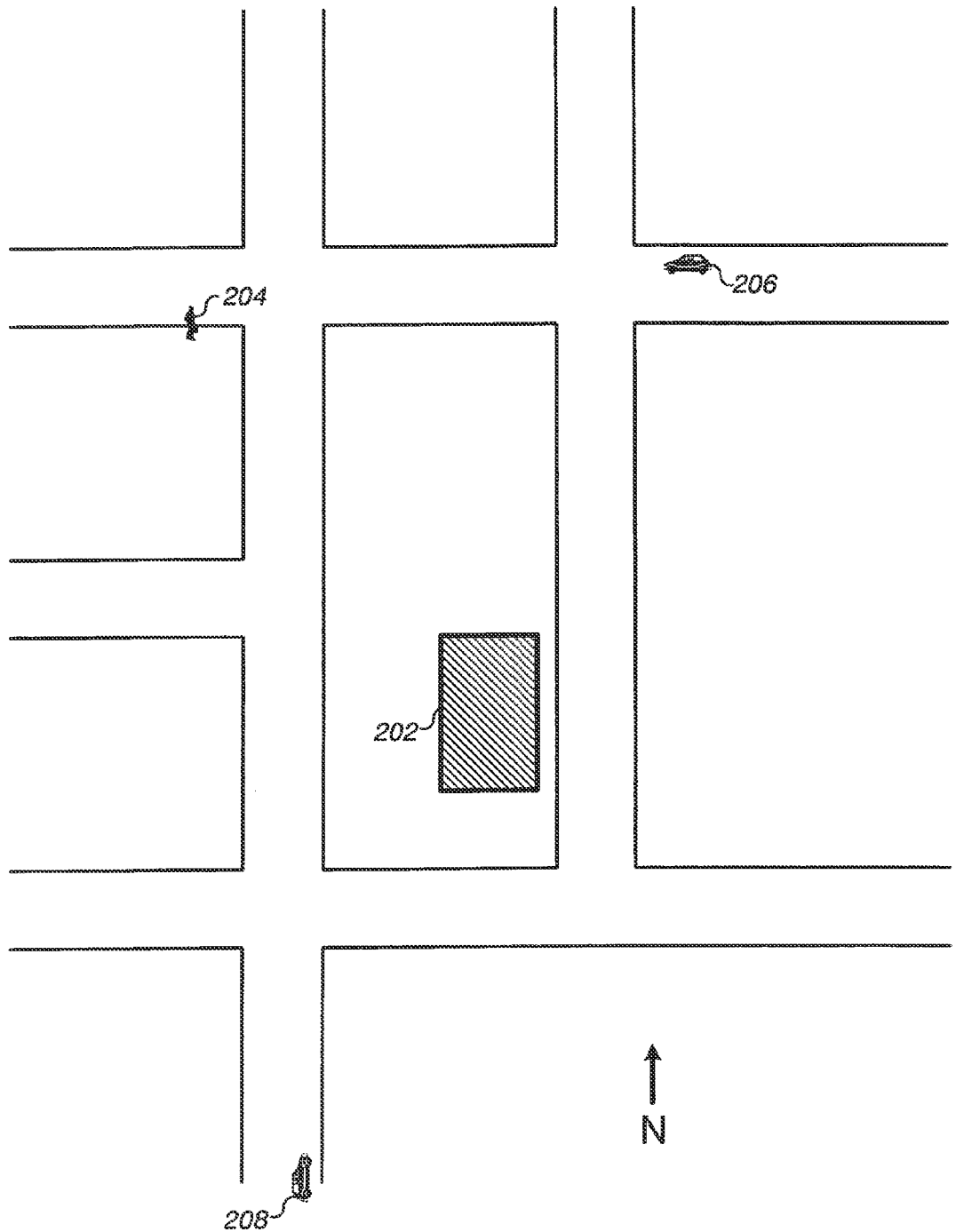
FIGS. 2A-2B depict an aerial view of a city region useful for discussing aspects of the present invention and a graphical map.
Figure 2B:
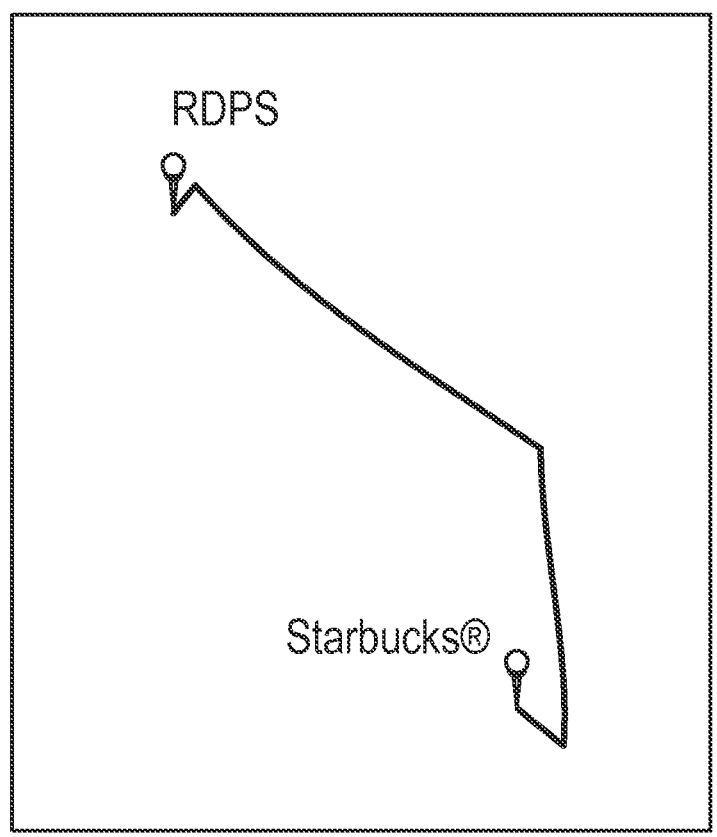

FIG. 2A depicts an aerial view of a city region useful for discussing aspects of, and helps explain one application of, the present invention. A Starbucks coffee shop 202 (Starbucks is a trademark of Starbucks corporation) is located in an area frequented by handheld wireless device (i.e. RDPS) user pedestrians, for example pedestrian 204, and wireless device (i.e. RDPS) equipped vehicles, for example automobile 206 and automobile 208. Starbucks is a paying customer to the owner of the present invention wherein content can be configured for advertising to potential customers of Starbucks. An authorized and authenticated Starbucks representative uses the present invention, for example by way of an internet connected web browser, to configure the deliverable content. The representative also configures situational location information that is to be matched to situational locations of a RDPS of mobile customers. Upon configuration completion, the content is immediately activated for proactive delivery. The present invention will automatically deliver the Starbucks configured content to any RDPS according to the representative's configurations, for example, when pedestrian 204 becomes in a specified proximity to the Starbucks location, encounters a specific location, travels in a manner which provides predictive information, heads in a specified direction at, to, or from a location, or the like, using positional attribute(s). Likewise, automobile 206 will receive the content according to configurations, for example, when making a left hand turn (i.e. changing direction at a location area) onto the street bearing Starbucks' address. Likewise, automobile 208 will receive the content according to configurations, for example, when encountering a location in proximity to the Starbucks location while heading North. One example of the content may be a textual message such as "Starbucks has a 60% off sale just ahead at 314 Main Street with free no-spill coffee mugs!!!". As shown in FIG. 2B, other examples may include a graphical map showing where the Starbucks establishment is in relation to showing where the RDPS is currently located and headed.

Figure 3A:
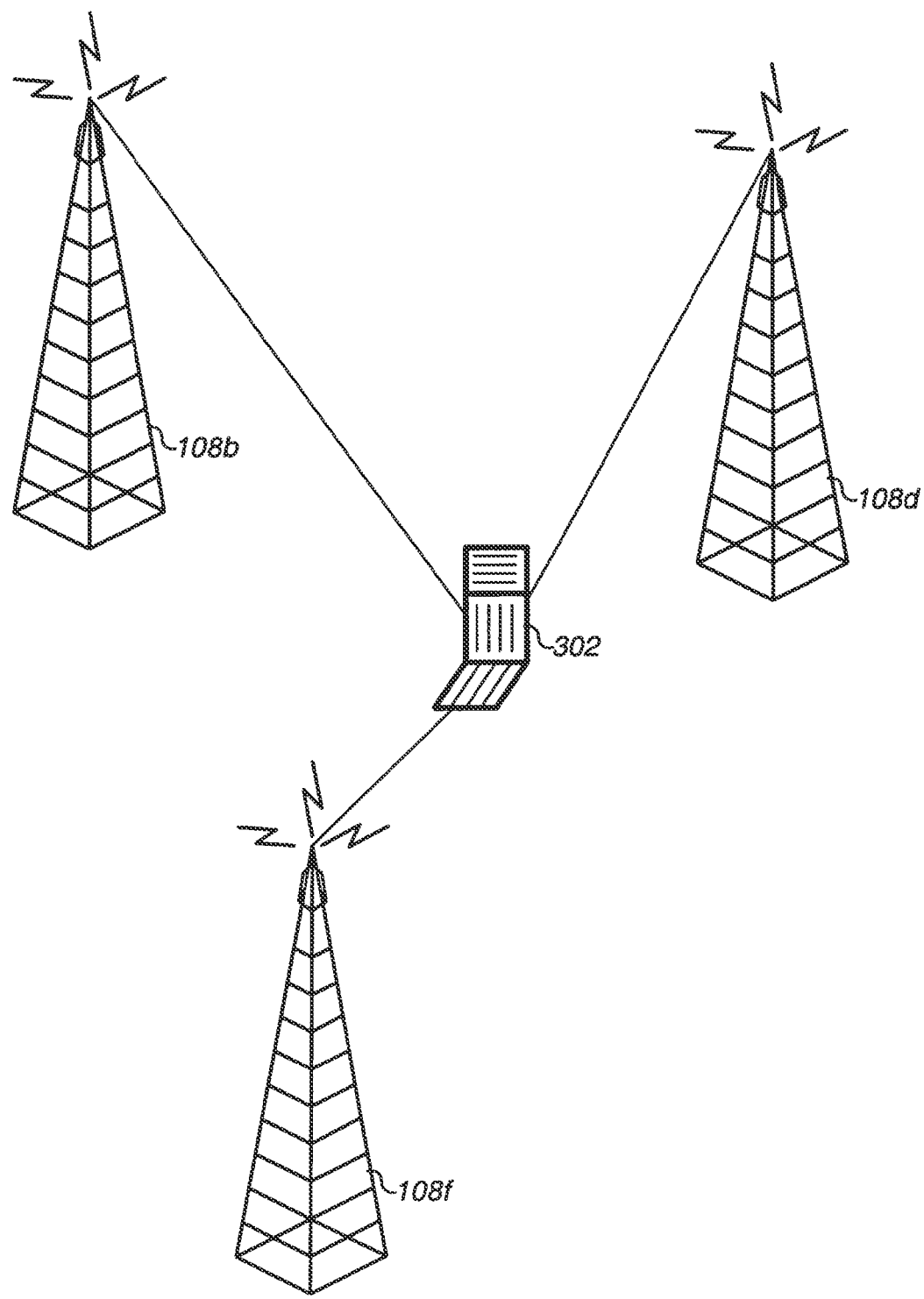
FIG. 3A depicts a locating by triangulation illustration for discussing a wireless, or cellular, embodiment of the present invention.

FIG. 3A depicts a locating by triangulation illustration for discussing a wireless, or cellular, embodiment of the present invention. A RDPS 302 is located through triangulation, as is well known in the art. At least three base towers, for example, base tower 108b, base tower 108d, and base tower 108f, are necessary for locating the RDPS. A fourth base tower would be used if altitude was configured for use by the present invention. There are cases where only two base towers are necessary given routes of travel are limited and known, for example, in spread out roadways or limited configured locations.

Figure 3B:
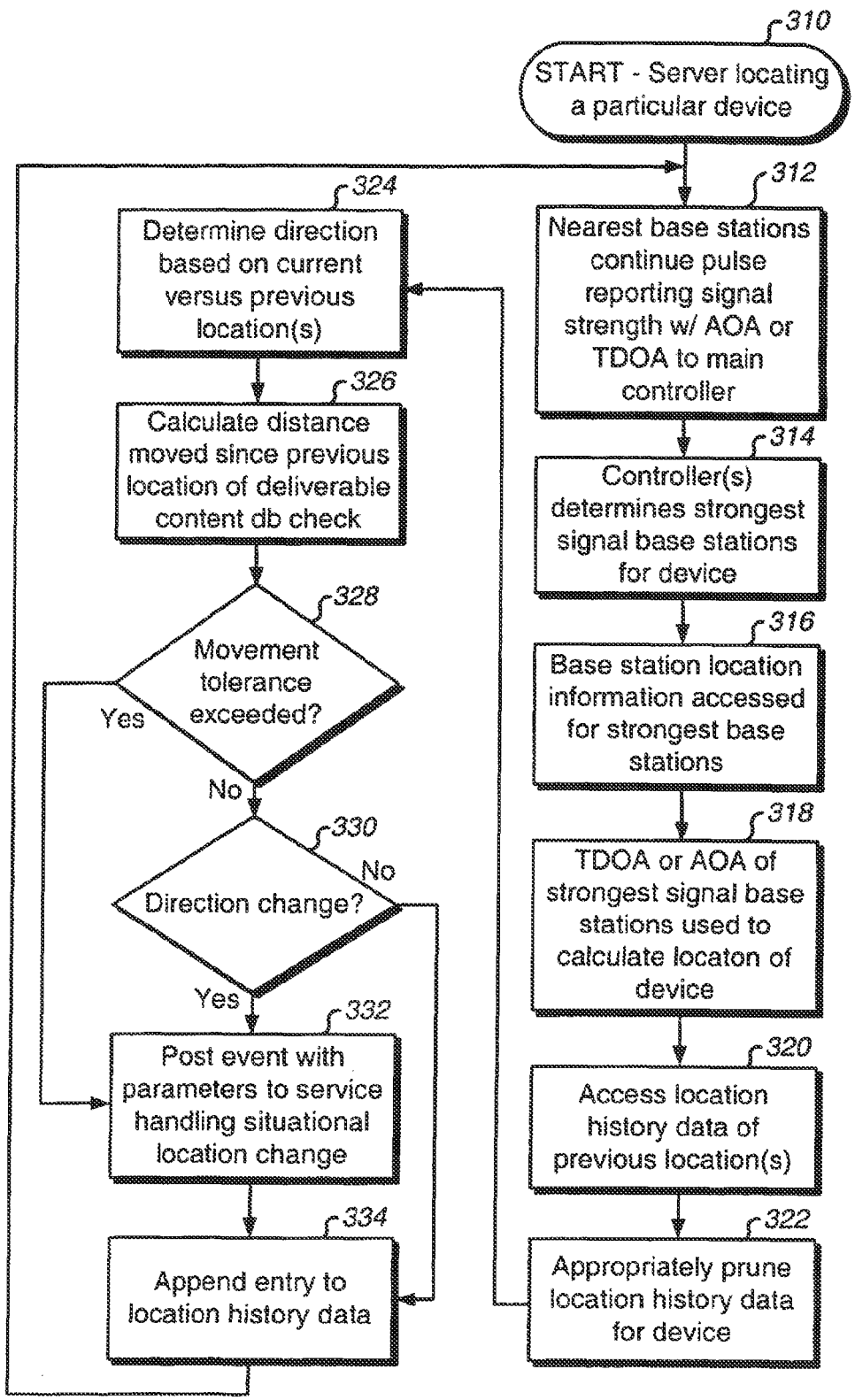
FIG. 3B depicts a flowchart for describing a preferred embodiment of the candidate delivery event generation aspect relevant to a wireless, or cellular, embodiment of the present invention, in the context of positional attribute(s) being monitored by a SDPS.

FIG. 3B depicts a flowchart for describing a preferred embodiment of the candidate delivery event generation aspect relevant to a wireless, or cellular, embodiment of the present invention, in the context of positional attribute(s) being monitored by a SDPS. Processing begins at block 310 and continues to block 312 where base stations able to communicate to any degree with a RDPS continue reporting to their controller the RDPS signal strength with an RDPS identifier (i.e. a unique handle) and Time Difference of Arrival (TDOA) information, or alternatively, Angle of Arrival (AOA) information, depending on the embodiment. When the RDPS turns on, it registers itself. The RDPS can pick signals from base stations. In one embodiment, the RDPS monitors a paging channel, called a forward channel. There can be multiple forward channels. A forward channel is the transmission frequency from the base tower to the RDPS. Either the RDPS provides heartbeats for base stations, or the base stations provide heartbeats for a response from the RDPS. Communication from the RDPS to the base tower is on what is called the reverse channel. Forward channels and reverse channels are used to perform call setup for a created session channel.

TDOA is conventionally calculated from the time it takes for a communication to occur from the RDPS back to the RDPS via the base tower, or alternatively, from a base tower back to that base tower via the RDPS. AOA is conventionally performed through calculations of the angle by which a signal from the RDPS encounters the base tower antenna. Simple triangle geometry is then used to calculate a location. The AOA antenna is typically of a phased array type.

The controller at block 314 may communicate with other controllers when base stations in other cellular clusters are picking up a signal, for example, when the RDPS roams. In any case, at block 314, the controller(s) determines the strongest signal base stations needed for locating the RDPS, at block 314. The strongest 3 (or 2 or 4 as discussed above) are used. Thereafter, block 316 accesses base station location information for base stations determined at block 314. The base station provides location anchors used to (relatively) determine the location of the RDPS. Then, block 318 uses the TDOA, or AOA, information together with known base station locations to calculate the RDPS location. Blocks 310 through 318 are well known to those skilled in art. Thereafter, block 320 accesses historical RDPS location information, and block 322 performs housekeeping by pruning location history data for the RDPS by time, number of entries, or other criteria. Block 324 then determines a direction of the RDPS based on previous location information. Block 324 may perform Artificial Intelligence (AI) to determine where the traveler may be going by consulting many or all of the location history data. Block 324 may also consider when and/or where a candidate delivery event (CADE) was generated for a direction change in order to cause certain flow from block 330. Block 326 calculates how much (e.g. distance) the RDPS has moved since the previous location that caused a candidate delivery event (CADE) generation for the RDPS (event generated Y/N field in location history data). Thereafter, block 328 compares the movement since the last CADE generation, and if the distance exceeds a movement tolerance, then block 332 posts (generates) a CADE to a present invention service handling RDPS situational location changes. The movement tolerance may be a system wide setting for all RDPS devices, particular to a type of RDPS, or specific for an RDPS.

If, at block 328, movement did not exceed the tolerance, then block 330 checks for a direction change as determined at block 324. If, at block 330, the direction did change, then a CADE is generated at block 332. If, at block 330, the direction of the RDPS did not change, then block 334 appends an appropriate entry to the location history data (see FIG. 9B). Block 332 also flows to block 334. Blocks 324 through 330 determine if a CADE is to be generated, and if so, a CADE is generated at block 332. Blocks 324 through 330 determine part, or all, (i.e. a subset) of the situational location, depending on the installation. FIG. 3B processing is continuous for every RDPS in the wireless network 7 days a week, 24 hours a day.

Figure 3C:
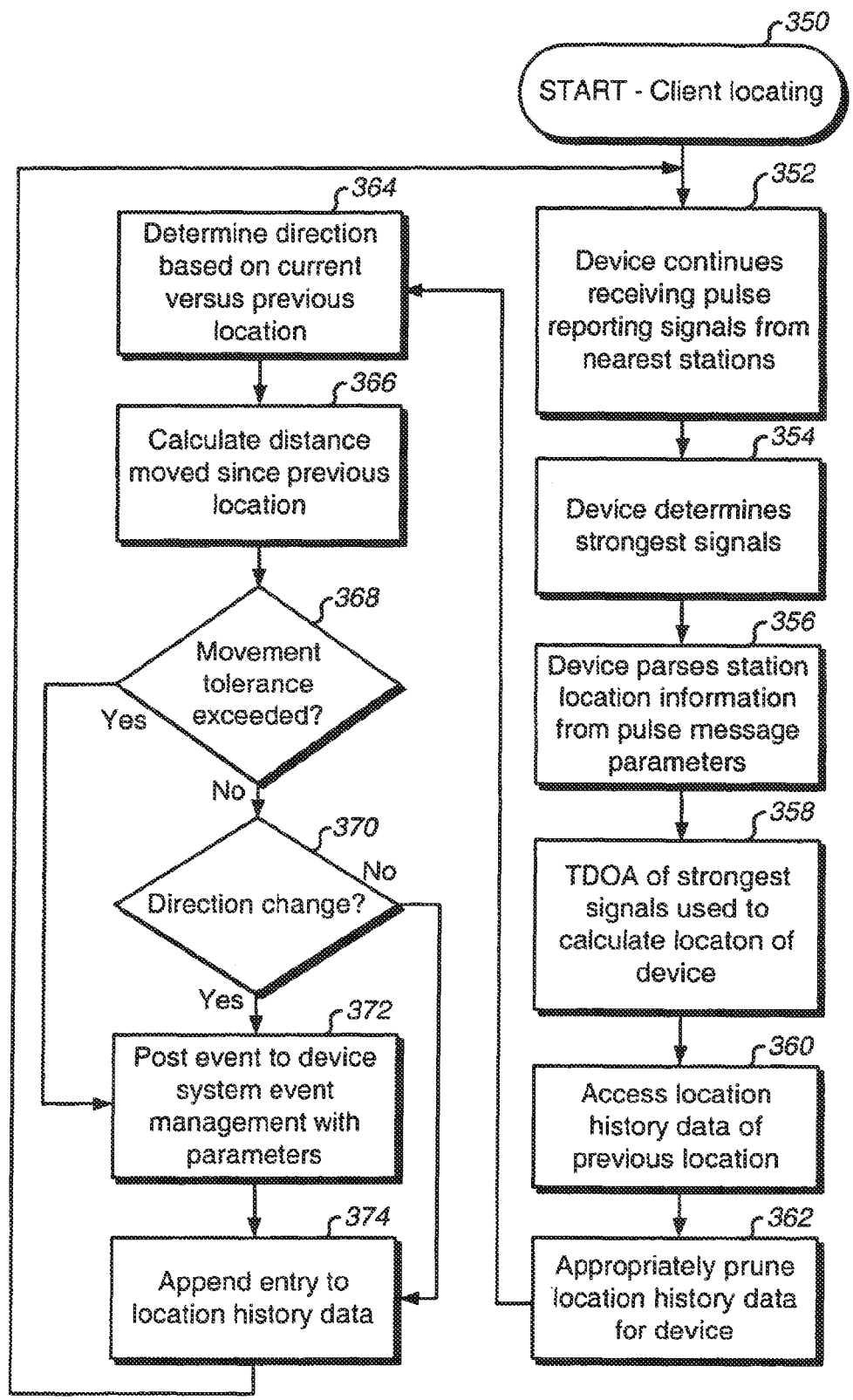
FIG. 3C depicts a flowchart for describing a preferred embodiment of the candidate delivery event generation aspect relevant to a wireless, or cellular embodiment, of the present invention, in the context of positional attribute(s) being monitored by a RDPS.

FIG. 3C depicts a flowchart for describing a preferred embodiment of the candidate delivery event generation aspect relevant to a wireless, or cellular, embodiment, of the present invention, in the context of positional attribute(s) being monitored by a RDPS. FIG. 3B demonstrated the CADE and part, or all, of the situational location being determined by a SDPS service. FIG. 3C demonstrates the CADE, and part, or all, of the situational location being determined by the RDPS itself, and then communicated to the SDPS for any further situational location determination and applicable content delivery. Communications between the base stations and RDPS is similar to above except the RDPS receives information for performing calculations and related processing. Processing begins at block 350 and continues to block 352 where the RDPS continues receiving pulse reporting from base stations. Block 354 determines the strongest 3 signals (or 2 or 4). Thereafter, block 356 parses base station location information from the pulse messages that are received by the RDPS. Block 358 communicates with base stations to perform TDOA calculations. The time it takes for a communication to occur from the RDPS back to the RDPS, or alternatively, from a base tower back to that base tower is used. Block 358 uses the TDOA information with the known base station information to determine the RDPS location. Blocks 350 through 358 are well known to those skilled in art.

Thereafter, block 360 accesses historical RDPS location information, and block 362 performs housekeeping by pruning the location history data for the RDPS by time, number of entries, or other criteria. Block 364 then determines a direction of the RDPS based on previous location information. Block 364 may perform Artificial Intelligence (AI) to determine where the traveler may be going by consulting much or all of the location history data. Block 364 may also consider when and/or where a candidate delivery event (CADE) was generated for a direction change in order to cause certain flow from block 370. Block 366 calculates how much (e.g. distance) the RDPS has moved since the previous location that caused a candidate delivery event (CADE) generation for the RDPS (event generated Y/N field in location history data). Thereafter, block 368 compares the movement since the last CADE generation and if the distance exceeds a movement tolerance, then block 372 posts (generates) a CADE to the present invention system event manager of the RDPS. The movement tolerance may be a system or user configured setting.

If, at block 368, movement did not exceed the tolerance, then block 370 checks for a direction change as determined at block 364. If, at block 370, the direction did change, then a CADE is generated to the system event manager at block 372. If, at block 370, the direction of the RDPS did not change, then block 374 appends an appropriate entry to the location history data (see FIG. 9B). Block 372 also flows to block 374. Blocks 364 through 370 determine if a CADE is to generated, and if so, a CADE is generated at block 332. Blocks 364 through 370 determine part, or all, (i.e. a subset) of the situational location, depending on the installation. FIG. 3C processing is continuous for the RDPS as long as the RDPS is enabled.

Figure 4A:
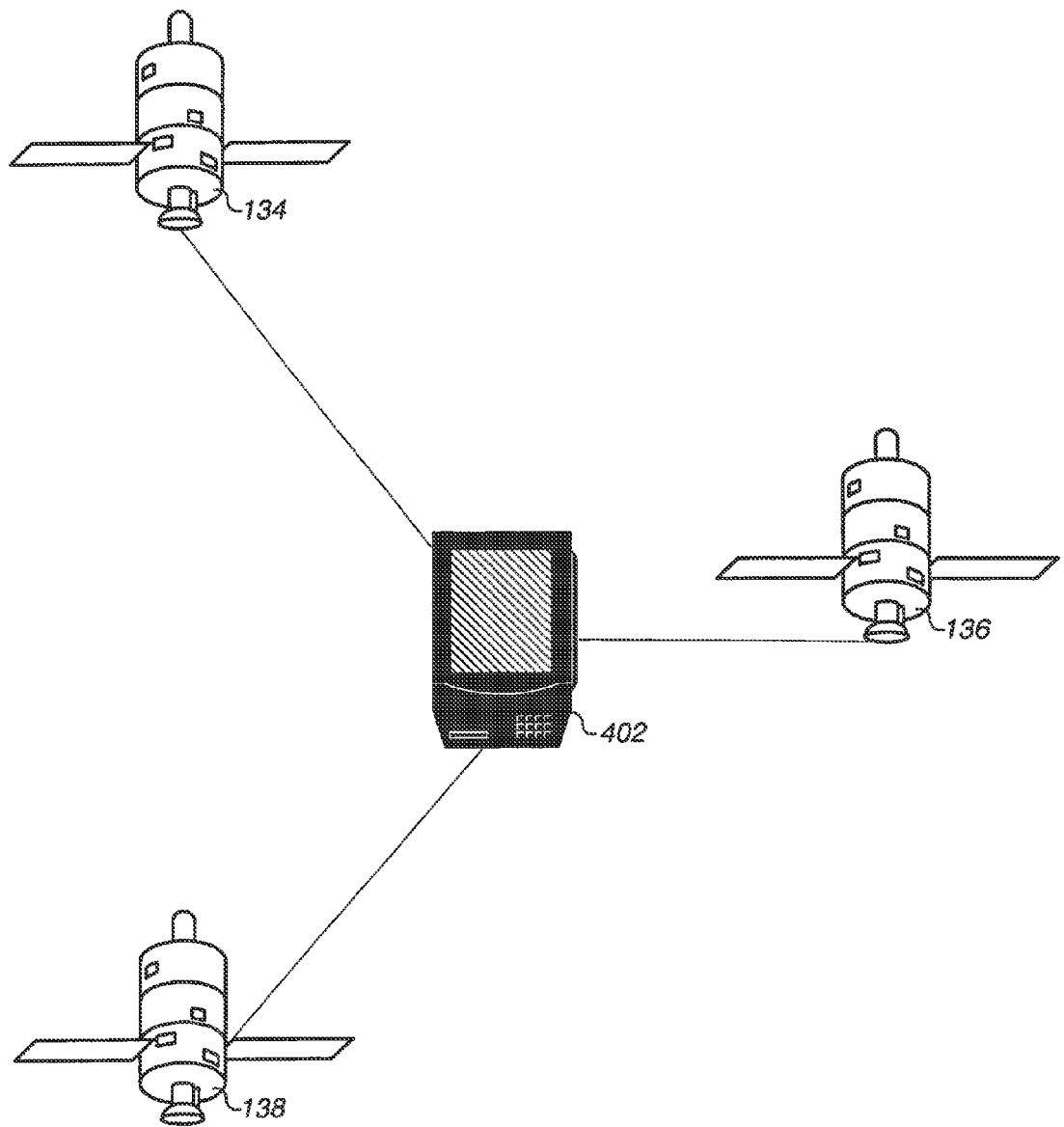
FIG. 4A depicts a locating by triangulation illustration for discussing a GPS, or satellite, embodiment of the present invention.

FIG. 4A depicts a locating by triangulation illustration for discussing a GPS, or satellite, embodiment of the present invention. A RDPS 402 is located through GPS triangulation as is well known in the art. At least three satellites, for example, satellite 134, satellite 136, and satellite 138, are necessary for locating the RDPS. A fourth satellite would be used if altitude was configured for use by the present invention.

Figure 4B:
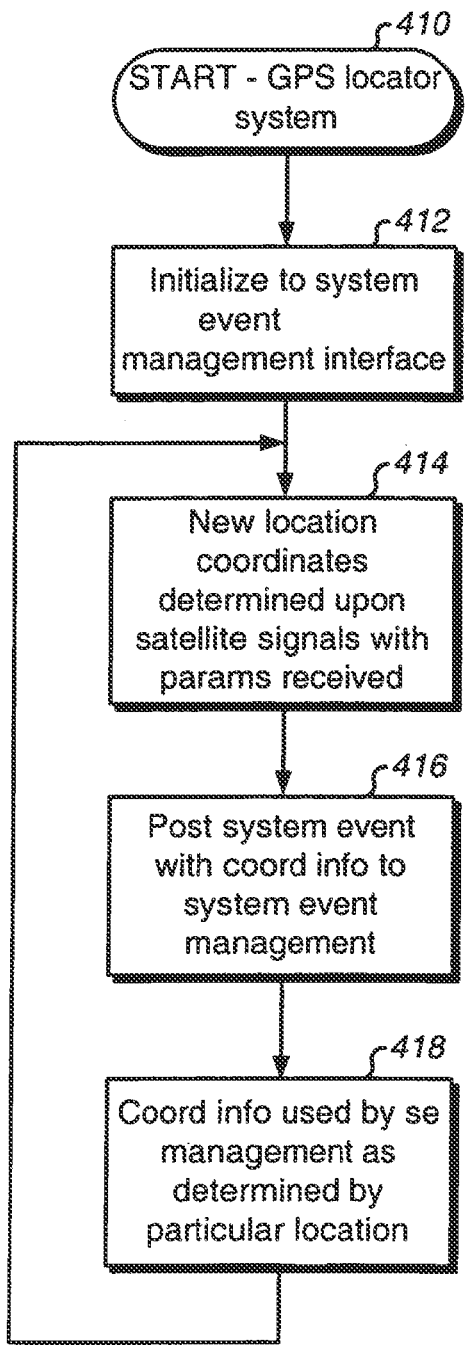
FIG. 4B depicts a flowchart for describing a preferred embodiment of the candidate delivery event generation aspect relevant to a GPS, or satellite, embodiment of the present invention.

FIG. 4B depicts a flowchart for describing a preferred embodiment of the candidate delivery event generation aspect relevant to a GPS, or satellite, embodiment of the present invention. GPS location processing begins at block 410 and continues to block 412 where the RDPS initializes for using a system management interface. The system event manager may be a software interrupt, hardware interrupt, queue, or other event handling entity. Block 414 performs the conventional locating of the GPS enabled RDPS, and block 416 posts (generates) a CADE to the RDPS system event manager. Block 414 may be an implicit wait for pulses from satellites, or an event driven mechanism when GPS satellite pulses are received for synchronized collection. Block 414 processing is well known in the art. Block 416 may post the event information to other processes depending on the RDPS features using such information. Thereafter, the GPS location information is used at block 418 as applicable to the particular RDPS embodiment, for example showing the RDPS location on a graphical map. GPS location processing is continuous for the RDPS as long as the RDPS is enabled.

The CADE in this example is a result of a simple location change. Any further situational location determination task remains for the system event manager. An alternative embodiment to block 414 would further include processing of FIG. 3C blocks 360 through 370 to determine part, or all, (i.e. a subset) of the situational location so that a CADE is generated at block 416 only if the situation warrants it.

Figure 5A:
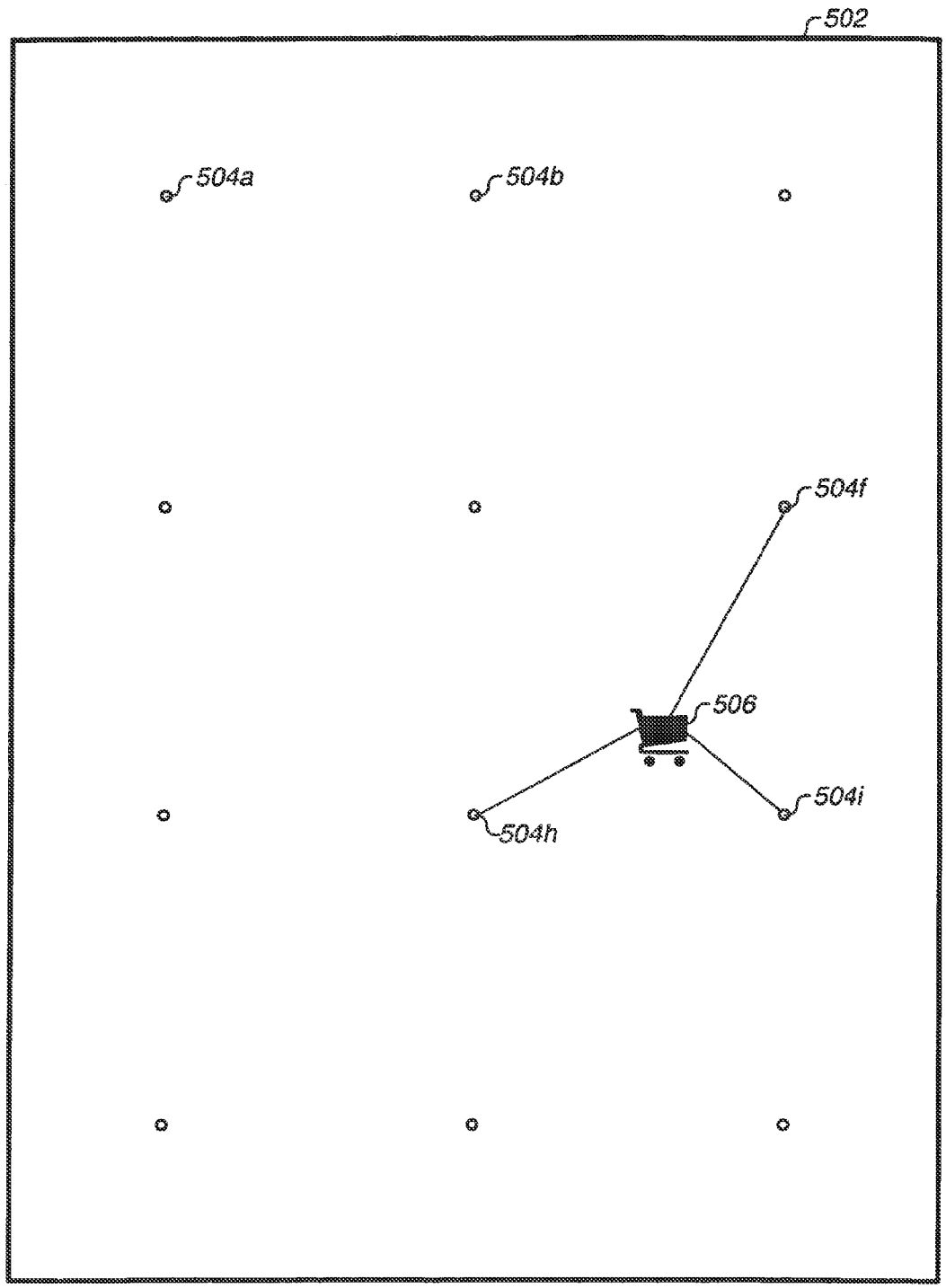
FIG. 5A depicts a locating by triangulation illustration for discussing an indoor wireless embodiment of the present invention.

FIG. 5A depicts a locating by triangulation illustration for discussing an indoor wireless embodiment of the present invention. There may be communication/transmission issues when an RDPS is taken indoors. There are also unique applications of the present invention for indoor use. Shown is a top view of an indoor floor plan 502. Antenna stations 504 (shown generally as 504) are strategically placed over the area so that an RDPS, for example, an RDPS equipped shopping cart 506, can be located. The conventional triangulation techniques again apply. At least three antenna stations, for example, station 504*f*, station 504*h*, and station 504*i* are used to locate the RDPS equipped shopping cart 506. In floor plan embodiments where aisles delimit travel, only two antenna stations may be necessary, for example at either end of the particular aisle. While most stations 504 may receive signals from the RDPS, only the strongest stations are used.

In this example embodiment of using the present invention, a shopper with a grocery cart receives content at the RDPS as the shopping cart is navigated throughout the store. Special deal, sales, or other promotional content is pushed automatically by the present invention to the RDPS of the shopping cart, at appropriate situational locations of the shopping cart. A store representative will manage what content to deliver through convenient configuration of the present invention. The store will provide RDPS equipped shopping carts, or may provide handheld RDPS devices, so that shoppers will get the most of their experience by automatically receiving content that is appropriate to the shopper's situational location in the store.

Figure 5B:
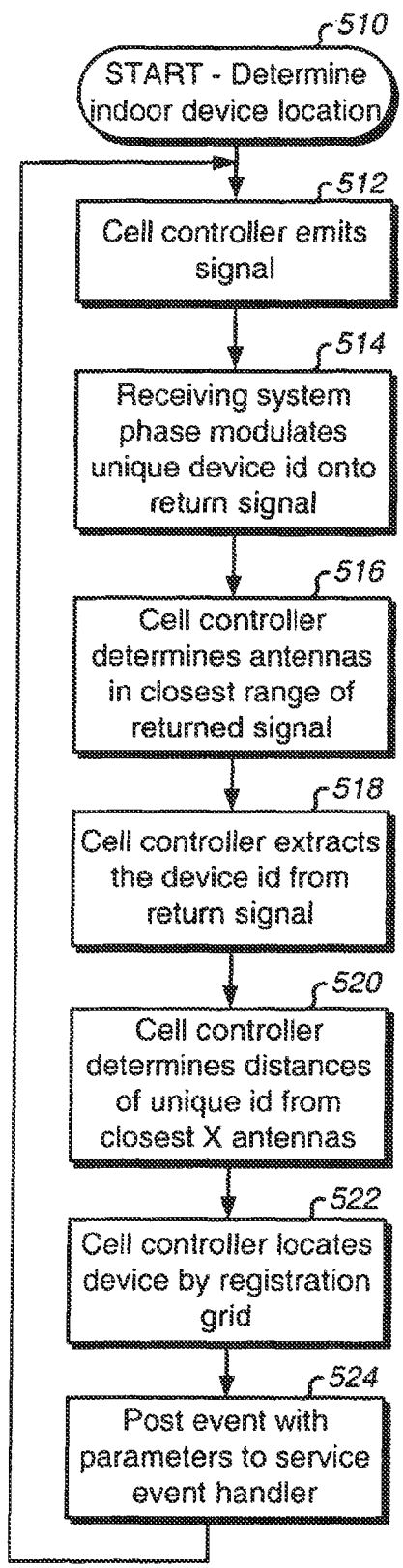
FIG. 5B depicts a flowchart for describing a preferred embodiment of the candidate delivery event generation aspect relevant to an indoor wireless embodiment of the present invention.

FIG. 5B depicts a flowchart for describing a preferred embodiment of the candidate delivery event generation aspect relevant to an indoor wireless embodiment of the present invention. In one embodiment, indoor location technology of Pinpoint corporation (Pinpoint is a trademark of Pinpoint Corporation) is utilized to locate any RDPS that moves about the indoor location. The Pinpoint corporation methodology begins at block 510 and continues to block 512. A cell controller drives antenna stations to emit a broadcast signal from every station. Any RDPS within range (i.e. indoors), will phase modulate its unique identifier onto a return signal it transmits, at block 514. Stations at block 516 receive the transmission and strength of signal. The cell controller that drives stations sorts out and selects the strongest 3 signals. The cell controller, at block 518, also extracts the RDPS unique identifier from the return signal, and TDOA (or AOA if phase array antennas are used) is used to calculate distances from the stations receiving the strongest signals from the RDPS at block 520. The locations of the controller selected stations are registered in an overlay map in an appropriate coordinate system, landmark system, or grid of cells. Block 522 locates the RDPS using the overlay map, locations of the 3 selected stations, and the calculated distances triangulated from the selected stations. Processing through block 522 has located the RDPS with known Pinpoint corporation technology. Thereafter, a block 524 can perform a CADE generation to a SDPS service of the present invention. Processing continues with repeated broadcast at block 512 and subsequent processing for every RDPS.

The CADE in this example is a result of a simple location change. Any further situational location determination task remains for the SDPS event handler. An alternative embodiment to block 524 would further include processing of FIG. 3B blocks 320 through 330 to determine part, or all, (i.e. a subset) of the situational location so that a CADE is generated at block 524 only if the situation warrants it.

Figure 6:
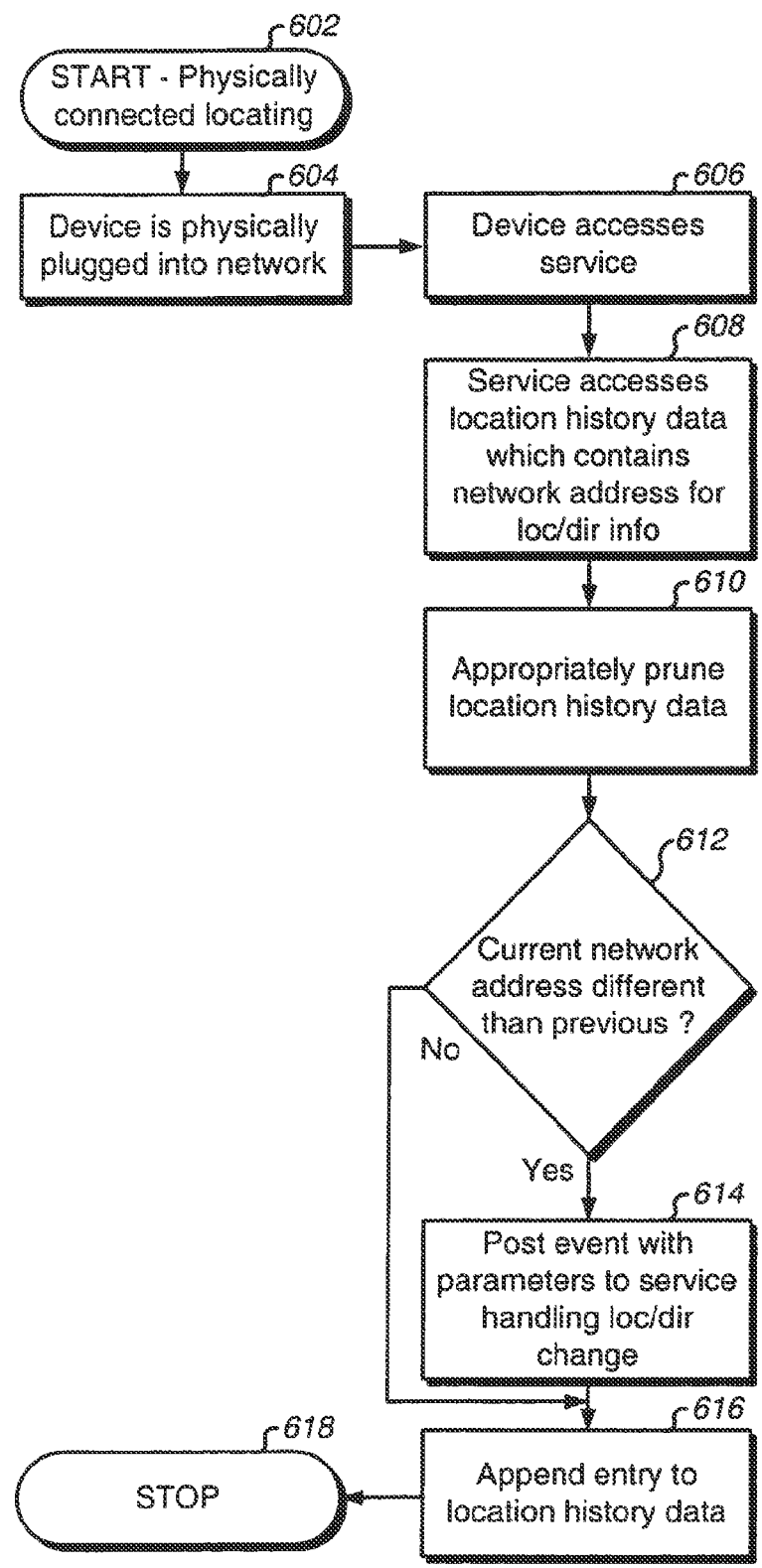
FIG. 6 depicts a flowchart for describing a preferred embodiment of the candidate delivery event generation aspect relevant to a physically connected embodiment of the present invention.

FIG. 6 depicts a flowchart for describing a preferred embodiment of the candidate delivery event generation aspect relevant to a physically connected embodiment of the present invention. A RDPS may be newly located and physically connected, whereby communications between the RDPS and SDPS is over a physical connection. With reference now to FIG. 1, when a RDPS, for example internet protocol telephone 166, is moved from LAN 156 to a LAN 158 in a different location, the present invention detects the location change when the RDPS initiates a communication to the SDPS. With reference back to FIG. 6, relevant processing according to the present invention begins at block 602 and continues to block 604 where an RDPS device is physically connected to a network. Thereafter, the RDPS accesses a SDPS incorporating the present invention, at block 606. Then, at block 608, the SDPS accesses historical RDPS location information (i.e. the previous location history data record 900—see FIG. 9B location history data discussion below), and block 610 performs housekeeping by pruning the location history data maintained for the RDPS by time, number of entries, or other criteria. Block 608 may perform Artificial Intelligence (AI) to determine where the traveler may be going (e.g. using direction based on previous locations) by consulting much or all of the location history data. Thereafter, SDPS processing, at block 612, compares the current network address with the previous network address. If they are identical, then SDPS processing continues to block 616. If they are different, then the SDPS generates a CADE to the event handling service of the SDPS at block 614. Thereafter, SDPS processing continues to block 616. Block 616 appends an entry to the location history data for the RDPS, and SDPS processing ends at block 618. Block 612 may compare to other location history data information, depending on any AI of block 608.

Figure 7A:
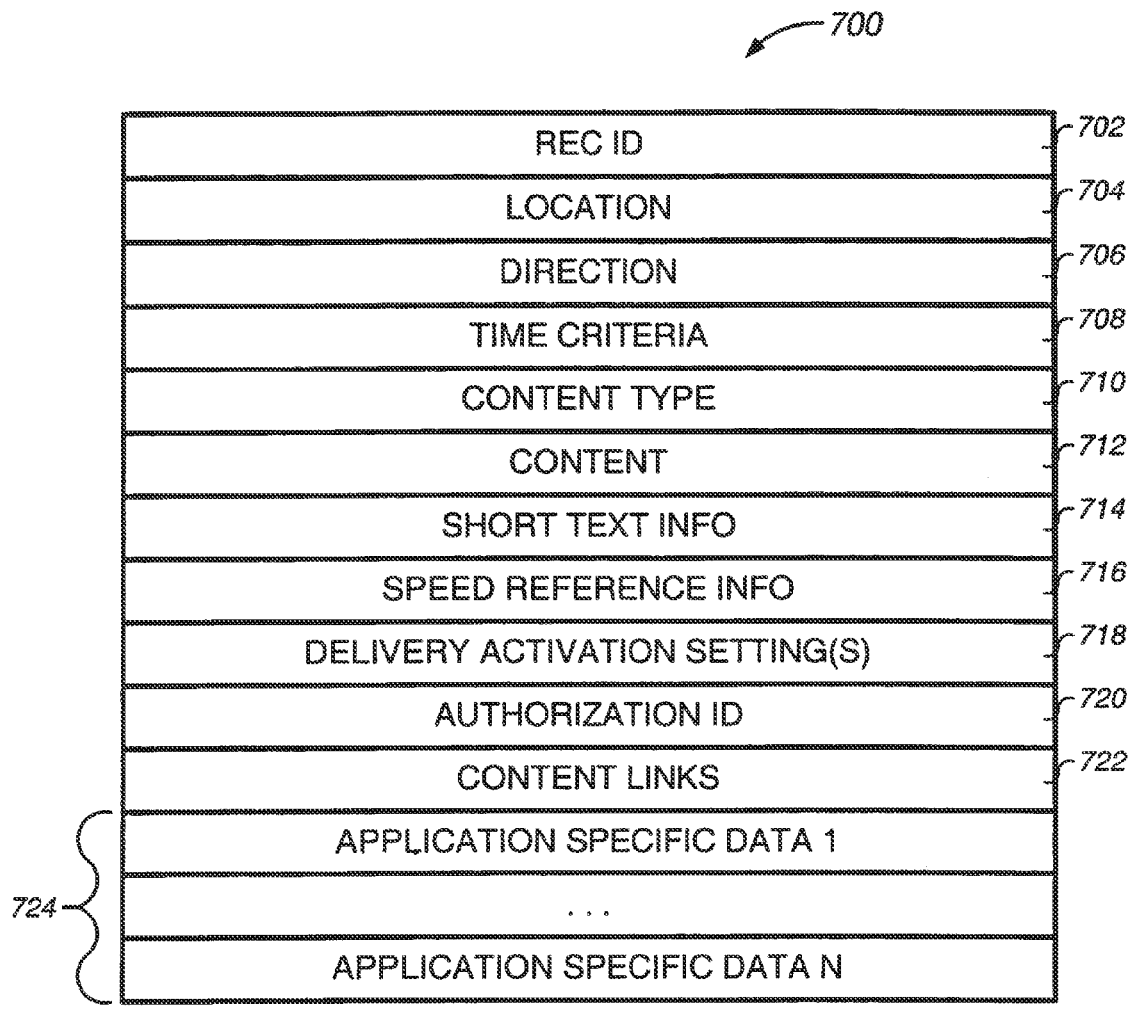
FIG. 7A depicts a preferred embodiment of a data record in the deliverable content database of the present invention.

FIG. 7A depicts a preferred embodiment of a data record in the deliverable content database of the present invention. A deliverable content database record 700 includes fields 702 through 724 as shown. Rec id field 702 is a unique identifier to the record in the database. Rec id field 702 is system generated, for example, using an Oracle unique sequence number function (Oracle is a trademark of Oracle corporation) upon inserting the record (i.e. database row) into the deliverable content database (i.e. database table). The rec id field 702 is used in the transmission history data to correlate transmitted content, enables detection of redundant delivery, and enables later RDPS retrieval of content when only a content delivery indicator is transmitted to an RDPS. Location field 704 contains a positional attribute of location information for which the associated content will be delivered. Depending on the installation, the location field contains a cellular network cell identifier, truncated precision geocentric coordinates, truncated precision geodetic coordinates, truncated three dimensional space coordinates, area described by GPS coordinates (e.g. four corners of a grid rectangle), overlay grid region identifier or coordinates, GPS coordinates with truncated precision, altitude, MAPSCO reference, telephone number (e.g. caller id), physical or logical network address (including a wildcard (e.g. ip addresses 145.32.*.*)), particular application address, or a like location. Truncated precision allows specifying a broader scope, for example, latitude/longitude in degrees, minutes, seconds, etc., depends on how the number is truncated. Zooming in implies more precision. Zooming out implies less precision. Combinations of these positional attributes may also designate a location. Depending on the installation, the positional attribute direction field 706 contains a direction such as North, South, East, West, or Southwest, Southeast, Northwest, Northeast, or Left, Right, Straight, Back, or Up, Down, or the like. A value of null may also be present when a direction is inappropriate, for example in one embodiment of FIG. 6. Time criteria field 708 contains a time window(s), or time interval(s), for which the associated deliverable content is valid for delivery. Preferably, time points of time criteria are entered in "YYYYMMDDHHMMSS" format. Content type field 710 describes the type of content field 712. Content types include, and are not limited to, web address, audio, image, multimedia, text, and video. The content field 712 contains the deliverable content, or a reference such as a filename, pointer, or the like, to the content. Short Text info field 714 allows configuration of a short textual message to be delivered to the RDPS and maintained in the RDPS transmission history data, for example, a business address. Speed reference info 716 is a web address or phone number that is delivered to the RDPS with the content, and is also maintained in the RDPS transmission history for convenient invocation. Thus, the user may browse the history, and invoke the speed reference for automatic telephone call dialing from the RDPS, or for automatic web address transposition in a launched web browser, upon a simple user selection of the speed reference from the history. Depending on the installation, delivery activation setting(s) field 718 will contain a bit mask, or the like, for the RDPS state which establishes delivery. For example, the bit mask will contain a settable bit for:

Deliver on RDPS registration

Deliver on RDPS termination

Deliver only when RDPS requests

Deliver always (used for emergency use—see Amber-Alert discussion above)

Deliver for situational location change 3 or more bits reserved for future use

Authorization id field 720 contains a handle to the user who configured the database record 700, for example, a password, user identifier, or the like (may be encrypted). Content links field 722 contains a YES/NO flag for whether there are multiple content fields associated with the database record 700. A separate database entity (not shown), for example a database table, can be maintained with 3 fields: one containing a matching rec id field 702 to associate the content to the deliverable content database record 700, one for the content type (like content type field 710), and one for the content (like content field 712). There may be a plurality of database records in the separate database entity that are associated with the deliverable content database record 700. The value in the rec id field 702 will be used to join all content items.

Applications specific data fields 724 are available for the SDPS being an integrated solution with some other service. Location field 704, direction field 706, time criteria field 708, and delivery activation setting(s) field 718 together form the situational location information associated with the content which establishes a delivery.

Figure 7B:
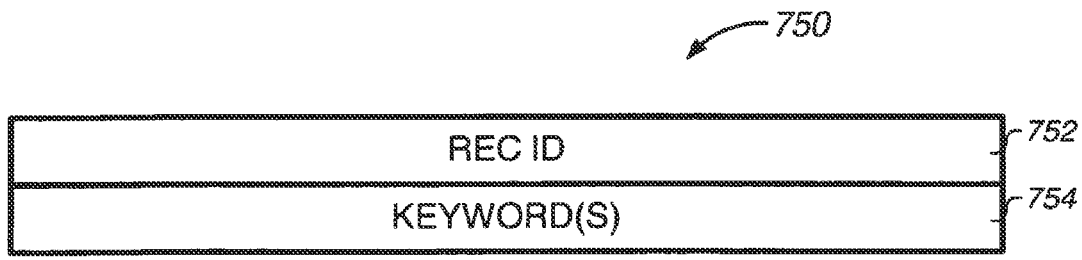
FIG. 7B depicts a preferred embodiment of a data record in the keyword data of the present invention.

FIG. 7B depicts a preferred embodiment of a data record in the keyword data of the present invention. A keyword data record 750 is joined to a deliverable content database record 700 through a matching rec id field 752. Keywords field 754 contains one or more comma separated text strings used to associate criteria to the deliverable content database record 700. Phrases containing blank separated words are enclosed in quote marks. In one embodiment of the present invention, a RDPS user specifies interests that are matched to the keywords field 754. Only the user's interests, along with the RDPS situational location, will cause delivery of associated content. An alternative embodiment for maintaining keyword data will associate a plurality of keyword data records 750 to a deliverable content database record 700, each containing a singular keyword, or phrase, in keywords field 754. Fields 704, 706, 708, 718, and 754 are system delivery constraints of the present invention.

Figure 8:
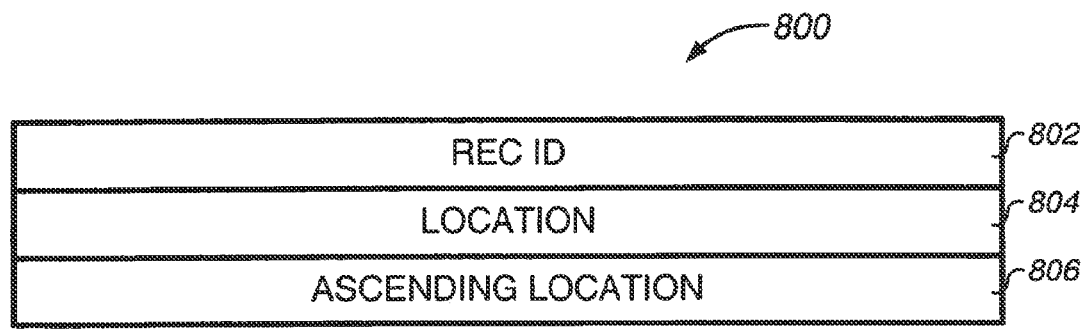
FIG. 8 depicts a preferred embodiment of a data record in the location hierarcky data of the present invention.

FIG. 8 depicts a preferred embodiment of a data record in the location hierarchy data of the present invention. A location hierarchy data record 800 has fields as shown. Rec id field 802 is a unique identifier to the record. Rec id field 802 is system generated, for example, using an Oracle unique sequence number function upon inserting the record (i.e. database row). Location field 804 is a location of the nature as described for location field 704. Ascending location field 706 is a value found in rec id field 802 of another location hierarchy data record 800. If used, the configuration of this table must be performed carefully so as to affect its use appropriately. Semantically, field 806 must be an ascending location to field 804. For example, Texas is ascending to Denton County, and Denton County is ascending to Flower Mound. Ascending implies zooming out to cover more surrounding area. Location hierarchy data is searched in the following manner:

For content by candidate delivery events, content is retrieved by the location, and any locations descending to that location (i.e. zoom in)

For situational location queries, content is optionally retrieved by the location and descending locations, and optionally, ascending locations as necessary (i.e. zoom out) according to parameters (discussed below)

Figure 9A:
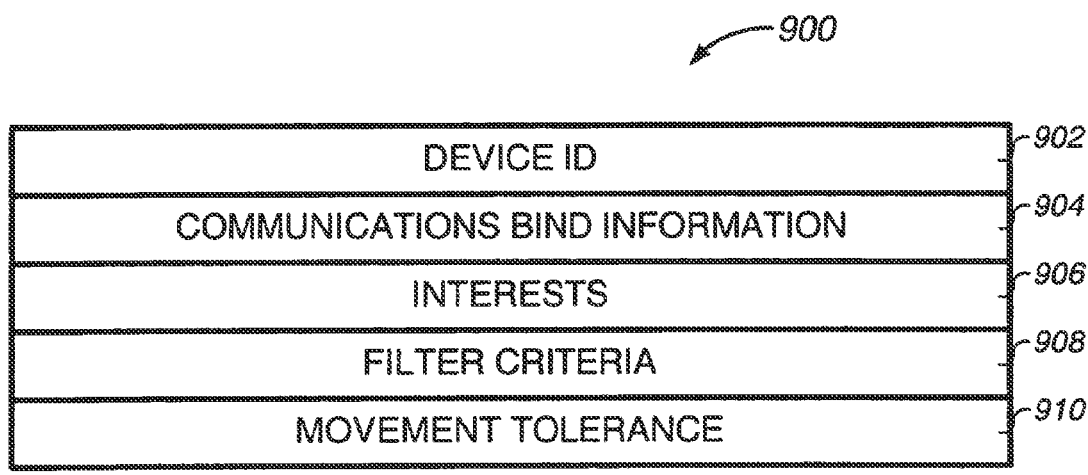
FIG. 9A depicts a preferred embodiment of a data record in the registration data of the present invention.

FIG. 9A depicts a preferred embodiment of a data record in the registration data of the present invention. A registration data record 900 is maintained by the SDPS and includes fields as shown. Device id field 902 is a unique handle to an RDPS. Depending on the installation, device id field 902 may be a telephone #, physical or logical address, or some other unique handle to the RDPS. Communications bind information field 904 is a record describing the communications session between the RDPS and SDPS, as is well known in the art. In some embodiments, field 904 contains capability information sent from the RDPS so that only the appropriate content is delivered, for example acceptable types of, or acceptable amounts (size) of, content. Interests field 906 contains one or more comma separated user configured text strings used to match to the keywords field 754. If used, only the user's interests, along with the RDPS situational location, will cause proactive delivery of associated content. Filter criteria field 908 is identical in nature to interests field 906 and keywords field 754 except the criteria is for exclusion. If used, filter criteria field 908 is also compared with keywords field 754. Thus, the RDPS user can configure interests for inclusion through field 906, or criteria for exclusion through field 908. Movement tolerance field 910 defines the minimal amount of movement since the last delivery content retrieval attempt that determines to perform another retrieval. Movement tolerance field 910 is optional depending on the installation. The movement tolerance may be a system wide setting enforced by the SDPS, associated to a class of RDPS devices, or individualized by the user or system. Field 910 may not be present because the movement tolerance is maintained by the RDPS, or is not applicable to the installation (e.g. RDPS physically connected, or located by caller id). The movement tolerance depends on the installed use of location field 704. For example, in a coordinate system, a distance may be configured. In an overlay map, region, or cell change, a number of regions or cells from a previous location may be configured. Fields 906 and 908 are user configured delivery constraints of the present invention. Registration data record 900 presence enables delivery to the associated RDPS, otherwise the RDPS is not an eligible receiver. Obvious error handling at the SDPS ignores all requests that are not from a RDPS with a device id in the registration data (except for registration types of requests (i.e. events)).

Figure 9B:
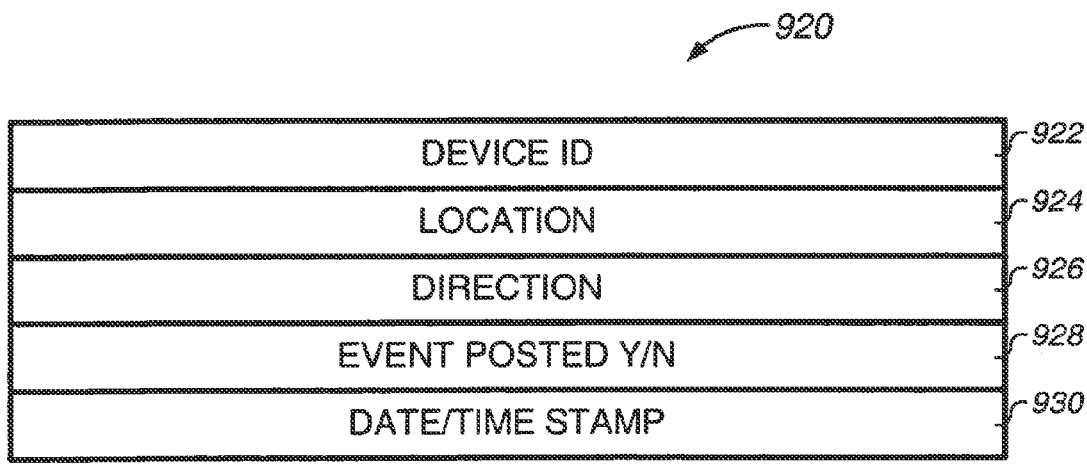
FIG. 9B depicts a preferred embodiment of a data record in the location history data of the present invention.

FIG. 9B depicts a preferred embodiment of a data record in the location history data of the present invention. A location history data record 920 is maintained for the travels of a RDPS, and includes fields as shown. Device id field 922 is identical in nature to device id field 902. Location field 924 is identical in nature to location field 704. Direction field 926 is identical in nature to direction field 706. Event posted field 928 is a YES/NO flag for whether or not this location history data record 920 is associated with generating a CADE. Date/time stamp field 930 is the time that the RDPS was detected at the associated location and specified direction of fields 924 and 926. Direction field 926 is optional depending on the installation, as discussed above.

Figure 9C:
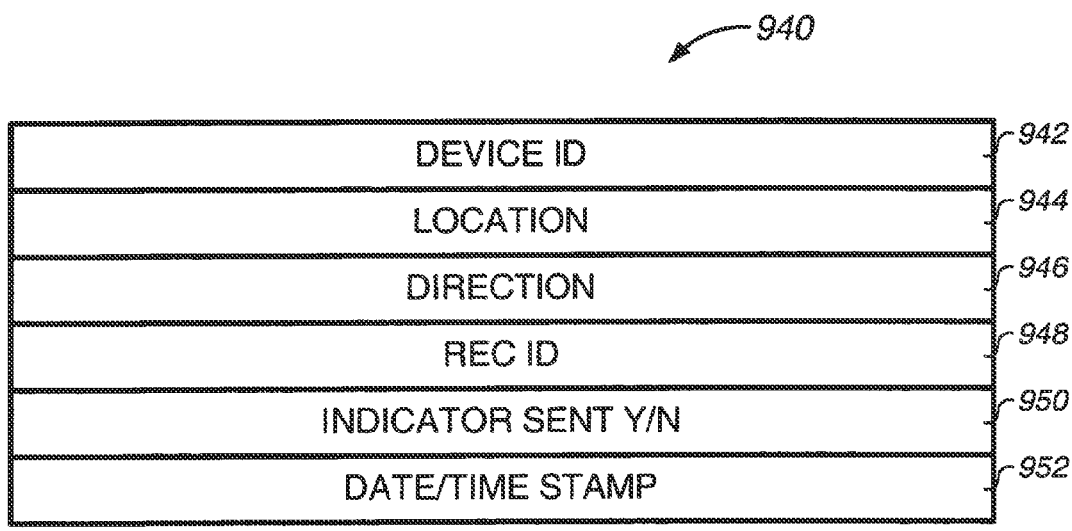
FIG. 9C depicts a preferred embodiment of a data record in the SDPS transmission history data of the present invention.

FIG. 9C depicts a preferred embodiment of a data record in the SDPS transmission history data of the present invention. A transmission history data record 940 is maintained at the SDPS for all content that is transmitted to the RDPS, and includes fields as shown. Device id field 942 is identical in nature to device id field 902. Location field 944 is identical in nature to location field 704. Direction field 946 is identical in nature to direction field 706. Rec id field 948 contains a copy of rec id field 702 for content that was transmitted to the RDPS of field 942. Indicator sent field 950 is a YES/NO flag for whether or not the content was actually transmitted, or a content delivery indicator for the content was transmitted. Date/time stamp field 952 is the time that content described by field 948 was transmitted to the RDPS. Direction field 946 is optional depending on the installation, as discussed above.

Figure 9D:
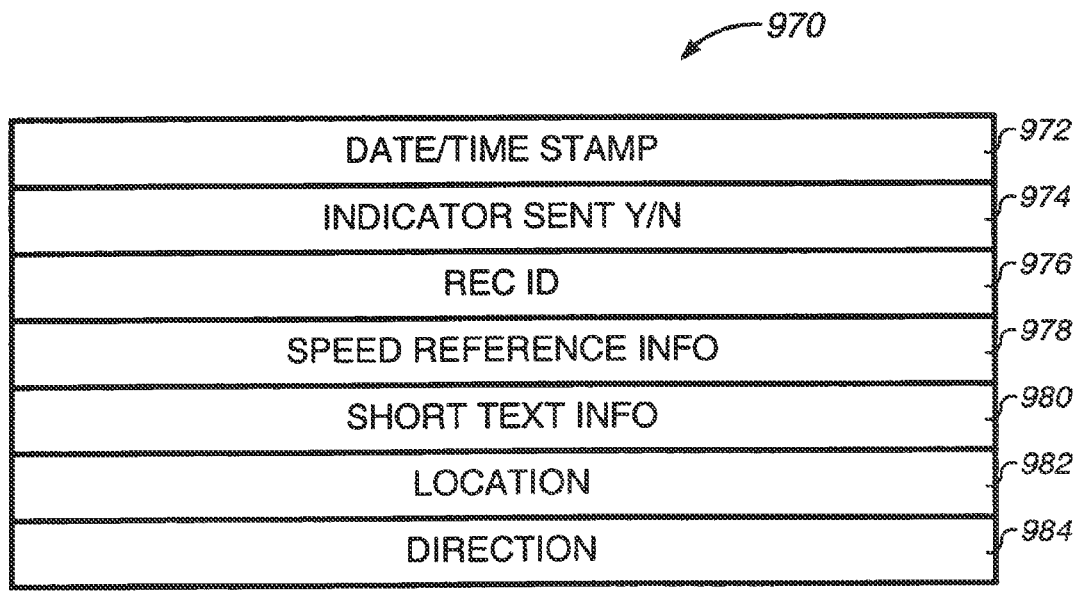
FIG. 9D depicts a preferred embodiment of a data record in the RDPS transmission history data of the present invention.

FIG. 9D depicts a preferred embodiment of a data record in the RDPS transmission history data of the present invention. A transmission history data record 970 is maintained at the RDPS for all content that is received by the RDPS, and includes fields as shown. Date/time stamp field 972 is the time that content described by rec id field 976 was received by the RDPS. Indicator sent field 974 is a YES/NO flag for whether or not the content was actually received, or an indicator for the content was received. Rec id field 976 contains a copy of rec id field 702 for content that was received by the RDPS. Speed reference information field 978 contains a phone number for automatic dialing, a web page reference for automatic transposition, or both. Speed reference information field 978 is obtained by the RDPS from field 716. Short text field 980 is obtained by the RDPS from 714. Location field 982 is identical in nature to field 704. Direction field 984 is identical in nature to field 706. Field 982 and 984 may not be used if this information is maintained at the SDPS. Fields 982 and 984 are preferably used when the RDPS handles CADE generation, or if the SDPS additionally transmits the information with the content. Direction field 984 is optional depending on the installation, as discussed above.

Figure 10A:
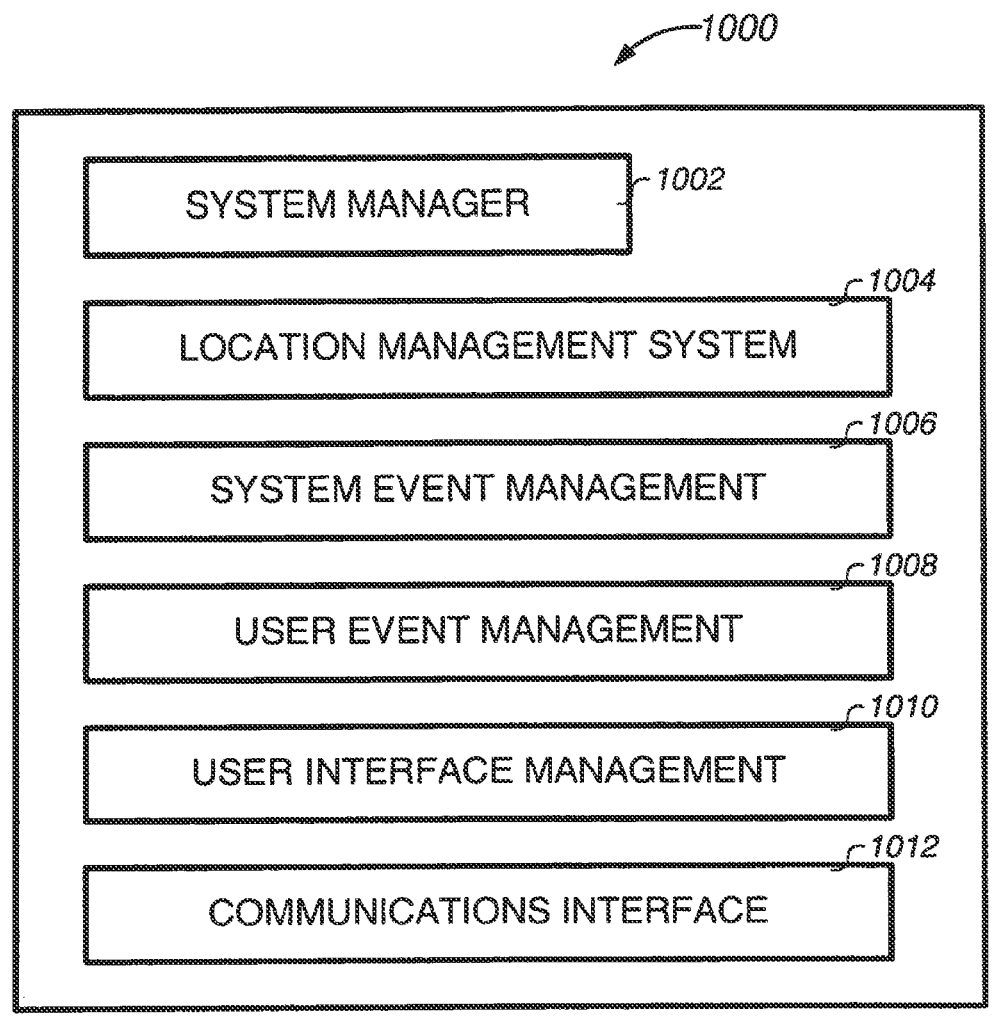
FIG. 10A depicts a preferred embodiment high level example componentization of a RDPS of the present invention when the RDPS generates the candidate delivery event.

FIG. 10A depicts a preferred embodiment high level example componentization of a RDPS of the present invention when the RDPS generates the candidate delivery event. An RDPS 1000 includes system manager 1002, location management system 1004, system event management 1006, user event management 1008, user interface management 1010, and communications interface 1012. System manager 1002 is the operating system environment of the RDPS 1000. Location management system 1004 provides means for locating the RDPS 1000, for example GPS functionality. System event management 1006 provides an interface to system event processing relevant to the present invention that is not directly caused by a user. User event management 1008 provides an interface to event processing relevant to the present invention that is directly caused by a user, for example when the user uses the RDPS user interface. User interface management 1010 is the user interface system environment of the RDPS 1000, for example, a variety of Microsoft Windows (Microsoft and Windows are trademarks of Microsoft corporation), a wireless phone interface, or some other user interface system. Communications interface 1012 provides the interface between the RDPS 1000 and the SDPS.

Figure 10B:
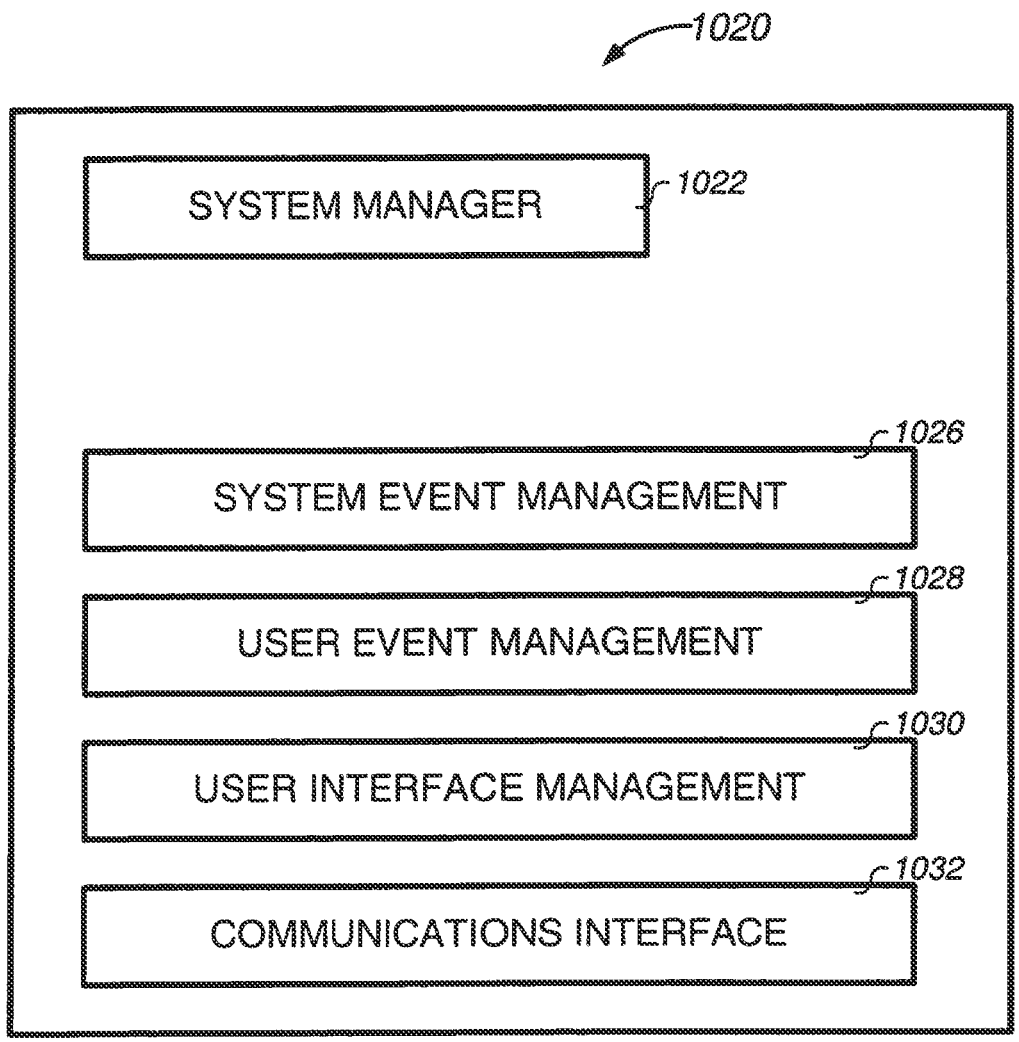
FIG. 10B depicts a preferred embodiment high level example componentization of a RDPS of the present invention when the SDPS generates the candidate delivery event.

FIG. 10B depicts a preferred embodiment high level example componentization of a RDPS of the present invention when the SDPS generates the candidate delivery event. An RDPS 1020 includes a system manager 1022, system event management 1026, user event management 1028, user interface management 1030, and communications interface 1032. System manager 1022 is the operating system environment of the RDPS 1020. System event management 1026 provides an interface to system event processing relevant to the present invention that is not directly caused by a user. User event management 1028 provides an interface to event processing relevant to the present invention that is directly caused by a user, for example when the user uses the RDPS user interface. User interface management 1030 is the user interface system environment of the RDPS 1020, for example, a variety of Microsoft Windows (Microsoft and Windows are trademarks of Microsoft corporation), a wireless phone interface, or some other user interface system. Communications interface 1032 provides the interface between the RDPS 1020 and the SDPS. RDPS 1000 and RDPS 1020 may further include a local cache with a cache management component that facilitates cacheing the deliverable content database and associated data at the RDPS for efficient access.

Figure 10C:
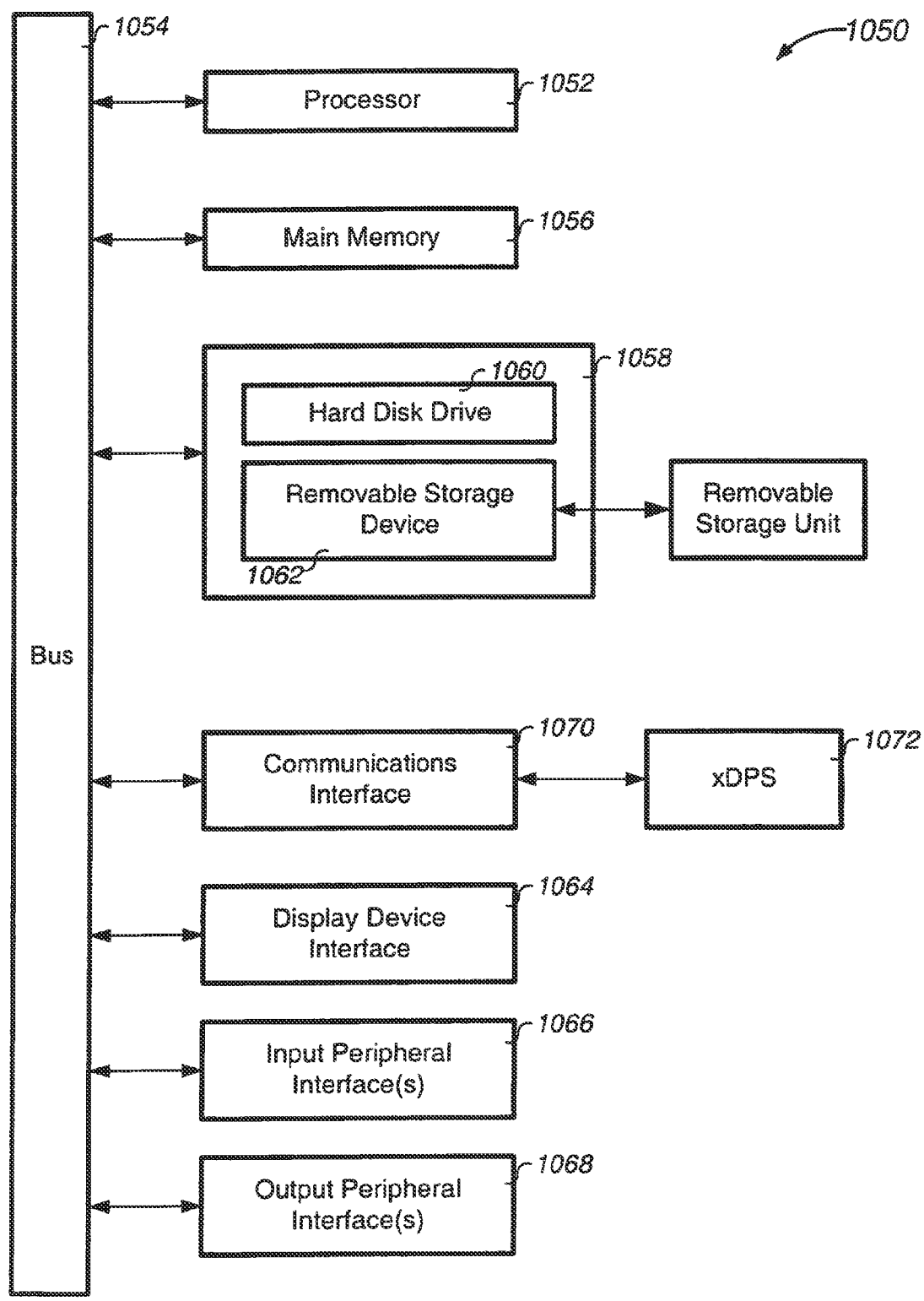
FIG. 10C depicts a block diagram of a data processing system useful for implementing RDPS aspects of the present invention, and SDPS aspects of the present invention.

FIG. 10C depicts a block diagram of a data processing system useful for implementing RDPS aspects of the present invention, and SDPS aspects of the present invention. A data processing system 1050 according to the present invention includes at least one processor 1052 coupled to a bus 1054. The data processing system 1050 also includes main memory 1056, for example, random access memory (RAM). Optionally, the data processing system 1050 may include secondary storage devices 1058 such as a hard disk drive 1060, and/or removable storage device 1062 such as a compact disk, floppy diskette, or the like, also connected to bus 1054. In one embodiment, secondary storage devices could be remote to the data processing system 1050 and coupled through an appropriate communications interface.

The data processing system 1050 may also include a display device interface 1064 for driving a connected display device (not shown). The data processing system 1050 may further include one or more input peripheral interface(s) 1066 to input devices such as a keyboard, telephone keypad, Personal Digital Assistant (PDA) writing implements, mouse, voice interface, or the like. User input (i.e. user events) to the data processing system are inputs accepted by the input peripheral interface(s) 1066. The data processing system 1050 may still further include one or more output peripheral interface(s) 1068 to output devices such as a printer, facsimile device, or the like.

Data processing system 1050 will include a communications interface 1070 for communicating to another data processing system 1072 via analog signal waves, digital signal waves, infrared proximity, copper wire, optical fiber, or the like. Other data processing system 1072 is an RDPS when data processing system 1050 is an SDPS. Other processing system 1072 is an SDPS when data processing system 1050 is an RDPS. In any case, the RDPS and SDPS are said to be interoperating when communicating. Thus, the RDPS and SDPS form an interoperating communications system between which data may be communicated.

Data processing system programs (also called control logic) may be completely inherent in the processor 1052 being a customized semiconductor, or may be stored in main memory 1056 for execution by processor 1052 as the result of a read-only memory (ROM) load (not shown), or may be loaded from a secondary storage device into main memory 1056 for execution by processor 1052. Such programs, when executed, enable the data processing system 1050 to perform features of the present invention as discussed herein. Accordingly, such data processing system programs represent controllers of the data processing system.

In one embodiment, the invention is directed to a control logic program product comprising a processor 1052 readable medium having control logic (software) stored therein. The control logic, when executed by processor 1052, causes the processor 1052 to perform functions of the invention as described herein.

In another embodiment, the invention is implemented primarily in hardware, for example, using a prefabricated component state machine (or multiple state machines) in a semiconductor element such as processor 1052.

Those skilled in the art will appreciate various modifications to the data processing system 1050 without departing from the spirit and scope of the invention. Data processing system 1050, as discussed, is representative of a RDPS of the present invention. Data processing system 1050, as discussed, is representative of a SDPS of the present invention.

Receiving Data Processing System

Candidate Delivery Event Generation Embodiment

Figure 11:
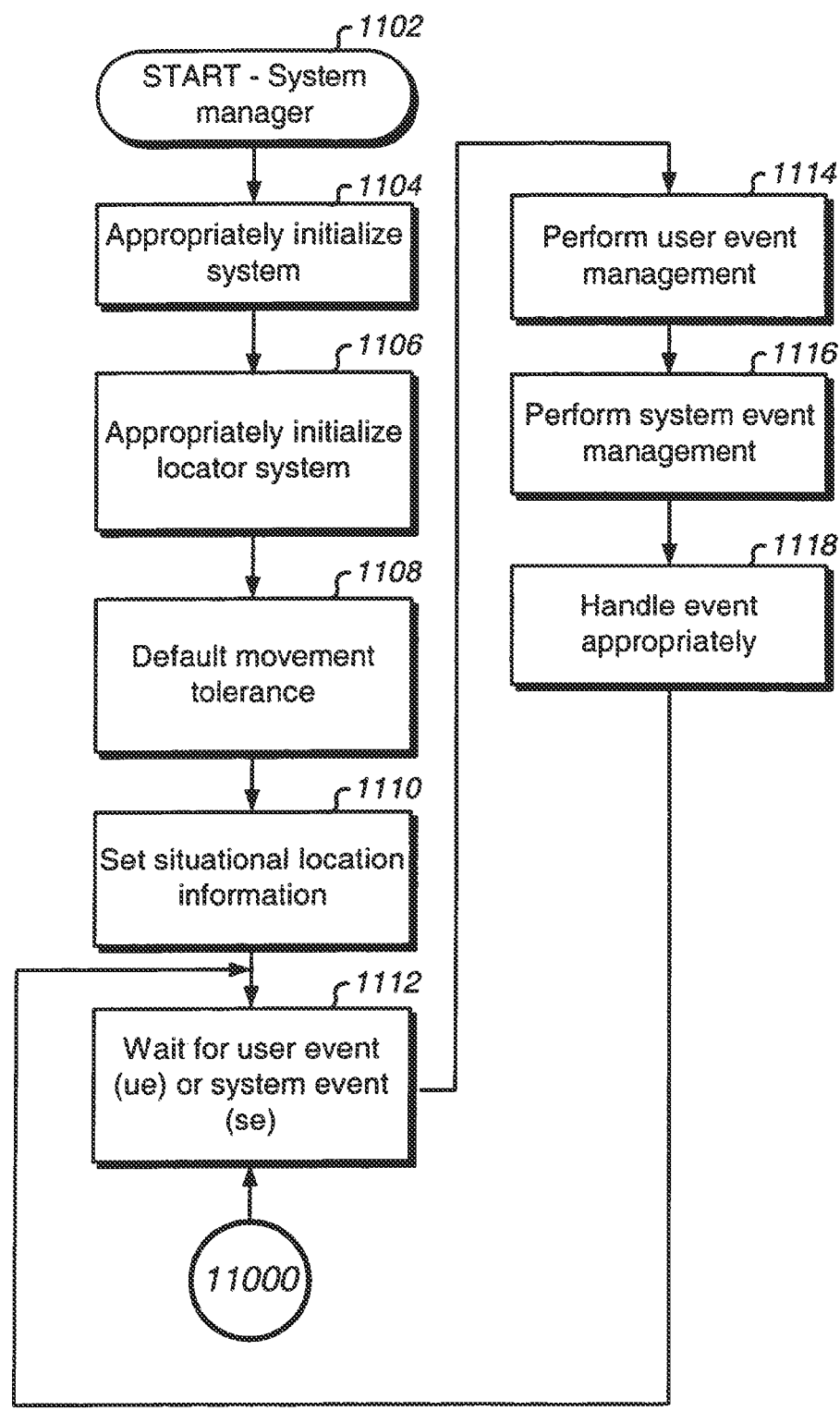
FIG. 11 depicts a flowchart for describing data processing system aspects relevant to a preferred embodiment of the RDPS of the present invention, in the context of candidate delivery event determination by the RDPS.

FIG. 11 depicts a flowchart for describing data processing system aspects relevant to a preferred embodiment of the RDPS of the present invention, in the context of candidate delivery event generation by the RDPS. When the RDPS is enabled, for example, by a power switch, system manager processing begins at block 1102 and continues to block 1104 where the system appropriately initializes, for example to default interfaces. Processing continues to block 1106 where the location management system is initialized as is appropriate for the particular RDPS, and then on to block 1108 where a movement tolerance is defaulted, depending on the RDPS installation, and depending on what it was during the last power-on. The movement tolerance may be user configurable or system set, and is therefore either a system delivery constraint, or user configured delivery constraint. Thereafter, block 1110 defaults situational location information to the most recent setting for a CADE from last power-on, or system just started if this is the first power-on, and block 1112 waits for a user event or system event. User interface management is coupled with the system manager to enable a user to the RDPS. Upon detection of an event, block 1112 flows to block 1114 for any user event management processing. Should block 1114 processing return, block 1116 performs any system event management processing. Should processing of block 1116 return, block 1118 handles the event appropriately as is relevant for other events of the RDPS, for example, user interface control of little interest to discussion of the present invention. Thereafter, block 1118 flows to block 1112 for processing as described.

An alternate embodiment of FIG. 11 will implement a multithreaded system wherein events are handled asynchronously as they occur.

Figure 12A:
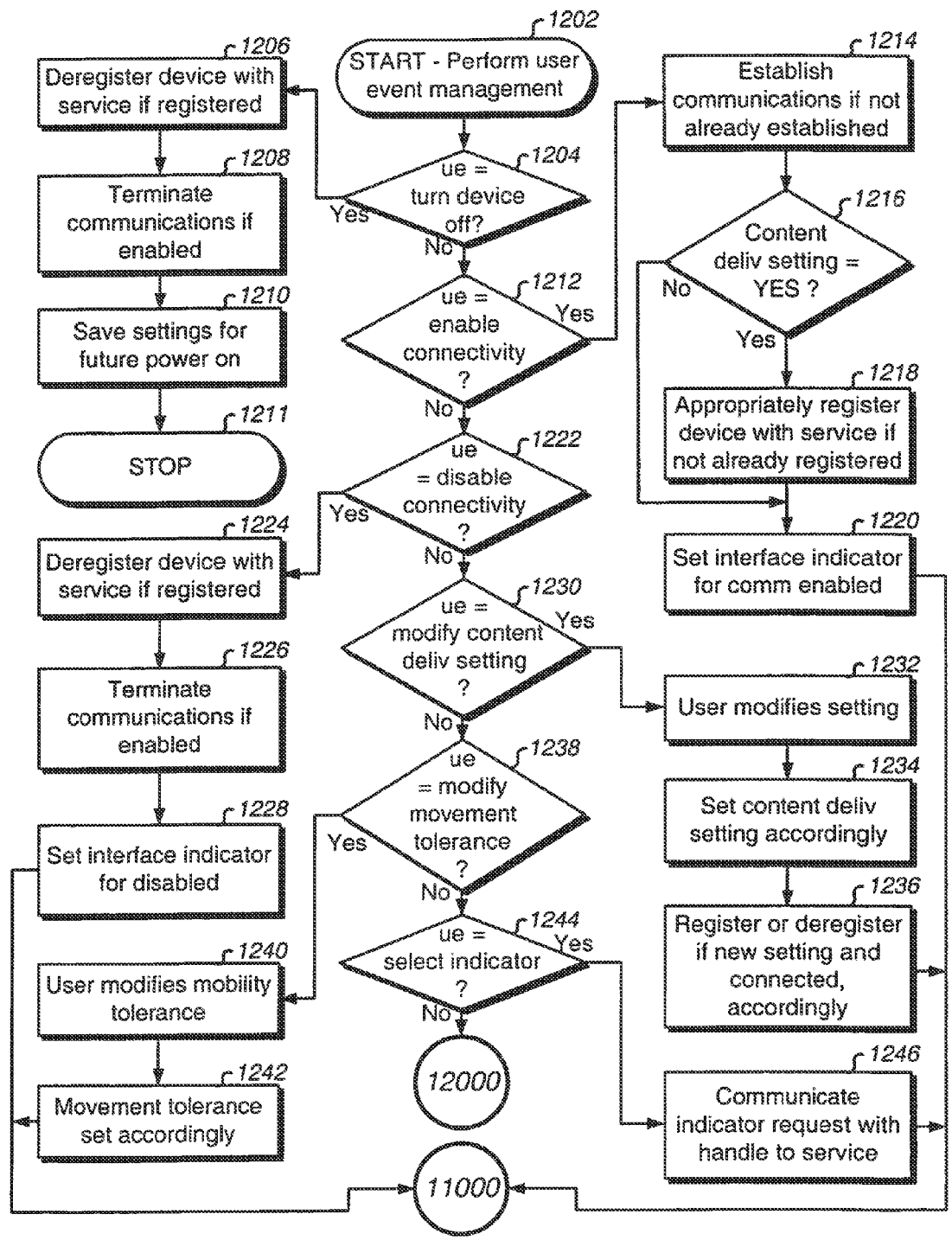
FIGS. 12A and 12B depict flowcharts for describing user event management processing aspects of a preferred embodiment of the RDPS of the present invention, in the context of candidate delivery event determination by the RDPS.
Figure 12B:
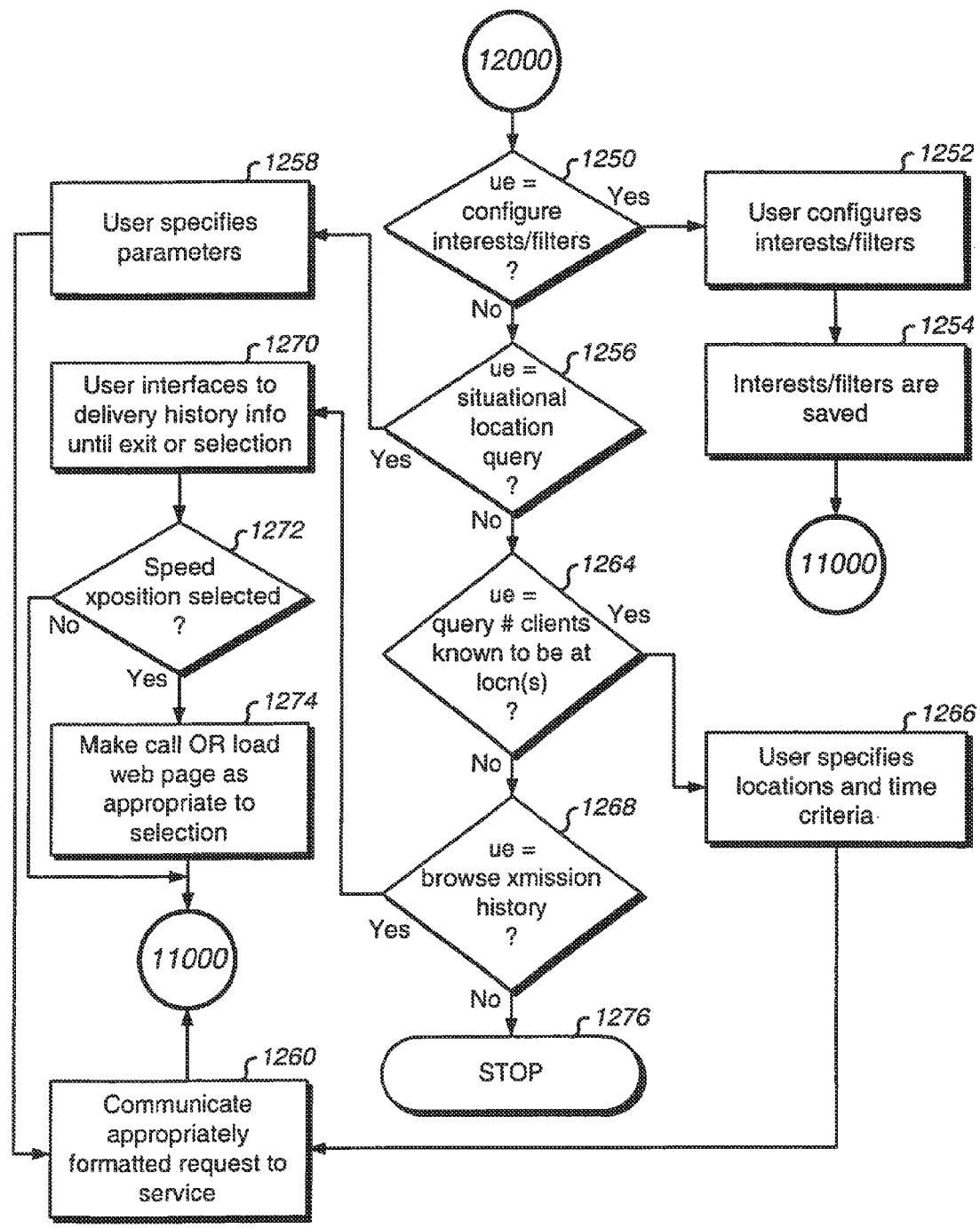

FIGS. 12A and 12B depict flowcharts for describing user event management processing aspects of a preferred embodiment of the RDPS of the present invention, in the context of candidate delivery event generation by the RDPS. User event management begins at block 1202 and continues to block 1204. If block 1204 determines that the user event is powering the RDPS off, then block 1206 communicates with the SDPS to remove (if any) its RDPS data record 900 from the registration data, block 1208 terminates any communication session gracefully (if required) depending on the RDPS, block 1210 saves settings, for example, the movement tolerance and delivery setting for the next power on, and RDPS processing stops at block 1211.

If block 1204 determines the RDPS was not turned off, then processing continues to block 1212. If block 1212 determines that the user selected to enable communications with the SDPS, then block 1214 establishes communications with the SDPS (if not already established), and block 1216 consults the current delivery setting. In one embodiment, block 1214 through 1220 may be processed just as the result of a wireless device being powered on. If block 1216 determines that the content delivery setting for receiving situational location dependent content is enabled, then block 1218 communicates with the SDPS for inserting a registry data record 900 into the registry data. Thereafter, block 1220 sets a RDPS user interface indicator showing that communications to the SDPS is enabled, and processing returns to block 1112 of FIG. 11 by way of off page connector 11000. If block 1216 determines the delivery setting is not enabled, then processing continues to block 1220.

If block 1212 determines that the user did not select to enable communications to the SDPS, then processing continues to block 1222. If block 1222 determines that the user selected to disable SDPS communications, then block 1224 communicates with the SDPS to remove its registry data record 900 from registry data, block 1226 terminates the communications session gracefully (if required) depending on the RDPS embodiment, block 1228 sets the communications to SDPS user interface indicator to disabled, and processing continues back to block 1112. In one embodiment, block 1224 through 1228 may be processed just as the result of a wireless device being powered off.

If block 1222 determines the user did not select to disable communications to the SDPS, then processing continues to block 1230. If block 1230 determines that the user selected to modify the RDPS content delivery setting, then the user modifies the setting at block 1232, the delivery setting is set accordingly at block 1234. Preferably, blocks 1230/1232 allow a user to toggle the content delivery setting. No content will be delivered when this setting is disabled. Being registered with the SDPS constitutes being eligible for delivery. Alternative embodiments won't have such a feature. The content delivery setting is a user configured delivery constraint. Block 1234 also sets and an indicator in the user interface for displaying that setting, and block 1236 communicates with the SDPS to insert or remove its registry data record 900 should the setting be different than previous. Of course, appropriate error handling is performed by block 1236 if there is no communications enabled. Thereafter, processing continues to block 1112.

If block 1230 determines that the user did not select to modify the content delivery setting, then processing continues to block 1238. If block 1238 determines that the user selected to modify the movement tolerance, then the user modifies a validated movement tolerance at block 1240, the movement tolerance is set at block 1242, and processing continues back to block 1112.

If block 1238 determines that the user did not select to modify the movement tolerance, then processing continues to block 1244. If block 1244 determines that the user selected a content delivery indicator, as maintained in a transmission history data record 970 for deliverable content from the SDPS, then block 1246 communicates with the SDPS using the rec id field 976. In one embodiment, the user peruses the transmission history data in response to receiving a content delivery indicator from the SDPS. In another embodiment, correlation is maintained between individual user interface indicators to their associated transmission history data record 970 for allowing the user to simply select the indicator in the user interface for communicating with the SDPS to deliver the associated content. Providing a visual and/or audible presentation of the indicator is well known in the art, and may be implemented with a variety of methods. Block 1246 makes the request for content to the SDPS with the rec id 976. Thereafter, via a received system event, blocks 1318 through 1326 handle receipt, delivery, and RDPS user interface presentation of the content in a manner appropriate to the content type from the SDPS. Processing continues from block 1246 back to block 1112.

If block 1244 determines that the user did not select an indicator of deliverable content, then processing continues to block 1250 by way of off page connector 12000. If block 1250 determines that the user selected to configure interests or filters, then block 1252 interfaces with the user to configure interests or filters which are saved locally at block 1254, and processing continues back to block 1112 by way of off page connector 11000. Any configured interests and filters are communicated to the SDPS at blocks 1218 and 1236 as part of registration. Interests field 906 and filter criteria field 908 are set with data configured at block 1252. The RDPS must de-register and re-register with new settings. In an alternative embodiment, block 1254 communicates with the SDPS to update the RDPS' registry data record 900.

If block 1250 determines that the user did not select to configure interests or filters, then processing continues to block 1256. If block 1256 determines the user selected to perform a situational location query, then the user specifies validated parameters (discussed with FIG. 15B) at block 1258. Thereafter, block 1260 communicates an appropriate formatted request to the SDPS. Thereafter, via a received system event, blocks 1318 through 1326 handle receipt, delivery, and RDPS user interface presentation of the content in a manner appropriate to the content type from the SDPS. Processing leaves block 1260 and returns to block 1112.

If block 1256 determines that the user did not select to perform a situational location query, then processing continues to block 1264. If block 1264 determines that the user selected to query the number of known RDPS devices at a location(s) (i.e. a client count request), then block 1266 interfaces with the user to specify valid parameters including situational location information and time criteria, and processing continues to block 1260 which was described. A content specification parameter may also be specified for retrieving the situational location content as well. Time criteria embodiments include any time window in history, a current time window (of request, transmission of request, SDPS receipt of request, or processing the request), or a truncated precision time. Truncated precision time allows specifying time windows (e.g. 12:04 pm implies 4 minutes after 12:00 pm and additionally any number of seconds up to and not including 5 minutes after 12:00 pm).

If block 1264 determines that the user did not select to query the number of RDPS devices at a location(s) (i.e. a client count request), then processing continues to block 1268. If block 1268 determines that the user selected to browse transmission history data, then block 1270 interfaces with the user until he either exits, or selects information from the speed reference information field 978 from a transmission history data record 970. Preferably, block 1270 permits scrolling transmission history data records 970 with fields columnized. If, at block 1272, the user selected information of field 978, then block 1274 automatically performs the action, an automatic dialing of a telephone number, or automatic transposition to a web page. Speed reference information field 978 is preferably related to content that was delivered as referenced by rec id field 976. Thereafter, processing continues back to block 1112. If block 1272 determines that the user exited from block 1270, then processing continues back to block 1112.

If block 1268 determines that the user did not select to browse the transmission history data, then processing stops at block 1276.

Note that some RDPS embodiments will not require blocks 1212 through 1228 because there may not be an active session required to have communications between the RDPS and SDPS.

Figure 13:
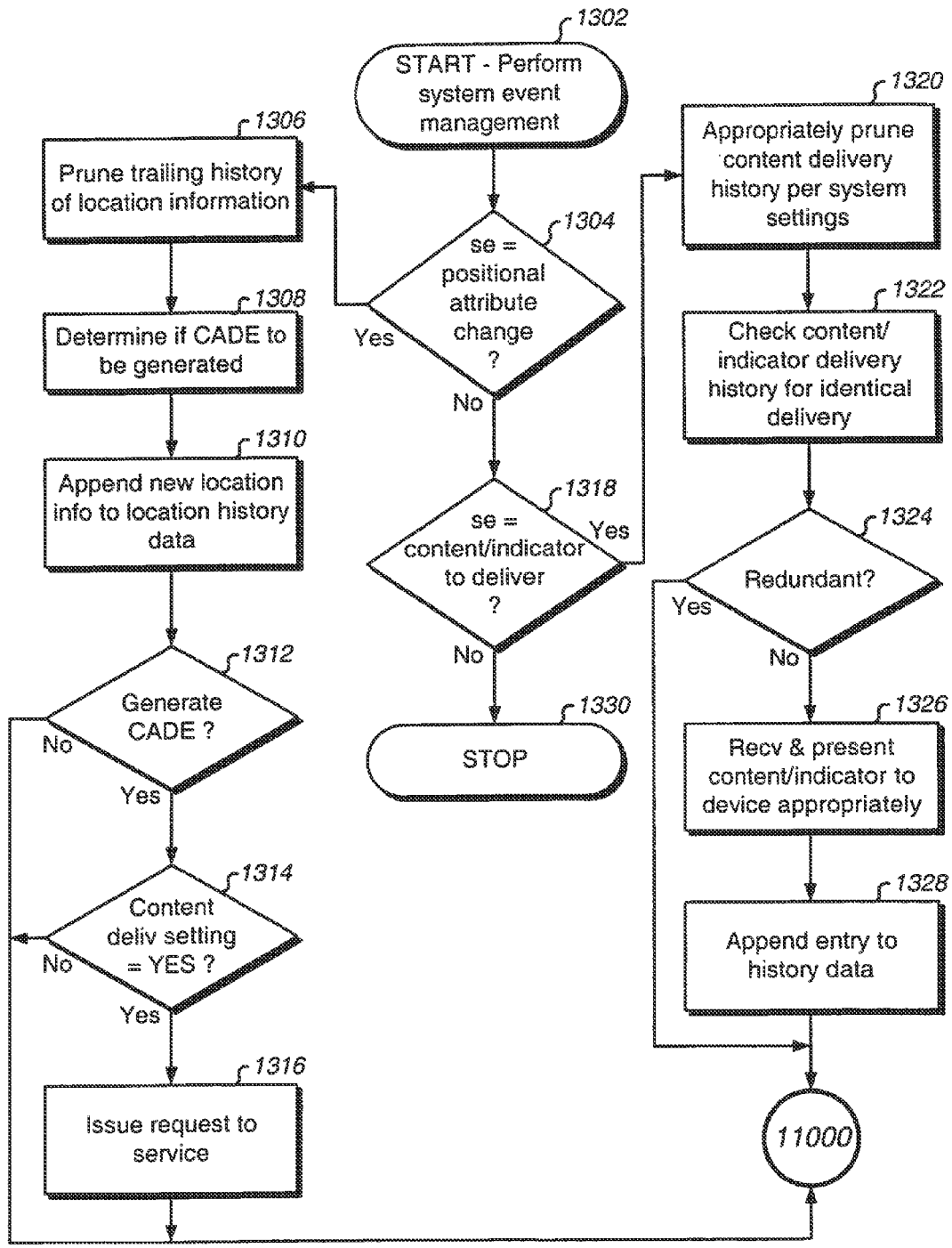
FIG. 13 depicts a flowchart for describing system event management processing aspects of a preferred embodiment of the RDPS of the present invention, in the context of candidate delivery event determination by the RDPS.

FIG. 13 depicts a flowchart for describing system event management processing aspects of a preferred embodiment of the RDPS of the present invention, in the context of candidate delivery event generation by the RDPS. System event management begins at block 1302, and continues to block 1304. If block 1304 determines the system event is a positional attribute change (e.g. location change) from the RDPS location management system, housekeeping is performed at block 1306 by pruning the location history data maintained at the RDPS. Pruning may be by time, number of entries, or other criteria. Thereafter, block 1308 determines if a CADE is to be generated. In one embodiment, block 1308 compares the current positional attribute (e.g. location) with the former positional attribute of location history data record 920 that contains an event posted YES/NO field 928 set to YES. The distance is calculated and then compared with the movement tolerance. Block 1308 also determines if there was a direction positional attribute change. Processing continues to block 1310 where a location history data record 920 is appended to the location history data for the current location and/or direction with the event posted field 928 set according to what block 1308 determined. Block 1310 flows to block 1312.

If block 1312 determines that a CADE is to be generated to the SDPS, then processing continues to block 1314. If block 1314 determines that the content delivery setting is set to enabled, then block 1316 formats and issues a CADE request to the SDPS, and processing continues to block 1112 by way of off page connector 11000.

If block 1314 determines that the content delivery setting is not enabled, then processing continues to block 1112. If block 1312 determines that a CADE is not to be generated, then processing continues to block 1112.

If block 1304 determines that the system event was not for a RDPS positional attribute change from the location management system, then processing continues to block 1318. If block 1318 determines that the system event is a transmission from the SDPS with content to deliver, or a content delivery indicator to content, then block 1320 performs housekeeping by pruning transmission history data records 970. Pruning is performed by time, number of entries, or some other criteria. Block 1320 flows to block 1322 where the transmission history data is checked to see if the rec id field 702 for the content or content delivery indicator, communicated with the system event, is already present in a transmission history data record 970. If the same content was already delivered, a rec id field 976 will match the rec id field 702 for pending presentation. The system event contains parameters including rec id field 702 with an indicator status for allowing the user to retrieve the content at a later time. If block 1324 determines the rec id field 702 of the event is already contained in the transmission history data, then processing continues back to block 1112 with no delivery processing. If block 1324 determines it is not a redundant delivery, then block 1326 communicates with the SDPS for retrieval of the location field 704, direction field 706, content type field 710, short text field 714, and speed reference info field 716. Any type of content is presented to the RDPS user interface in the appropriate manner. Various embodiments may limit types of content using a variety of methods, located at the RDPS or SDPS. Additionally, either content field 712 and linked content via content links field 722 is retrieved, or content delivery indicator(s) status is retrieved. Thereafter, block 1328 appends a transmission history data record 970 to the RDPS transmission history data, and processing continues to block 1112. Blocks 1320 through 1326 handle all content (or indicator) delivery to the RDPS, preferably asynchronously to all other RDPS processing.

If block 1318 determines that the system event was not for delivery, then processing stops at block 1330.

An alternative embodiment to FIG. 13 processing will not check history for redundant content delivery. Or, a user may enable or disable the feature.

Block 1326 may also include applying client located filters for filtering out content. In such an embodiment, a filter criteria field 908 may not be required.

The user of the RDPS may also modify the transmission history data to allow a redundant refresh.

Figure 14:
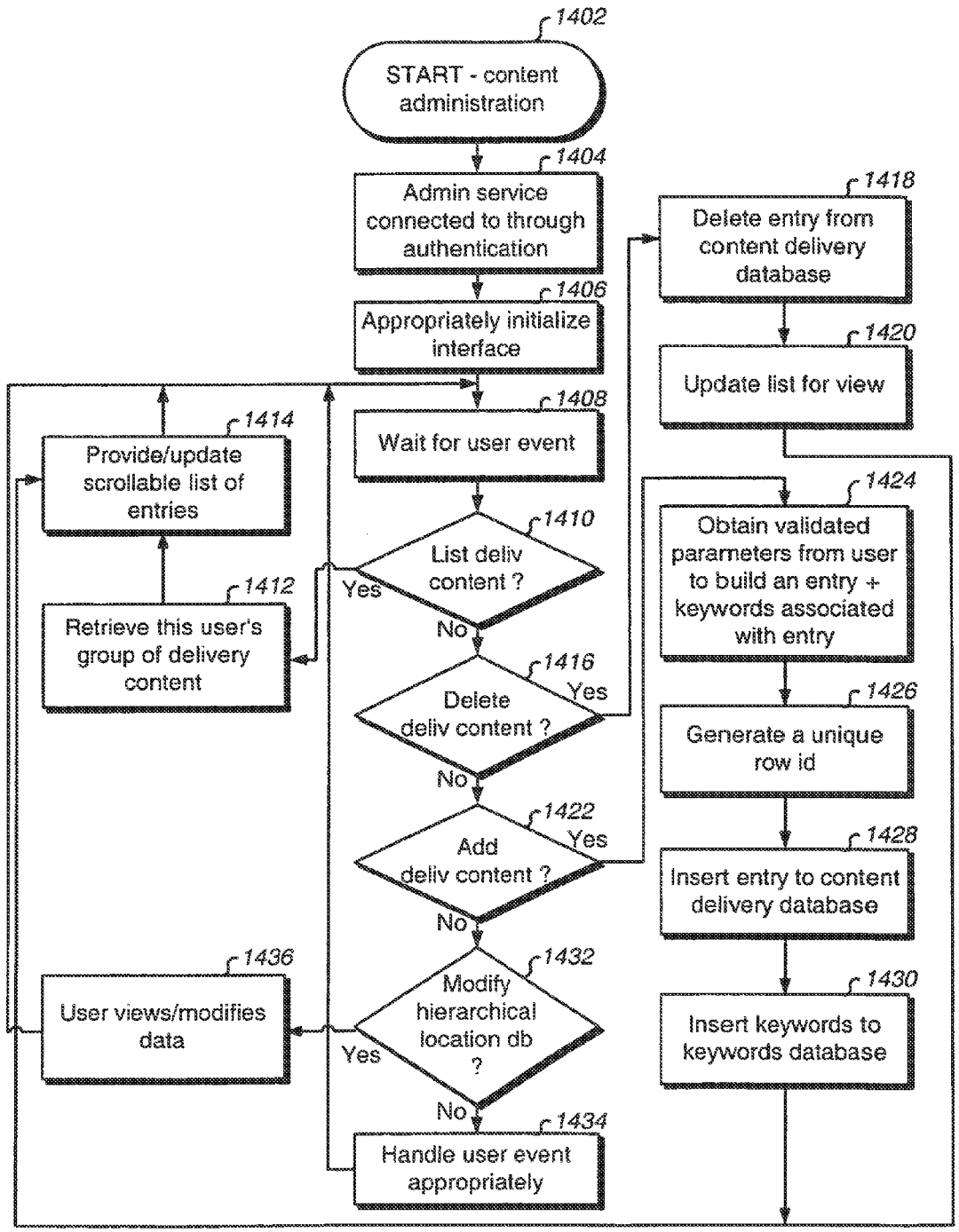
FIG. 14 depicts a flowchart for describing the content administration aspects of the present invention.

FIG. 14 depicts a flowchart for describing the content administration aspects of the present invention. An administrator, preferably a paying customer with rights to configure the deliverable content database, invokes the present invention administration interface. FIG. 14 is preferably a public access enabled, internet connected user interface for modifying the deliverable content database. The administrator may act on behalf of a paying customer. Processing begins at block 1402 and continues to block 1404 where the administrator is first authenticated as a valid user to perform administration. Then, block 1406 appropriately initializes the administration interface. Thereafter, block 1408 waits for user action (a user event). Once a user action is detected, processing continues.

If block 1410 determines that the administrator selected to list his deliverable content database records 700, then the deliverable content database is searched using the administrator's authorization id against the authorization id field 720. Any deliverable content database records 700 belonging to the administrator are put into a scrollable list at block 1414, and processing continues back to block 1408. Options are available for appropriately presenting the content, keywords data record 750, and linked content via content links field 722. The scrollable list preferably columnizes the displayable fields 702, 704, 706, 708, 710, 714, 716, 718, and 724.

If block 1410 determines the user did not select to list his deliverable content database configurations, then processing continues to block 1416. If block 1416 determines that the user selected to delete a deliverable content data record 700 from the scrollable list, then block 1418 deletes the record 700 from the content deliverable database along with any associated keywords data record 750, and linked content via content links field 722. Thereafter, block 1420 updates the scrollable list data, and processing continues back to block 1414.

If block 1416 determines that the administrator did not select to delete, then processing continues to block 1422. If block 1422 determines the administrator selected to add a deliverable content database record 700, then block 1424 interfaces with the administrator for validated entry. Thereafter, block 1426 generates a unique number record identifier for rec id field 702, block 1428 inserts into the deliverable content database, block 1430 inserts any associated keyword data record 750 to the keyword data, and processing continues back to block 1414. Keywords specification allows associating delivery content to a user's interests or filters in registration data for establishing a basis of delivery. Block 1424 provides appropriate interfaces for specifying and reviewing all types of content. Block 1428 additionally populates linked content if content links field 722 is used. Once a deliverable content database record 700 is inserted, it is instantly activated for candidate delivery. The delivery is proactive when the RDPS situational location is automatically determined.

If block 1422 determines the user did not select to add a deliverable content database record 700, then processing continues to block 1432. If block 1432 determines that the user selected to modify location hierarchy data records 800, then the user modifies the data at block 1436 and processing continues back to block 1408. If block 1432 determines the user did not select to modify location hierarchy data, then processing continues to block 1434 where other user actions are handled. Other user actions include scrolling, window manipulation, exiting the administration interface, or other navigation not relevant for discussion. Processing then continues back to block 1408.

Preferably, the block 1432 option only presents itself to a special super-user administrator who is unlikely to cause problems for all other administrated configurations. It is very important that all data be maintained with integrity by blocks 1418 and 1428. For example, a deliverable content database record 700 deleted should not be referenced by transmission history data 940. The rec id field 702 will no longer be valid. FIG. 14 processing may include an update deliverable database record option in alternative embodiments.

Figure 15A:
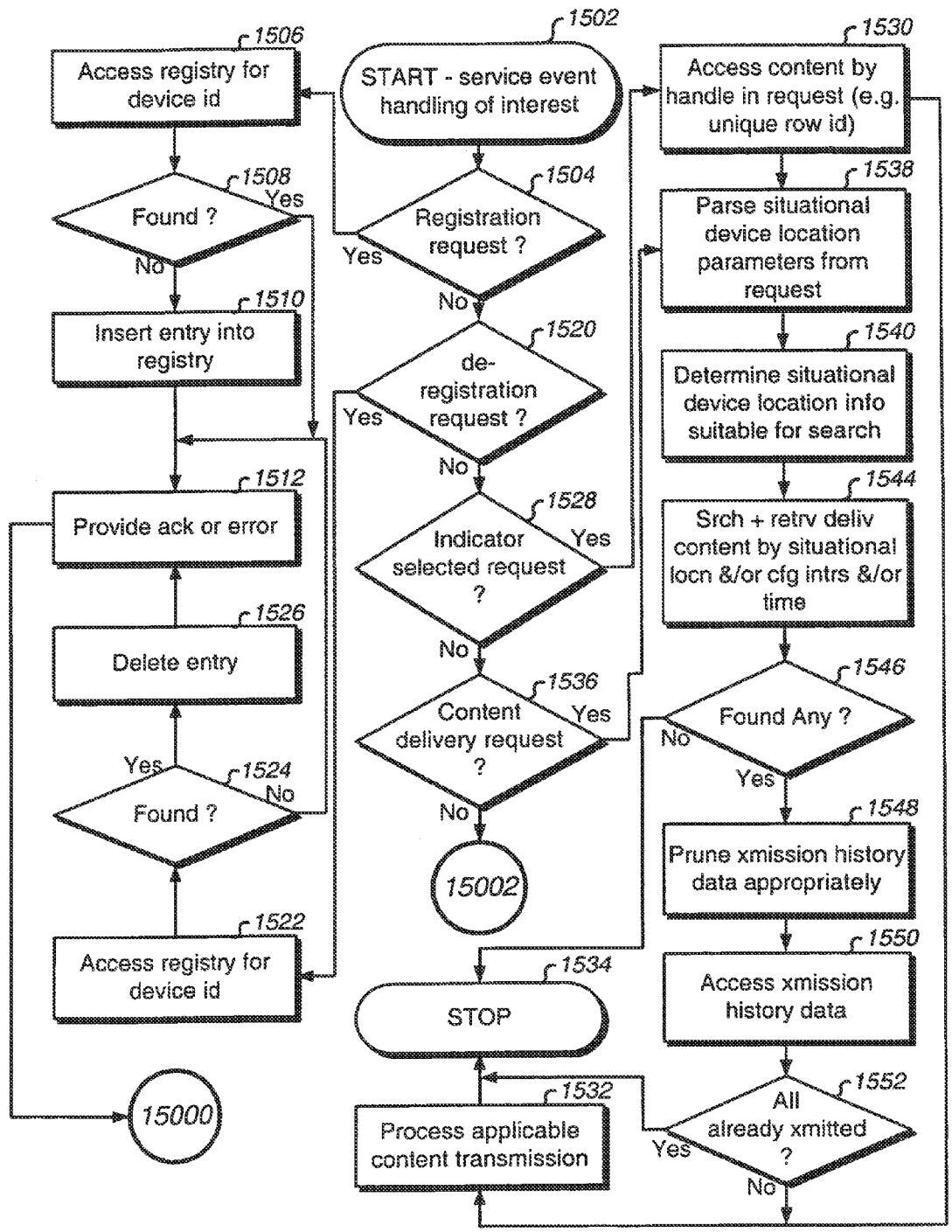
FIGS. 15A, 15B, and 15C depict flowcharts for service event handling aspects of a preferred embodiment of the SDPS of the present invention, in the context of candidate delivery event determination by the RDPS.
Figure 15B:
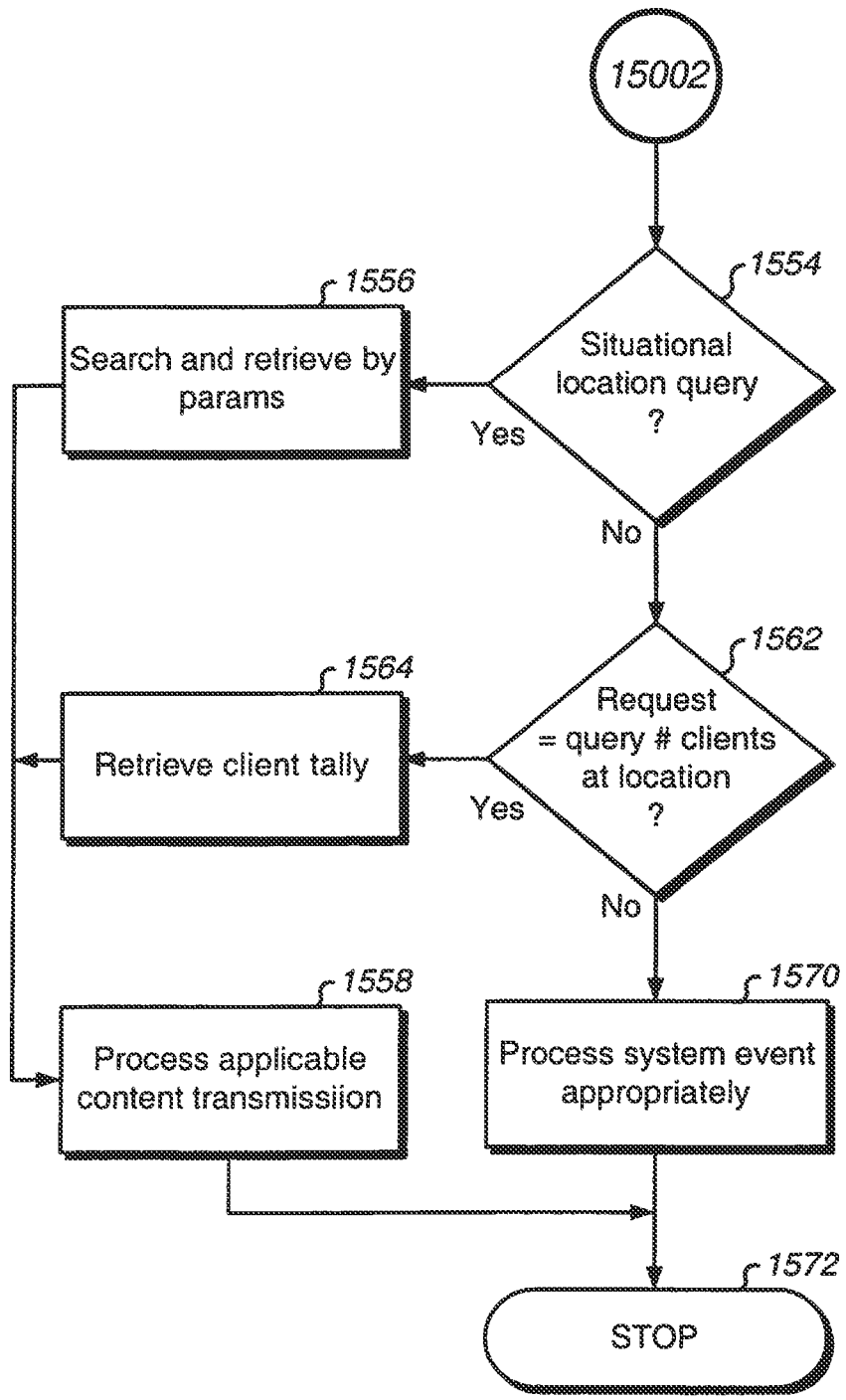
Figure 15C:
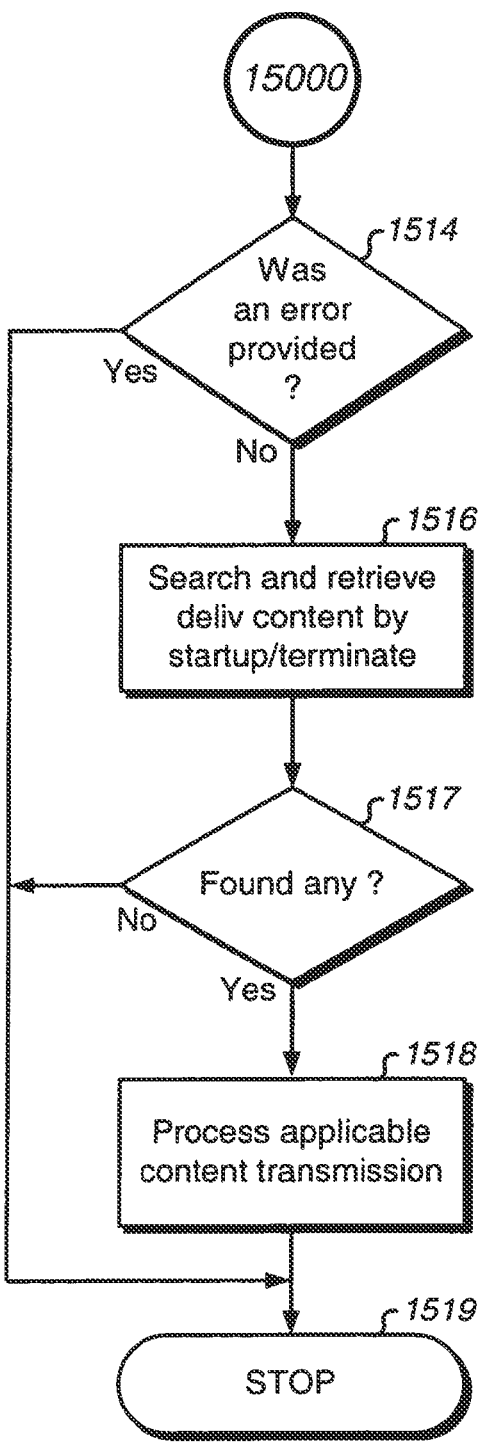

FIGS. 15A, 15B, and 15C depict flowcharts for service event handling aspects of a preferred embodiment of the SDPS of the present invention, in the context of candidate delivery event generation by the RDPS. SDPS processing relevant to the present invention begins at block 1502 when a service event (request) is posted (generated) to the SDPS, and continues to block 1504. All events are requests containing parameters including at least the device id 902 of the RDPS. Flowchart processing block discussions describe other parameters received, depending on the event (request) type.

If block 1504 determines that the event is an RDPS registration request, then block 1506 accesses registration data to see if the RDPS unique device id is already present (i.e. already registered) in a device id field 902. Thereafter, if block 1508 determines the RDPS does not already have a registration data record 900 registered, then block 1510 inserts a registration data record 900 into registration data. Much of the information may be provided as parameters to the event, or alternatively, block 1506 communicates with the RDPS to gather needed field information. Then, block 1512 provides an acknowledgement to the RDPS, or an error if already registered. Processing continues to block 1514 by way of off page connector 15000. If block 1514 determines that the RDPS was newly registered (i.e. an error was not provided), then block 1516 searches the deliverable content database for delivery activation setting(s) field 718 with a "deliver on RDPS registration" bit enabled. Thereafter, if block 1517 determines there are deliverable content database records 700 with the bit set, then block 1518 processes applicable content transmission (see FIG. 16), and processing stops at block 1519. If block 1517 determines that there was no records, then processing stops at block 1519. If block 1514 determines that the RDPS was already registered (existing entry), then processing continues to block 1519. Thus, a situational location change may be an RDPS state changed to registered.

If block 1504 determines that the event was not a registration request, then processing continues to block 1520. If block 1520 determines that the event is a de-registration request, then block 1522 access the registration data for the device id field 902 provided with the event parameters, and if block 1524 determines one is found, then it is deleted at block 1526, and then an acknowledgement is provided at block 1512 with processing continuing from there as was described except block 1516 searches for the "deliver on RDPS termination bit" enabled. If block 1524 determines that a registration data record 900 was not found, then an error is provided at block 1512 and processing continues as previously described. Thus, a situational location change may be an RDPS state changed to terminated.

If block 1520 determines that the event was not for an RDPS de-registration, then processing continues to block 1528. If block 1528 determines that the RDPS user selected to retrieve content for a content delivery indicator previously sent to the RDPS by the SDPS, then block 1530 accesses the deliverable content database by the rec id field 702 provided as parameters to the event, processing continues to block 1532 where the applicable content is processed (see FIG. 16), and processing stops at block 1534.

If block 1528 determines that the event was not an indicator selection request, then processing continues to block 1536. If block 1536 determines the event is a CADE generated by the RDPS, then block 1538 parses parameters from the request, for example, location and direction. Thereafter, block 1540 completes determination of the situational location from the parameters and converts into a form suitable for searching the deliverable content database. Block 1540 consults location hierarchy data and determines the date/time to further refine the RDPS situational location. Then, block 1544 retrieves deliverable content database records using RDPS parameters and any applicable location hierarchy data records 800 to fields 704, 706 and 708. Also used is data in interests field 906 and filter criteria 908 of the RDPS for comparing against keywords field 754 in keywords data associated with content deliverable database records 700. Delivery activation setting(s) field 718 is consulted as well. In some embodiments, the capabilities of the RDPS are maintained in field 904 to ensure no content of an inappropriate type is delivered. Thus, field 904 may also be utilized. If block 1546 determines that content was found, then block 1548 prunes transmission history data records 940 (by time, depth of records, etc.), block 1550 accesses the SDPS transmission history data, and block 1552 continues. If block 1552 determines that the content was not already transmitted (device id field 942 and rec id field 948 don't match any record in transmission history), then processing continues to block 1532 for processing described by FIG. 16. If block 1552 determines that the content was transmitted, then processing stops at block 1534. If block 1546 determines content applies, then processing stops at block 1534.

If block 1536 determines that the event was not a CADE, then processing continues to block 1554 by way of off page connector 15002. If block 1554 determines that the event is for a situational location query, then block 1556 searches deliverable content database records 700 with parameters from the RDPS: positional attribute parameters from the RDPS with the location field 704 and direction field 706, time criteria with time criteria field 708, and so on. All fields associated to record 700 are searchable through parameters. Block 1556 also applies location hierarchy data depending on a zoom specification parameter. The zoom specification allows control over the block 1556 search algorithm for whether or not to use hierarchy data, and whether or not to check descending locations, ascending locations up to a maximum threshold parameter of content, both descending and ascending (respectively) up to a threshold of content, or neither ascending nor descending hierarchy data functionality. The maximum threshold parameter may be specified regardless, and optionally limits the amount of content to deliver to the RDPS by size, number of content instances, or number of hierarchical data record nestings to search. Further still block 1556 may use field 904 as described above, or the user's interest and/or filters as described above. Information for records found are transmitted as content to the RDPS at block 1558 (see FIG. 16) and processing stops at block 1572.

If block 1554 determines that the event was not a situational location query, then processing continues to block 1562. If block 1562 determines that the request is a client count query request, then block 1564 retrieves the known number of RDPS devices at the specified situational location (e.g. location/direction) given specified time criteria; the number of transmission history data records 940 for unique values in rec id field 948 that contain a date/time stamp 952 according to the user's specified time criteria. A null time criteria parameter implies use the current time of processing the request with a truncated precision for a time window. Otherwise, a specified time window was entered by the user, or automatically inserted as a parameter by the RDPS or SDPS. Presence of the content specification parameter implies to additionally retrieve content from the deliverable content database as described by blocks 1538 through 1544. This allows providing information (e.g. graphical) to complement presentation of the total number of RDPS devices identified. Processing then continues to block 1558 for transmitting the count as content.

If block 1562 determines that the event was not a client count query request, then processing continues to block 1570 where any other SDPS event (request) is processed as is appropriate for the particular service application, and processing stops at block 1572.

Figure 16:
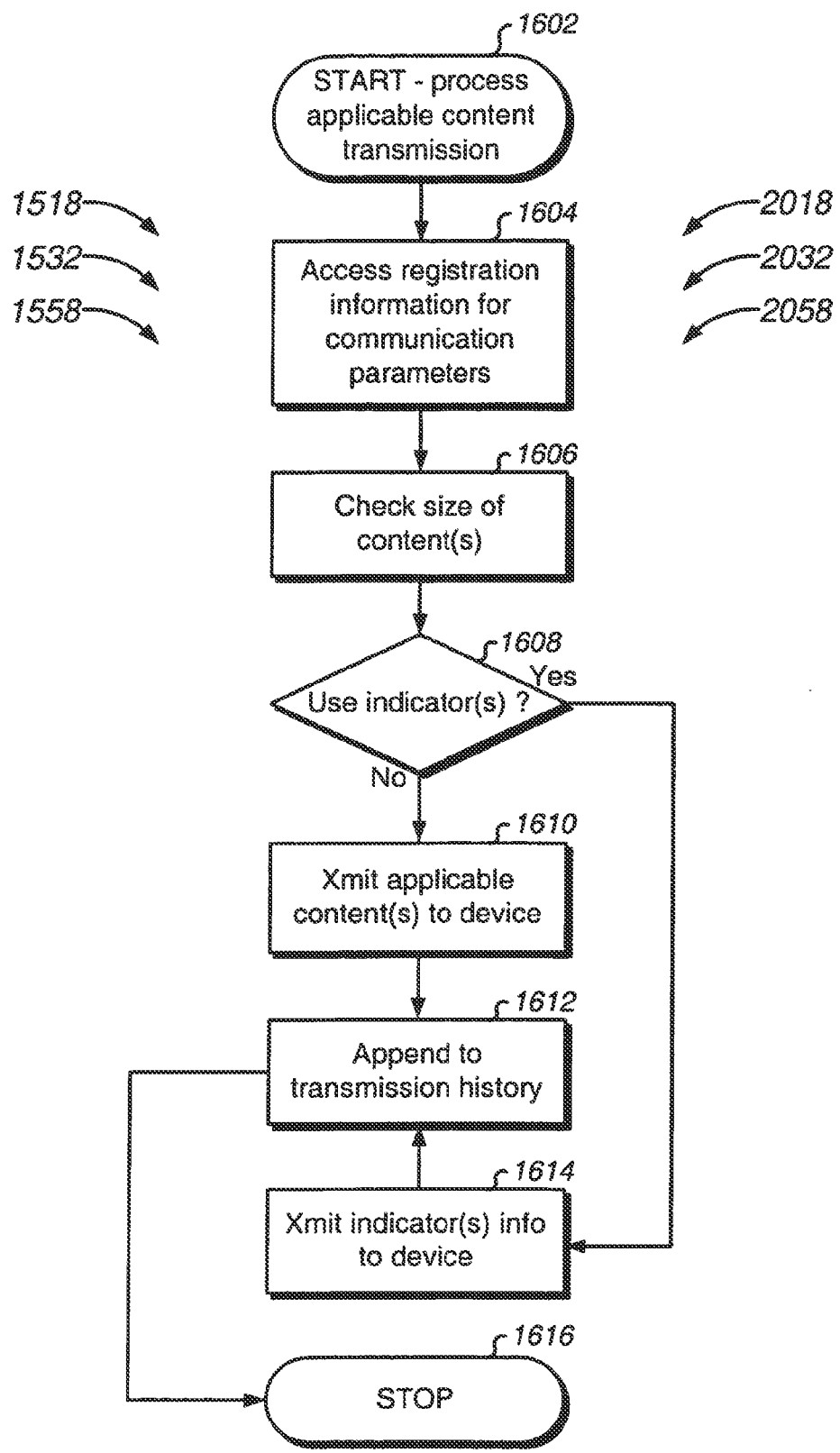
FIG. 16 depicts a flowchart for describing the content transmission aspects of the present invention.

FIG. 16 depicts a flowchart for describing the content transmission aspects of the present invention. FIG. 16 describes processing of blocks 1518, 1532, 1558, 2018, 2032, and 2058. Processing begins at block 1602, continues to block 1604 where registration data is accessed for communications bind information field 904 that is inserted when the RDPS registers, and then continues to block 1606. Block 1606 checks the size of the transmission destined for the RDPS. Thereafter, if block 1608 determines that the information is small enough to not worry about transmission, then block 1610 transmits the situational location dependent information using field 904, block 1612 appends a transmission history data record 940 to transmission history data, and processing stops at block 1616. Block 1610 may first compress and/or encrypt content transmission for efficient and/or safe communications that is then decompressed and/or decrypted by the RDPS at block 1326. Content may also by transmitted at block 1610 depending on capabilities of the RDPS maintained in field 904, for example, transmission speed, memory, storage space, etc. Thus, block 1610 may transmit using transmission delivery constraints of field 904.

If block 1608 determines there may be too much information to unquestionably transmit, then block 1614 transmits content delivery indicator(s) information to the RDPS and processing continues to block 1612. Thus, the total size of the transmission is a transmission delivery constraint affecting the delivery information of the content. Of course, FIG. 16 could always transmit an indicator, or a transmission delivery constraint size could be configured to cause content delivery indicators delivered all, or most, of the time.

Block 1608 may use a system size setting (e.g. number of bytes), or may use size information relative to RDPS capabilities maintained in communications bind information field 904.

Server Data Processing System

Candidate Delivery Event Generation Embodiment

Figure 17:
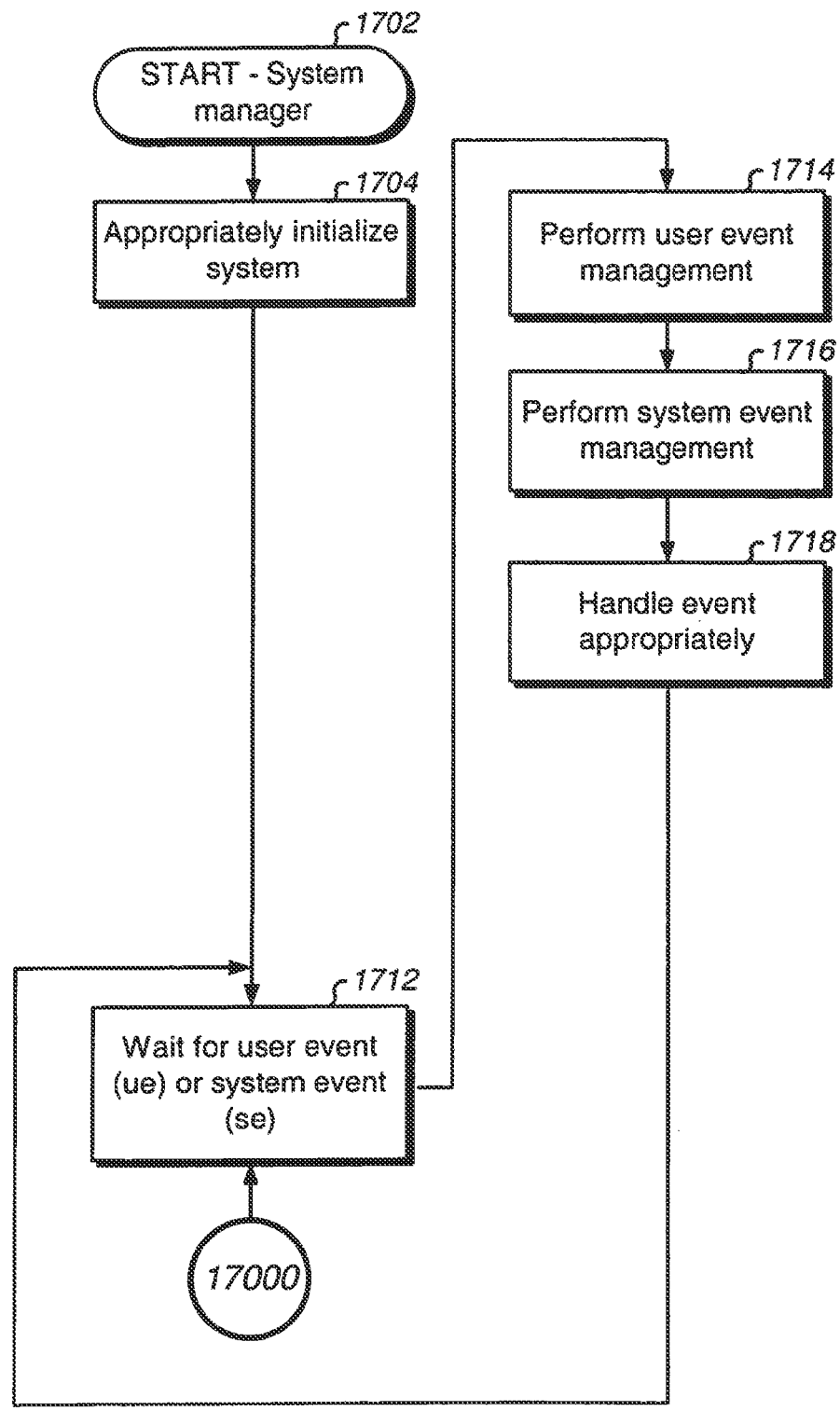
FIG. 17 depicts a flowchart for describing data processing system aspects relevant to a preferred embodiment of the RDPS of the present invention, in the context of candidate delivery event determination not by the RDPS.

The reader should make note of the nearly identical descriptions and enumerations between the figures in different embodiments. The rightmost two digits of the block numbering have been preserved to facilitate correlation. FIG. 17 correlates FIG. 11, and so on. FIG. 14 and FIG. 16 are applicable to both embodiments: SDPS CADE generation and RDPS CADE generation.

FIG. 17 depicts a flowchart for describing data processing system aspects relevant to a preferred embodiment of the RDPS of the present invention, in the context of candidate delivery event generation by the SDPS. When the RDPS is enabled, for example, by a power switch, system manager processing begins at block 1702 and continues to block 1704 where the system appropriately initializes, for example to default interfaces. Processing continues to block 1712. Block 1712 waits for a user event or system event. User interface management is coupled with the system manager to enable a user to the RDPS. Upon detection of an event, block 1712 flows to block 1714 for any user event management processing. Should block 1714 processing return, block 1716 performs any system event management processing. Should processing of block 1716 return, block 1718 handles the event appropriately as is relevant for other events of the RDPS, for example, user interface control of little interest to discussion of the present invention. Thereafter, block 1718 flows to block 1712 for processing as described.

An alternate embodiment of FIG. 17 will implement a multithreaded system wherein events are handled asynchronously as they occur.

Figure 18A:
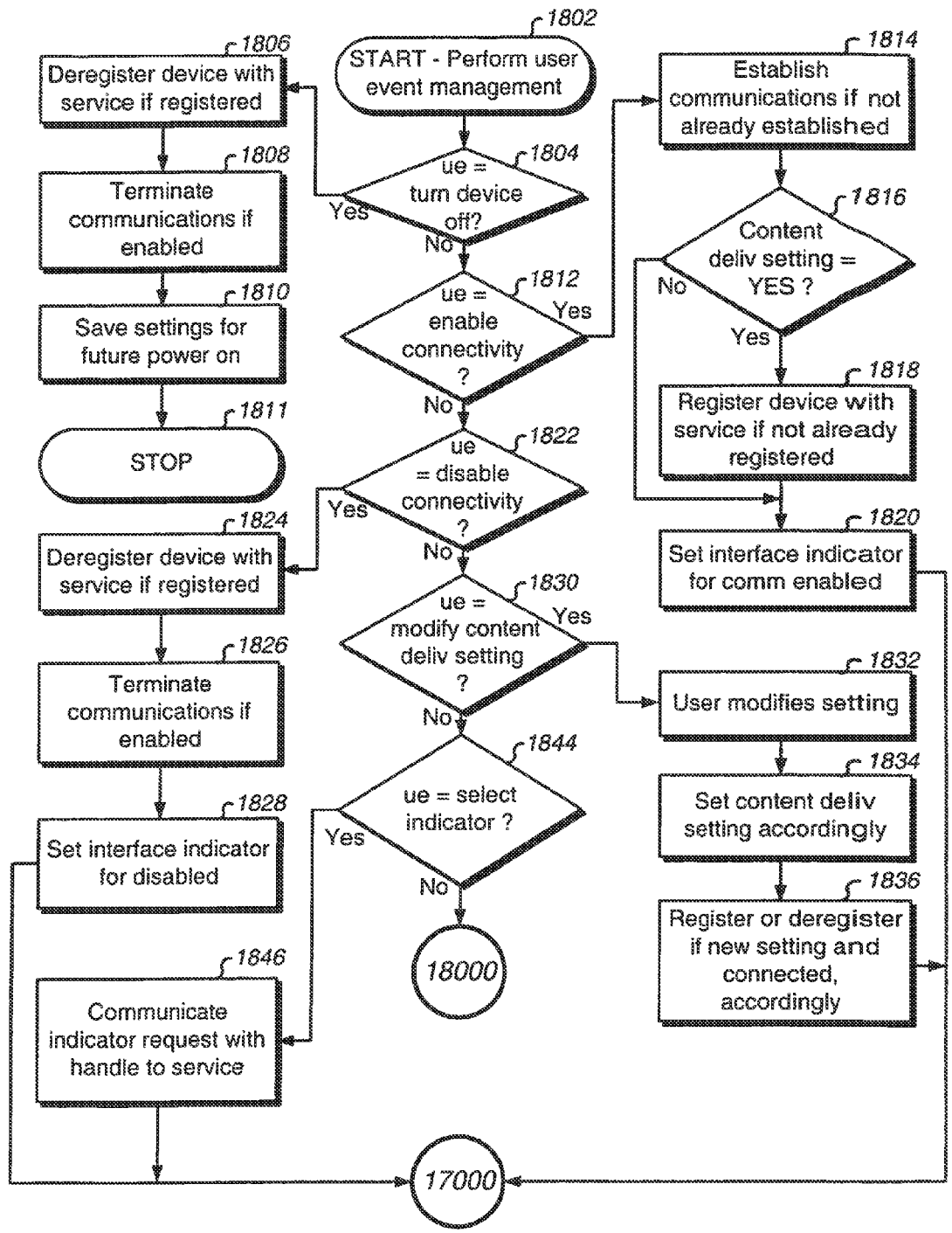
FIGS. 18A and 18B depict flowcharts for describing user event management processing aspects of a preferred embodiment of the RDPS of the present invention, in the context of candidate delivery event determination not by the RDPS.
Figure 18B:
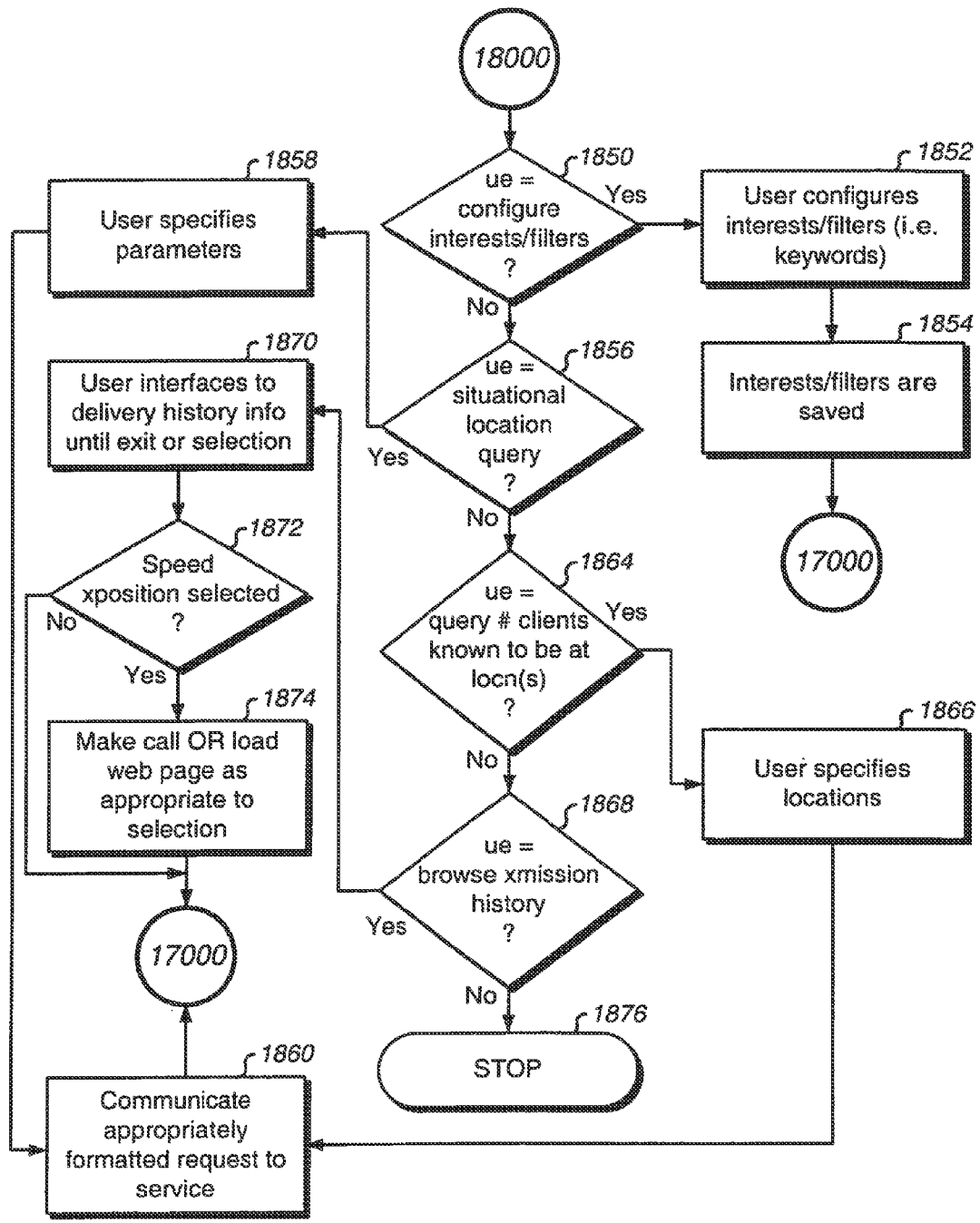

FIGS. 18A and 18B depict flowcharts for describing user event management processing aspects of a preferred embodiment of the RDPS of the present invention, in the context of candidate delivery event generation by the SDPS. User event management begins at block 1802 and continues to block 1804. If block 1804 determines that the user event is powering the RDPS off, then block 1806 communicates with the SDPS to remove (if any) its RDPS data record 900 from the registration data, block 1808 terminates any communication session gracefully (if required) depending on the RDPS, block 1810 saves settings, for example, the delivery setting for the next power on, and RDPS processing stops at block 1811.

If block 1804 determines the RDPS was not turned off, then processing continues to block 1812. If block 1812 determines that the user selected to enable communications with the SDPS, then block 1814 establishes communications with the SDPS (if not already established), and block 1816 consults the current delivery setting. In one embodiment, block 1814 through 1820 may be processed just as the result of a wireless device being powered on. If block 1816 determines that the content delivery setting for receiving situational location dependent content is enabled, then block 1818 communicates with the SDPS for inserting a registry data record 900 into the registry data. Thereafter, block 1820 sets a RDPS user interface indicator showing that communications to the SDPS is enabled, and processing returns to block 1712 of FIG. 17 by way of off page connector 17000. If block 1816 determines the delivery setting is not enabled, then processing continues to block 1820.

If block 1812 determines that the user did not select to enable communications to the SDPS, then processing continues to block 1822. If block 1822 determines that the user selected to disable SDPS communications, then block 1824 communicates with the SDPS to remove its registry data record 900 from registry data, block 1826 terminates the communications session gracefully (if required) depending on the RDPS embodiment, block 1828 sets the communications to SDPS user interface indicator to disabled, and processing continues back to block 1712. In one embodiment, block 1824 through 1828 may be processed just as the result of a wireless device being powered off.

If block 1822 determines the user did not select to disable communications to the SDPS, then processing continues to block 1830. If block 1830 determines that the user selected to modify the RDPS content delivery setting, then the user modifies the setting at block 1832, the delivery setting is set accordingly at block 1834. Preferably, blocks 1830/1832 allow a user to toggle the content delivery setting. No content will be delivered when this setting is disabled. Being registered with the SDPS constitutes being eligible for delivery. Alternative embodiments won't have such a feature. Block 1834 also sets an indicator in the user interface for displaying that setting, and block 1836 communicates with the SDPS to insert or remove its registry data record 900 should the setting be different than previous. Of course, appropriate error handling is performed by block 1836 if there is no communications enabled. Thereafter, processing continues to block 1712.

If block 1830 determines that the user did not select to modify the content delivery setting, then processing continues to block 1844. If block 1844 determines that the user selected a content delivery indicator, as maintained in a transmission history data record 970 for deliverable content from the SDPS, then block 1846 communicates with the SDPS using the rec id field 976. In one embodiment, the user peruses the transmission history data in response to receiving a content delivery indicator from the SDPS. In another embodiment, correlation is maintained between individual user interface indicators to their associated transmission history data record 970 for allowing the user to simply select the indicator in the user interface for communicating with the SDPS to deliver the associated content. Providing a visual and/or audible presentation of the indicator is well known in the art and may be implemented with a variety of methods. Block 1846 makes the request for content to the SDPS with the rec id 976. Thereafter, via a received system event, blocks 1918 through 1926 handle receipt, delivery, and RDPS user interface presentation of the content in a manner appropriate to the content type from the SDPS. Processing continues from block 1846 back to block 1712.

If block 1844 determines that the user did not select an indicator of deliverable content, then processing continues to block 1850 by way of off page connector 18000. If block 1850 determines that the user selected to configure interests or filters, then block 1852 interfaces with the user to configure interests or filters which are saved locally at block 1854, and processing continues back to block 1712 by way of off page connector 17000. Any configured interests and filters are communicated to the SDPS at blocks 1818 and 1836 as part of registration. Interests field 906 and filter criteria field 908 are set with data configured at block 1852. The RDPS must de-register and re-register with new settings. In an alternative embodiment, block 1854 communicates with the SDPS to update the RDPS' registry data record 900.

If block 1850 determines that the user did not select to configure interests or filters, then processing continues to block 1856. If block 1856 determines the user selected to perform a situational location query, then the user specifies validated parameters (discussed with FIG. 20B) at block 1858. Thereafter, block 1860 communicates an appropriate formatted request to the SDPS, and thereafter via a received system event, blocks 1918 through 1926 handle receipt, delivery, and RDPS user interface presentation of the content in a manner appropriate to the content type from the SDPS. Processing leaves block 1860 and returns to block 1712.

If block 1856 determines that the user did not select to perform a situational location query, then processing continues to block 1864. If block 1864 determines that the user selected to query the number of known RDPS devices at a location(s) (i.e. a client count request), then block 1866 interfaces with the user to specify valid parameters including situational location information and time criteria, and processing continues to block 1860 which was described. A content specification parameter may also be specified for retrieving the situational location content as well. Time criteria embodiments include any time window in history, a current time window (of request, transmission of request, SDPS receipt of request, or processing the request), or a truncated precision time. If block 1864 determines that the user did not select to query the number of RDPS devices at a location(s) (i.e. a client count request), then processing continues to block 1868. If block 1868 determines that the user selected to browse transmission history data, then block 1870 interfaces with the user until he either exits, or selects information from the speed reference information field 978 from a transmission history data record 970. Preferably, block 1870 permits scrolling transmission history data records 970 with fields columnized. If, at block 1872, the user selected information of field 978, then block 1874 automatically performs the action, an automatic dialing of a telephone number, or automatic transposition to a web page. Speed reference information field 978 is preferably related to content that was delivered as referenced by rec id field 976. Thereafter, processing continues back to block 1712. If block 1872 determines that the user exited from block 1870, then processing continues back to block 1712.

If block 1868 determines that the user did not select to browse the transmission history data, then processing stops at block 1876.

Note that some RDPS embodiments will not require blocks 1812 through 1828 because there may not be an active session required to have communications between the RDPS and SDPS. In one embodiment, the movement tolerance is communicated to the SDPS at blocks 1818 and 1836, and then inserted to movement tolerance field 910.

Figure 19:
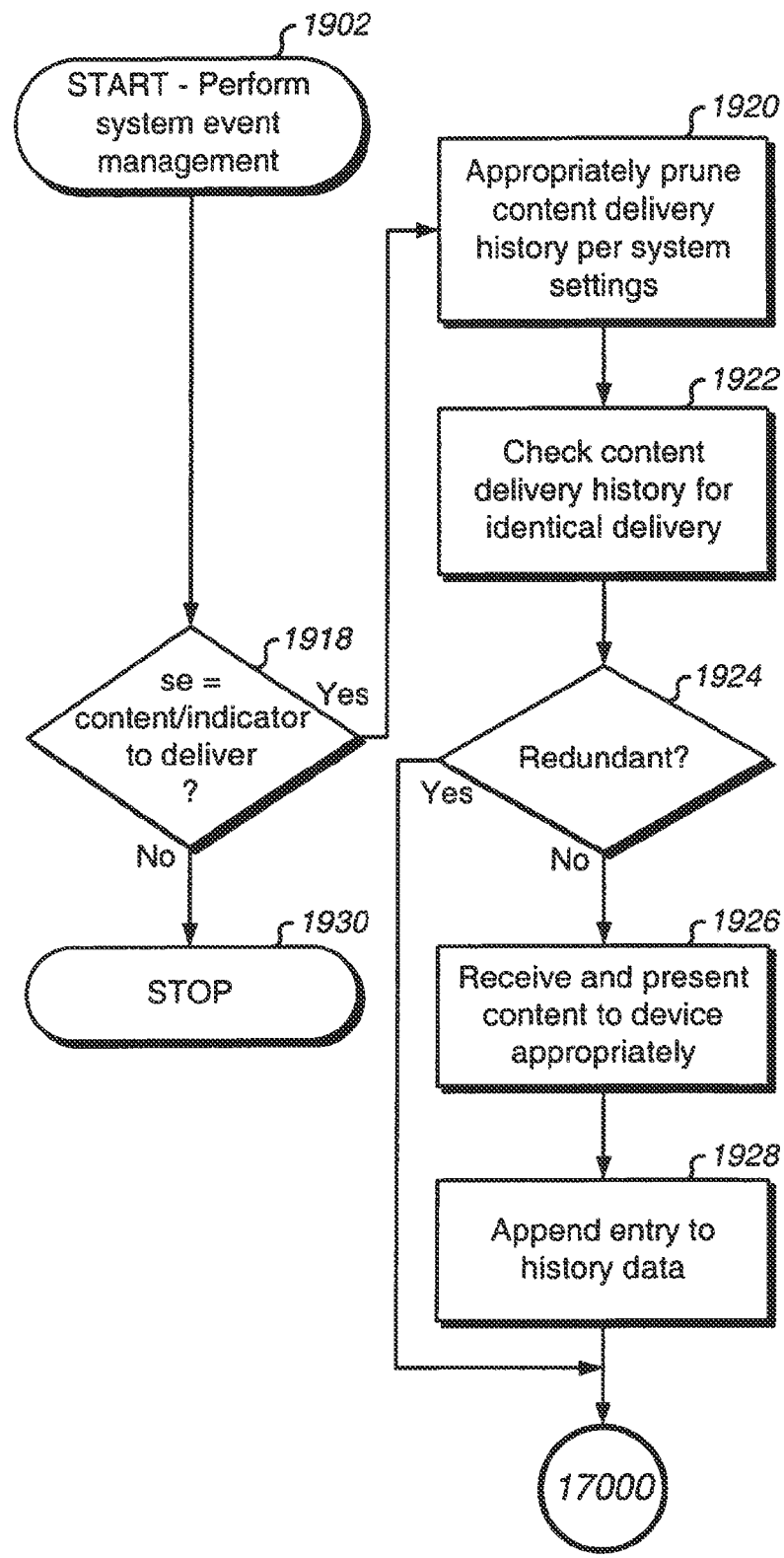
FIG. 19 depicts a flowchart for describing system event management processing aspects of a preferred embodiment of the RDPS of the present invention, in the context of candidate delivery event determination not by the RDPS.

FIG. 19 depicts a flowchart for describing system event management processing aspects of a preferred embodiment of the RDPS of the present invention, in the context of candidate delivery event generation by the SDPS. System event management begins at block 1902, and continues to block 1918. If block 1918 determines that the system event is a transmission from the SDPS with content to deliver, or a content delivery indicator to content, then block 1920 performs housekeeping by pruning transmission history data records 970. Pruning is performed by time, number of entries, or some other criteria. Block 1920 flows to block 1922 where the transmission history data is checked to see if the rec id field 702 for the content or content delivery indicator, communicated with the system event, is already present in a transmission history data record 970. If the same content was already delivered, a rec id field 976 will match the rec id field 702 for pending presentation. The system event contains parameters including rec id field 702 with an indicator status for allowing the user to retrieve the content at a later time. If block 1924 determines the rec id field 702 of the event is already contained in the transmission history data, then processing continues back to block 1712 with no delivery processing. If block 1924 determines it is not a redundant delivery, then block 1926 communicates with the SDPS for retrieval of the location field 704, direction field 706, content type field 710, short text field 714, and speed reference info field 716. Any type of content is presented to the RDPS user interface in the appropriate manner. Various embodiments may limit types of content using a variety of methods, located at the RDPS or SDPS. Additionally, either content field 712 and linked content via content links field 722 are retrieved, or content delivery indicator status is retrieved. Thereafter, block 1928 appends a transmission history data record 970 to the RDPS transmission history data, and processing continues to block 1712. Blocks 1920 through 1926 handle all content (or indicator) delivery to the RDPS, preferably asynchronously to all other RDPS processing.

If block 1918 determines that the system event was not for delivery, then processing stops at block 1930.

An alternative embodiment to FIG. 19 processing will not check history for redundant content delivery. Or, a user may enable or disable the feature.

Block 1926 may also include applying client located filters for filtering out content. In such an embodiment, a filter criteria field 908 may not be required.

The user of the RDPS may also modify the transmission history data to allow a redundant refresh.

Figure 20A:
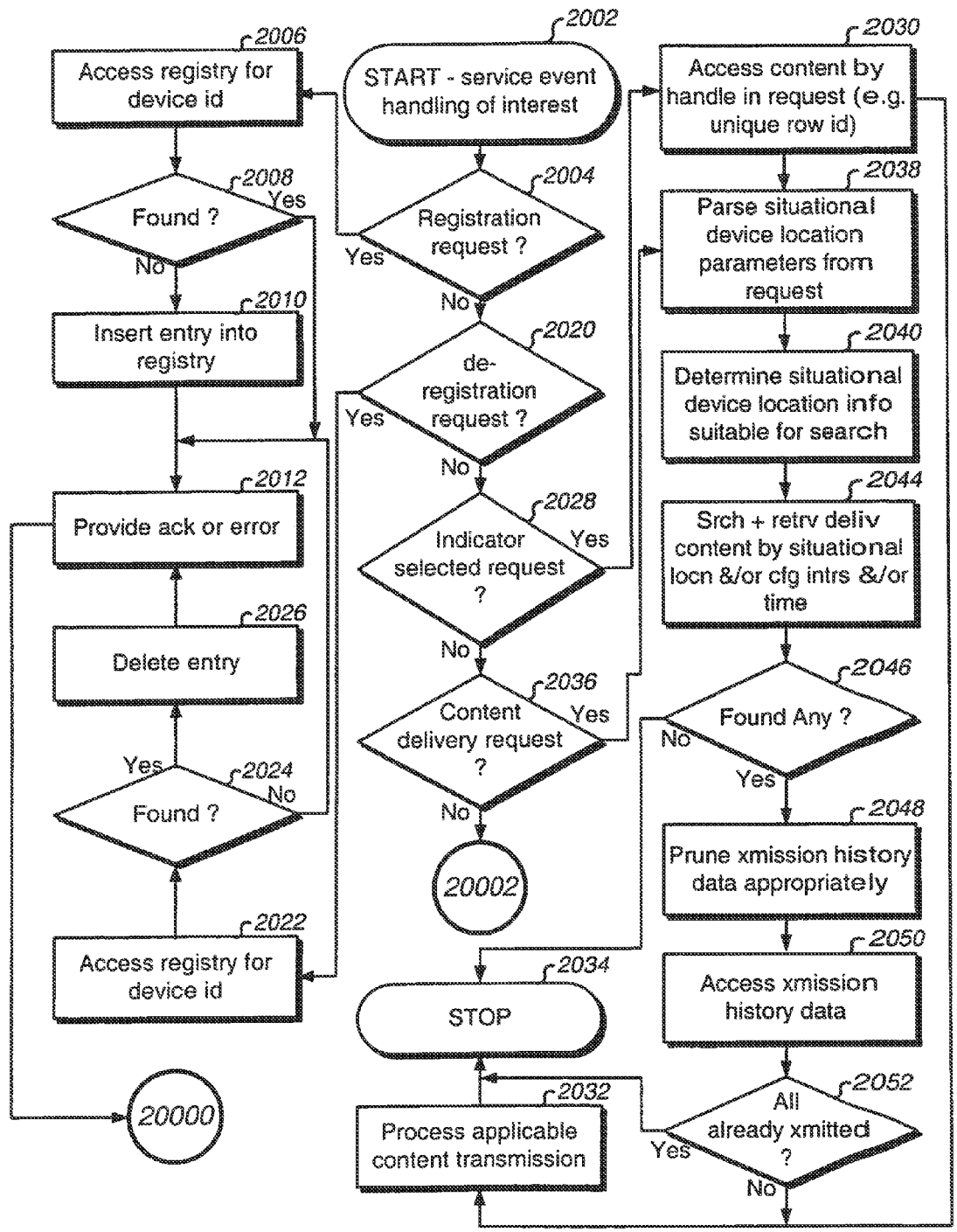
FIGS. 20A, 20B, and 20C depict flowcharts for service event handling aspects of a preferred embodiment of the SDPS of the present invention, in the context of candidate delivery event determination not by the RDPS.
Figure 20B:
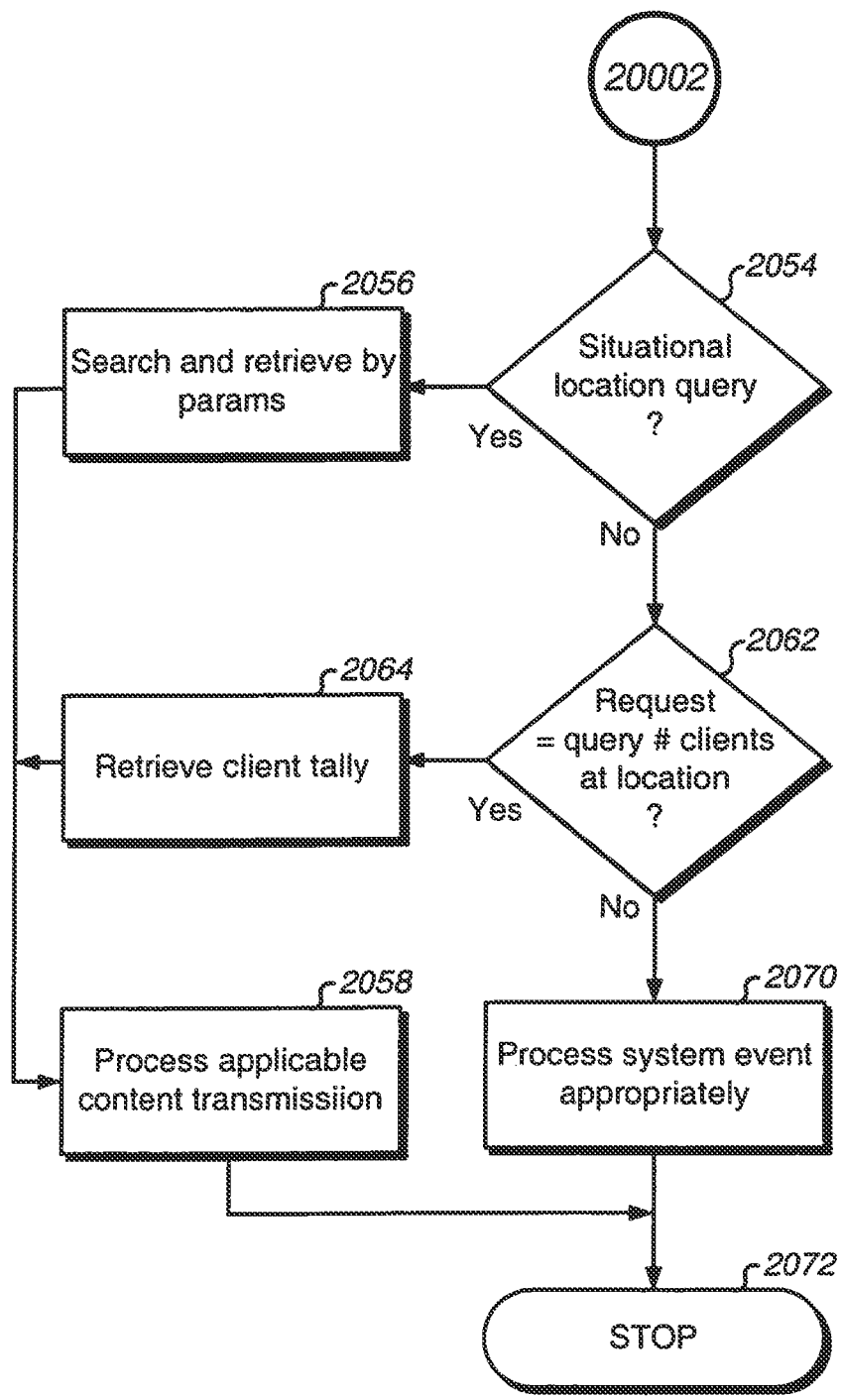
Figure 20C:
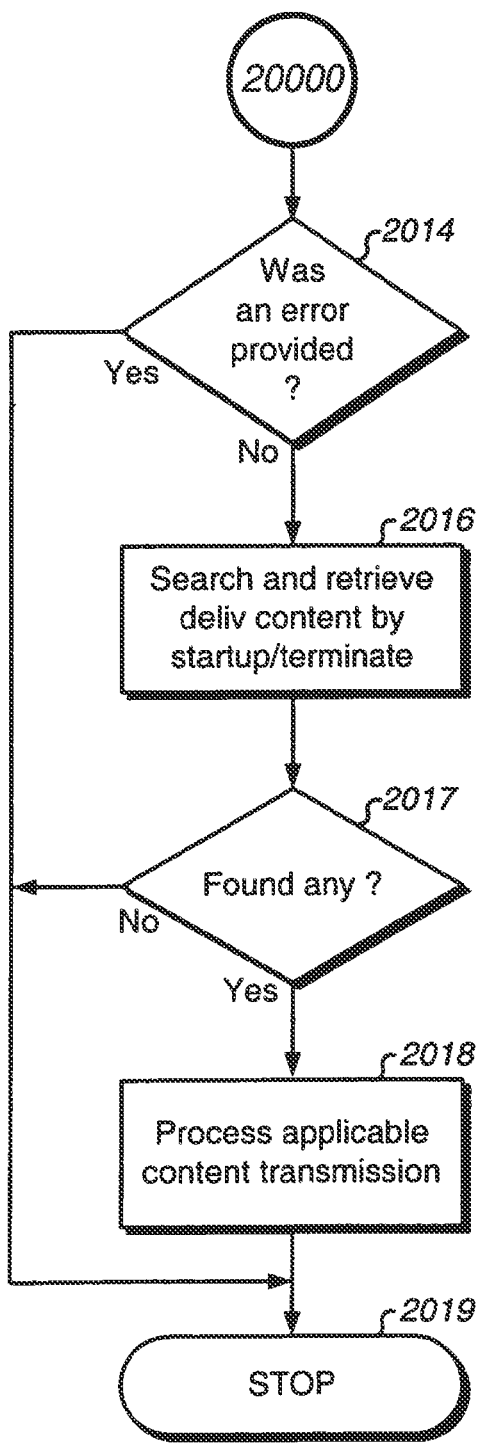

FIGS. 20A, 20B, and 20C depict flowcharts for service event handling aspects of a preferred embodiment of the SDPS of the present invention, in the context of candidate delivery event generation by the SDPS. SDPS processing relevant to the present invention begins at block 2002 when a service event (request) is posted (generated) to the SDPS, and continues to block 2004. All events are requests containing parameters including at least the device id 902 of the RDPS. Flowchart processing block discussions describe other parameters received, depending on the event (request) type.

If block 2004 determines that the event is an RDPS registration request, then block 2006 accesses registration data to see if the RDPS unique device id is already present (i.e. already registered) in a device id field 902. Thereafter, if block 2008 determines the RDPS does not already have a registration data record 900 registered, then block 2010 inserts a registration data record 900 into registration data. Much of the information may be provided as parameters to the event, or alternatively, block 2006 communicates with the RDPS to gather needed field information. Then, block 2012 provides an acknowledgement to the RDPS, or an error if already registered. Processing continues to block 2014 by way of off page connector 20000. If block 2014 determines that the RDPS was newly registered (i.e. an error was not provided), then block 2016 searches the deliverable content database for delivery activation setting(s) field 718 with a "deliver on RDPS registration" bit enabled. Thereafter, if block 2017 determines there are deliverable content database records 700 with the bit set, then block 2018 processes applicable content transmission (see FIG. 16), and processing stops at block 2019. If block 2017 determines that there was no records, then processing stops at block 2019. If block 2014 determines that the RDPS was already registered (existing entry), then processing continues to block 2019. Thus, a situational location change may be an RDPS state changed to registered.

If block 2004 determines that the event was not a registration request, then processing continues to block 2020. If block 2020 determines that the event is a de-registration request, then block 2022 access the registration data for the device id field 902 provided with the event parameters, and if block 2024 determines one is found, then it is deleted at block 2026, and then an acknowledgement is provided at block 2012 with processing continuing from there as was described except block 2016 searches for the "deliver on RDPS termination bit" enabled. If block 2024 determines that a registration data record 900 was not found, then an error is provided at block 2012 and processing continues as previously described. Thus, a situational location change may be an RDPS state changed to terminated.

If block 2020 determines that the event was not for an RDPS de-registration, then processing continues to block 2028. If block 2028 determines that the RDPS user selected to retrieve content for a content delivery indicator previously sent to the RDPS by the SDPS, then block 2030 accesses the deliverable content database by the rec id field 702 provided as parameters to the event, processing continues to block 2032 where the applicable content is processed (see FIG. 16), and processing stops at block 2034.

If block 2028 determines that the event was not an indicator selection request, then processing continues to block 2036. If block 2036 determines the event is a CADE generated by a service of, or to, the SDPS (see FIG. 3B, FIG. 5B, and FIG. 6), then block 2038 parses parameters from the request, for example, location and direction. Thereafter, block 2040 completes determination of the situational location from the parameters and converts into a form suitable for searching the deliverable content database. Block 2040 consults location hierarchy data and determines the date/time to further refine the RDPS situational location. Then, block 2044 retrieves deliverable content database records using RDPS parameters and any applicable location hierarchy data records 800 to fields 704, 706 and 708. Also used is data in interests field 906 and filter criteria 908 of the RDPS for comparing against keywords field 754 in keywords data associated with content deliverable database records 700. Delivery activation setting(s) field 718 is consulted as well. In some embodiments, the capabilities of the RDPS are maintained in field 904 to ensure no content of an inappropriate type is delivered. Thus, field 904 may also be utilized. If block 2046 determines that content was found, then block 2048 prunes transmission history data records 940 (by time, depth of records, etc.), block 2050 accesses the SDPS transmission history data, and block 2052 continues. If block 2052 determines that the content was not already transmitted (device id field 942 and rec id field 948 don't match any record in transmission history), then processing continues to block 2032 for processing described by FIG. 16. If block 2052 determines that the content was transmitted, then processing stops at block 2034. If block 2046 determines content applies, then processing stops at block 2034.

If block 2036 determines that the event was not a CADE, then processing continues to block 2054 by way of off page connector 20002. If block 2054 determines that the event is for a situational location query, then block 2056 searches deliverable content database records 700 with parameters from the RDPS: positional attribute parameters from the RDPS with the location field 704 and direction field 706, time criteria with time criteria field 708, and so on. All fields associated to record 700 are searchable through parameters. Block 2056 also applies location hierarchy data depending on a zoom specification parameter. The zoom specification allows control over the block 2056 search algorithm for whether or not to use hierarchy data, and whether or not to check descending locations, ascending locations up to a maximum threshold parameter of content, both descending and ascending (respectively) up to a threshold of content, or neither ascending nor descending hierarchy data functionality. The maximum threshold parameter may be specified regardless, and optionally limits the amount of content to deliver to the RDPS by size, number of content instances, or number of hierarchical data record nestings to search. Further still block 2056 may use field 904 as described above, or the user's interest and/or filters as described above. Information for records found is transmitted as content to the RDPS at block 2058 (see FIG. 16) and processing stops at block 2072.

If block 2054 determines that the event was not a situational location query, then processing continues to block 2062. If block 2062 determines that the request is a client count query request, then block 2064 retrieves the known number of RDPS devices at the specified situational location (e.g. location/direction) given specified time criteria; the number of location history data records 920 for unique values in rec id field 948 that contain a date/time stamp 930 according to the user's specified time criteria. A null time criteria parameter implies use the current time of processing the request with a truncated precision for a time window. Otherwise, a specified time window was entered by the user, or automatically inserted as a parameter by the RDPS or SDPS. Presence of the content specification parameter implies to additionally retrieve content from the deliverable content database as described by blocks 2038 through 2044. This allows providing information (e.g. graphical) to complement presentation of the total number of RDPS devices identified. Processing then continues to block 2058 for transmitting the count as content.

If block 2062 determines that the event was not a client count query request, then processing continues to block 2070 where any other SDPS event (request) is processed as is appropriate for the particular service application, and processing stops at block 2072. FIG. 16 depicts a flowchart for describing the content transmission aspects. FIG. 16 describes processing of blocks 2018, 2032, and 2058.

In any of the embodiments described above, a performance conscious implementation of the present invention including a cache may be pursued given the RDPS has appropriate capability. Without departing from the spirit and scope of the invention, deliverable content database records 700, and joined data from them, may be stored at an RDPS. The SDPS may transmit a compression of the data to the RDPS for decompression and local maintaining Transmission may be at registration and/or performed asynchronously to the RDPS as necessary. Thus, the deliverable content database, and joined data from it, will be accessed locally to the RDPS to prevent real-time communication of what could be large amounts of content. FIG. 14 processing would include updating any RDPS with a local cache when configuration was complete.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A speed reference invocation method in a handheld device, said method comprising:
   determining, by the handheld device, a situational location of a user associated with a content delivery event, the situational location being proximate to at least one antenna station of a local area network, where the at least one antenna station is registered in an overlay map of a grid of cells; and
   responsive to said determining, invoking an invocable speed reference,
   wherein said invocable speed reference is a web address and wherein said step of invoking said invocable speed reference includes invoking a browser to enable said user to browse said content on a webpage associated with said web address.

2. The method of claim 1, where said invocation of the web address results in a graphical map being delivered to said handheld device, said graphical map showing a location of an establishment associated with said web address.

3. The method of claim 2, where said graphical map shows the location of said handheld device in relation to said establishment.

4. The method of claim 1, where said antenna station is located in an indoor environment.

5. The method of claim 4, where said indoor environment is a store and said user is a shopper in said store.

6. The method of claim 5, where said content is an advertisement or coupon.

7. The method of claim 1, where invoking said web address is automatic.

8. The method of claim 1, where at least a portion of said content is cached in the handheld device.

9. The method of claim 1, where said content is filtered at said handheld device by user-configurable filters.

10. The method of claim 1, further comprising:
    delivering said content to said handheld device according to a delivery constraint.

11. A handheld device comprising:
    one or more processors;
    memory coupled to the one or more processors and configured for storing instructions, which when executed by the one or more processors, causes the one or more processors to perform operations comprising:
    determining a situational location of a user associated with a content delivery event, the situational location being proximate to at least one antenna station of a local area network, where the at least one antenna station is registered in an overlay map of a grid of cells; and
    responsive to said determining, invoking an invocable speed reference,
    wherein said invocable speed reference is a web address and wherein said step of invoking said invocable speed reference includes invoking a browser to enable said user to browse said content on a webpage associated with said web address.

12. The handheld device of claim 11, where said invocation of the web address results in a graphical map being delivered to said handheld device, said graphical map showing a location of an establishment associated with said web address.

13. The handheld device of claim 12, where said graphical map shows the location of said handheld device in relation to said establishment.

14. The handheld device of claim 11, where said antenna station is located in an indoor environment.

15. The handheld device of claim 14, where said indoor environment is a store and said user is a shopper in said store.

16. The handheld device of claim 15, where said content is an advertisement or coupon.

17. The handheld device of claim 11, where invoking said web address is automatic.

18. The handheld device of claim 11, where at least a portion of said content is cached in said handheld device.

19. The handheld device of claim 11, where said content is filtered at said handheld device by user-configurable filters.

20. The handheld device of claim 11, further comprising:
    delivering said content to said handheld device according to a delivery constraint.

* * * * *